United States Patent
Printezis et al.

(10) Patent No.: US 11,775,429 B2
(45) Date of Patent: *Oct. 3, 2023

(54) NUMA-AWARE GARBAGE COLLECTION

(71) Applicant: Oracle International Corporation, Redwood Shores, CA (US)

(72) Inventors: Antonios Printezis, Burlington, MA (US); Igor Veresov, Santa Clara, CA (US); Paul Henry Hohensee, Nashua, NH (US); John Coomes, Santa Cruz, CA (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/375,159

(22) Filed: Jul. 14, 2021

(65) Prior Publication Data
US 2021/0397551 A1    Dec. 23, 2021

Related U.S. Application Data

(63) Continuation of application No. 13/077,619, filed on Mar. 31, 2011, now Pat. No. 11,099,982.

(51) Int. Cl.
*G06F 12/02* (2006.01)

(52) U.S. Cl.
CPC ...... *G06F 12/0276* (2013.01); *G06F 12/0253* (2013.01); *G06F 2212/2542* (2013.01)

(58) Field of Classification Search
CPC ............ G06F 12/0253; G06F 12/0269; G06F 12/0276; G06F 2212/2542
USPC ...................... 707/818; 711/1, 151, 158, 163
See application file for complete search history.

(56) References Cited

U.S. PATENT DOCUMENTS

| | | | |
|---|---|---|---|
| 6,199,107 B1 | 3/2001 | Dujari | |
| 6,216,127 B1 * | 4/2001 | Gans | G06Q 10/107 |
| 6,463,500 B1 | 10/2002 | Heddes et al. | |
| 6,493,730 B1 | 12/2002 | Lewis et al. | |
| 6,675,229 B1 * | 1/2004 | Bruno | G06F 9/5055 |
| | | | 719/331 |
| 6,826,583 B1 * | 11/2004 | Flood | G06F 12/0269 |
| | | | 711/E12.012 |
| 6,874,074 B1 * | 3/2005 | Burton | G06F 12/0269 |
| | | | 711/158 |

(Continued)

OTHER PUBLICATIONS

Ogasawara "NUMA-Aware Memory Manager With Dominant-Thread-Based Copying GC" IBM Research—Tokyo Yamato, Kanagawa 242-8502, Japan OOPSLA 2009.

(Continued)

*Primary Examiner* — Reginald G Bragdon
*Assistant Examiner* — Aaron D Ho
(74) *Attorney, Agent, or Firm* — Invoke

(57) ABSTRACT

Methods and systems for garbage collection are described. In some embodiments, Garbage collector threads may maximize local accesses and minimize remote access by copying Young objects and Old objects differently. When copying a Young object, a garbage collector thread may determine the lgroup of the pool that contains the object and copy the object to a pool of the same lgroup. The garbage collector thread may spread Old objects among lgroups by copying Old objects to pools of the same lgroup as the respective garbage collector thread. Additional methods and systems are disclosed.

15 Claims, 48 Drawing Sheets

(56) References Cited

U.S. PATENT DOCUMENTS

| | | | |
|---|---|---|---|
| 6,910,213 B1* | 6/2005 | Hirono | G06F 9/52 718/108 |
| 7,293,051 B1* | 11/2007 | Printezis | G06F 12/0269 707/820 |
| 7,340,494 B1 | 3/2008 | Detlefs et al. | |
| 7,373,514 B2 | 5/2008 | Krueger et al. | |
| 7,567,973 B1 | 7/2009 | Burrows et al. | |
| 7,599,973 B2 | 10/2009 | Detlefs et al. | |
| 7,627,573 B2 | 12/2009 | Williams et al. | |
| 7,694,065 B2 | 4/2010 | Petev et al. | |
| 8,244,775 B1 | 8/2012 | Bak et al. | |
| 8,438,334 B2 | 5/2013 | Bell et al. | |
| 2002/0038301 A1* | 3/2002 | Aridor | G06F 9/465 |
| 2004/0016862 A1 | 1/2004 | Lyman et al. | |
| 2004/0172507 A1 | 9/2004 | Garthwaite | |
| 2004/0186862 A1 | 9/2004 | Garthwaite | |
| 2005/0044134 A1 | 2/2005 | Krueger et al. | |
| 2005/0138012 A1 | 6/2005 | Royer et al. | |
| 2005/0216677 A1* | 9/2005 | Jeddeloh | G06F 13/1642 711/151 |
| 2005/0262323 A1 | 11/2005 | Woo et al. | |
| 2006/0230242 A1 | 10/2006 | Mehta | |
| 2007/0005795 A1 | 1/2007 | Gonzalez | |
| 2007/0094312 A1 | 4/2007 | Sim-Tang | |
| 2007/0100919 A1 | 5/2007 | Lee et al. | |
| 2008/0104152 A1* | 5/2008 | Stephens | G06F 12/023 |
| 2008/0133615 A1 | 6/2008 | Bradshaw et al. | |
| 2008/0147705 A1* | 6/2008 | Bansal | G06F 12/0253 707/999.102 |
| 2009/0327372 A1 | 12/2009 | Ylonen | |
| 2010/0017447 A1* | 1/2010 | Jones | G06F 9/4881 707/E17.002 |
| 2010/0082886 A1 | 4/2010 | Kwon et al. | |
| 2010/0287216 A1 | 11/2010 | Ylonen | |
| 2010/0293206 A1 | 11/2010 | Ylonen | |
| 2011/0153931 A1 | 6/2011 | Bell et al. | |
| 2011/0208792 A1 | 8/2011 | Printezis et al. | |
| 2012/0191936 A1* | 7/2012 | Ebsen | G06F 12/0253 711/170 |
| 2012/0254266 A1 | 10/2012 | Printezis et al. | |
| 2012/0254267 A1 | 10/2012 | Printezis et al. | |

OTHER PUBLICATIONS

Soman et al. "Task-Aware Garbage Collection in a Multi-Tasking Virtual Machine" (hereinafter Soman). ISMM'06 Jun. 10-11, 2006, Ottawa, Ontario, Canada.

* cited by examiner

| | | |
|---|---|---|
| 0 | LGROUP 1 | (Pool 1) |
| 1 | LGROUP 1 | (Pool 2) |
| 2 | LGROUP 1 | (Pool 3) |
| 3 | LGROUP 2 | (Pool 4) |
| 4 | LGROUP 2 | (Pool 5) |
| 5 | LGROUP 2 | (Pool 6) |

LGROUP Table 110

FIG. 6C

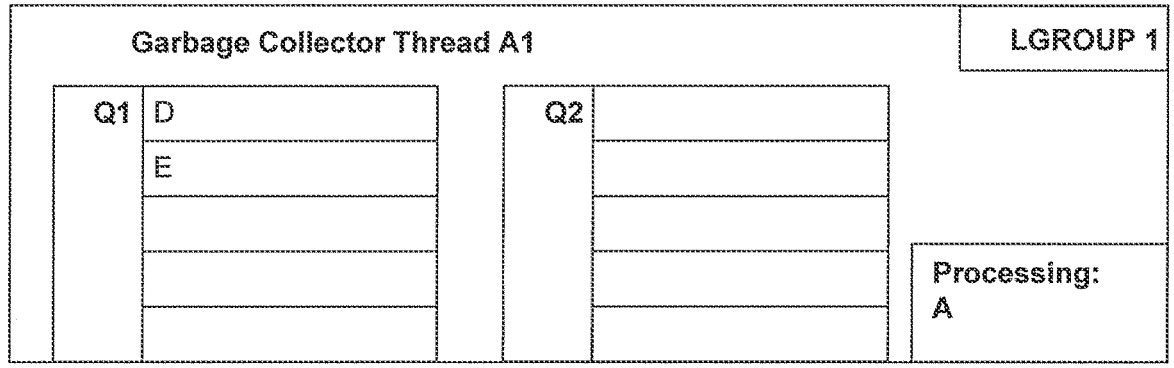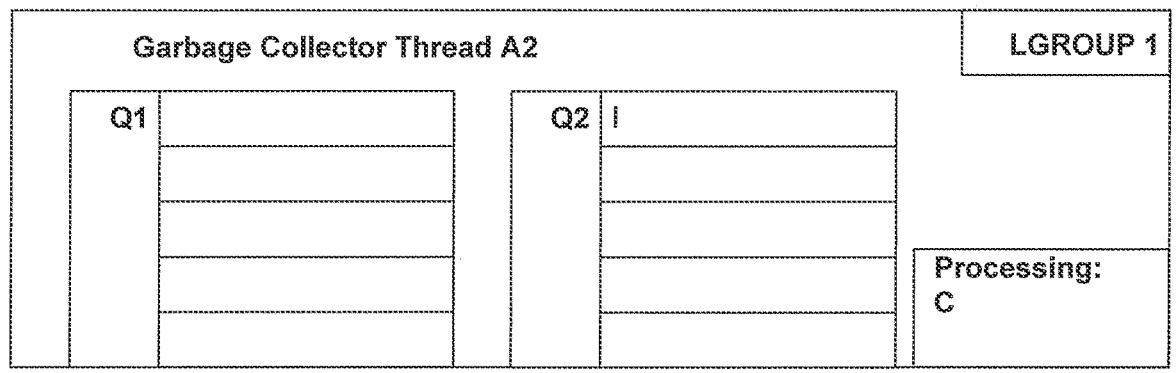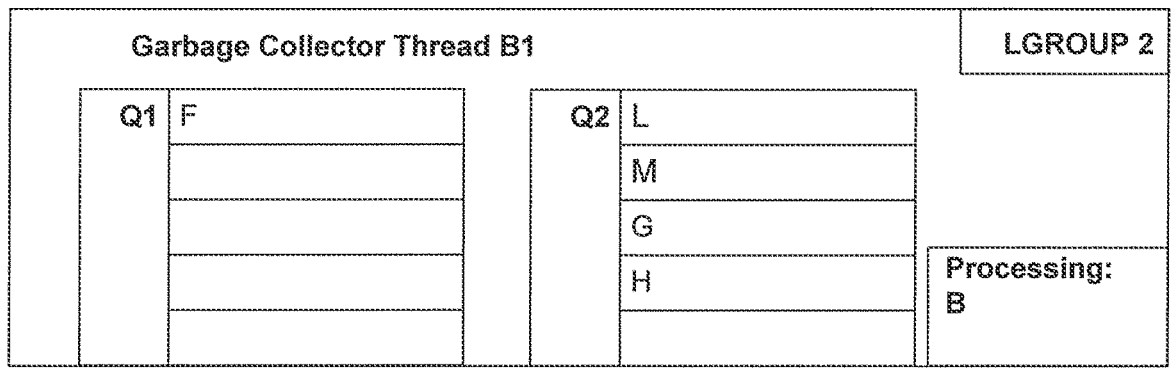
FIG. 6E(ii)

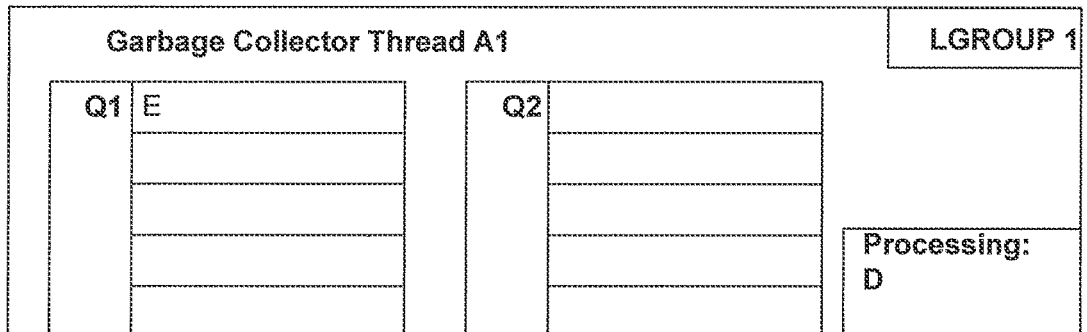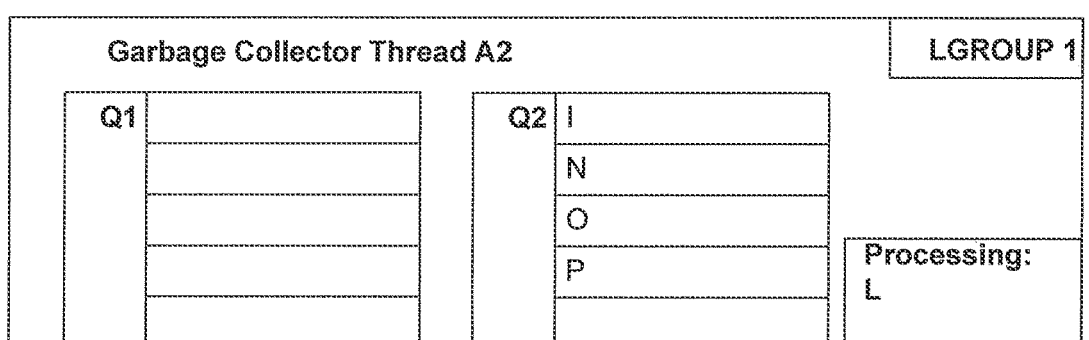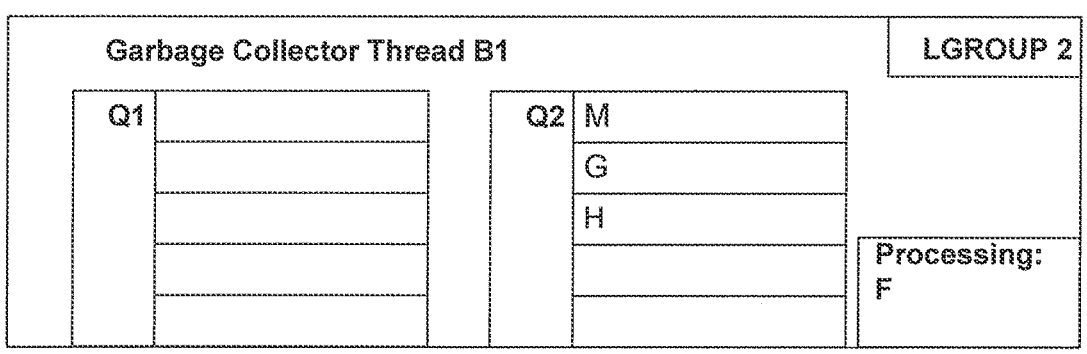
FIG. 6E(iii)

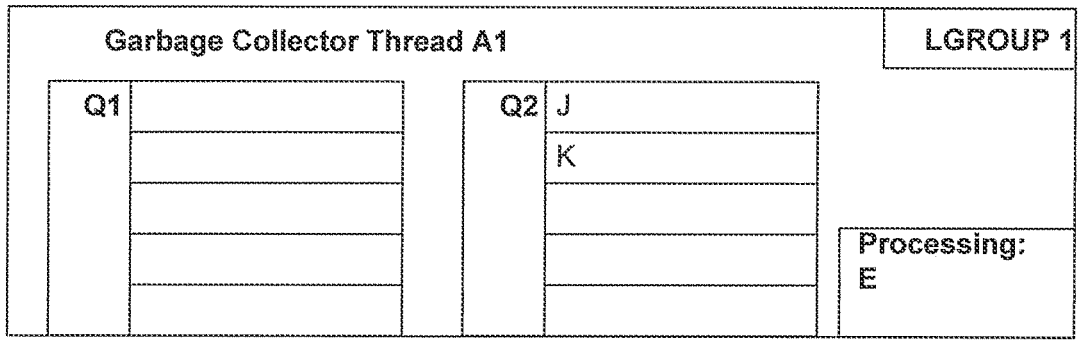
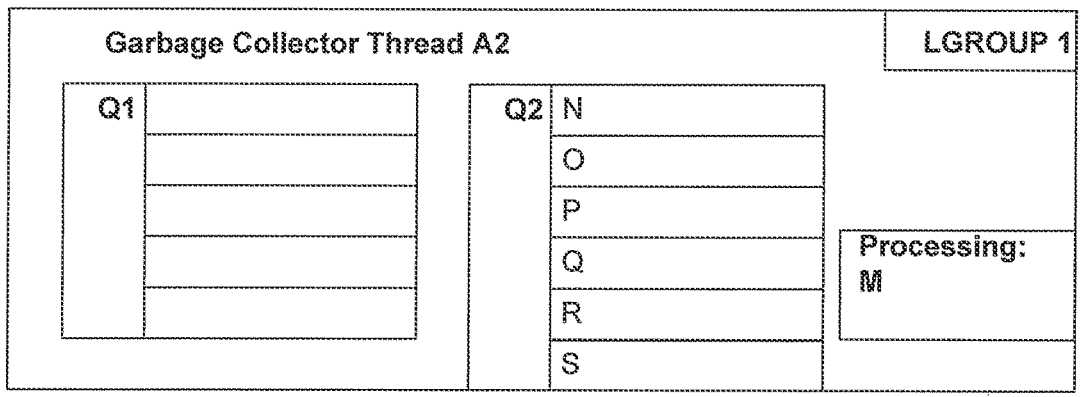
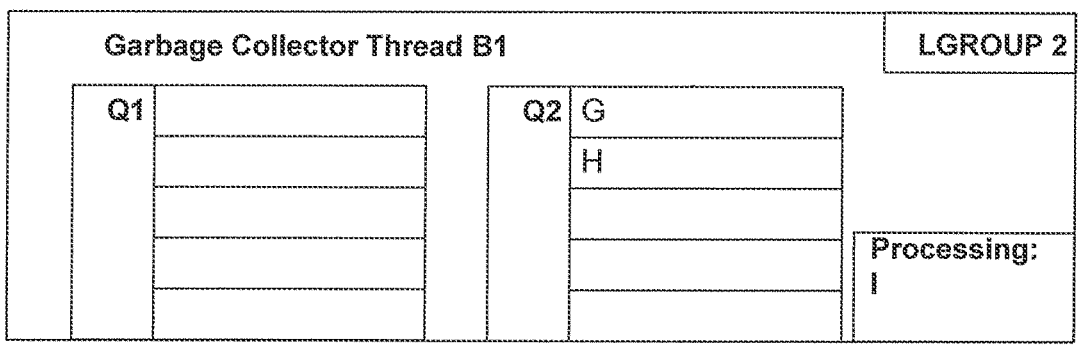
FIG. 6E(iv)

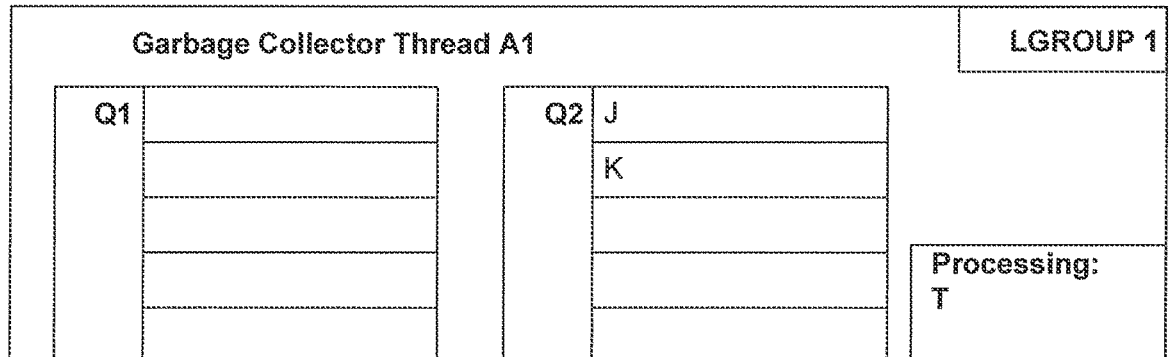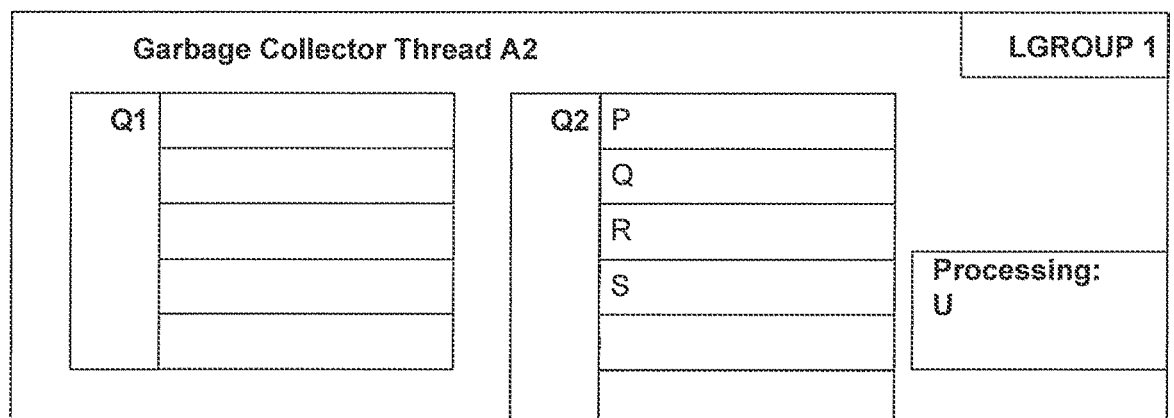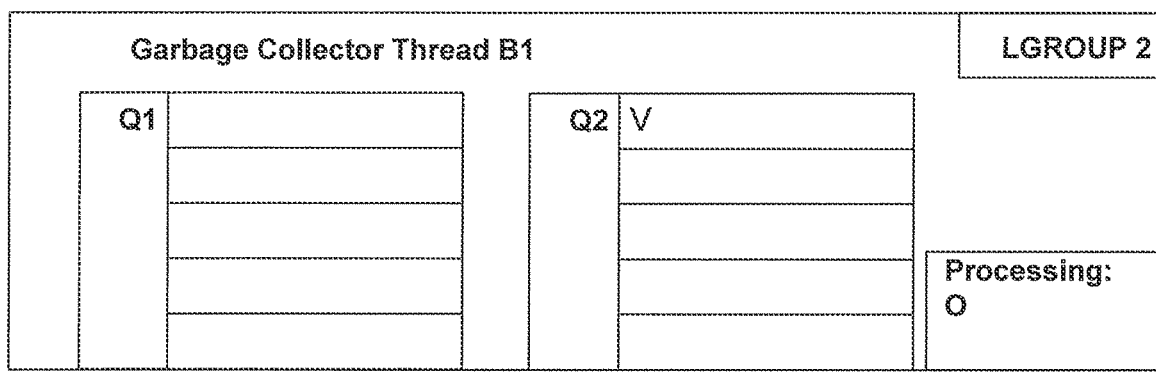
FIG. 6E(vi)

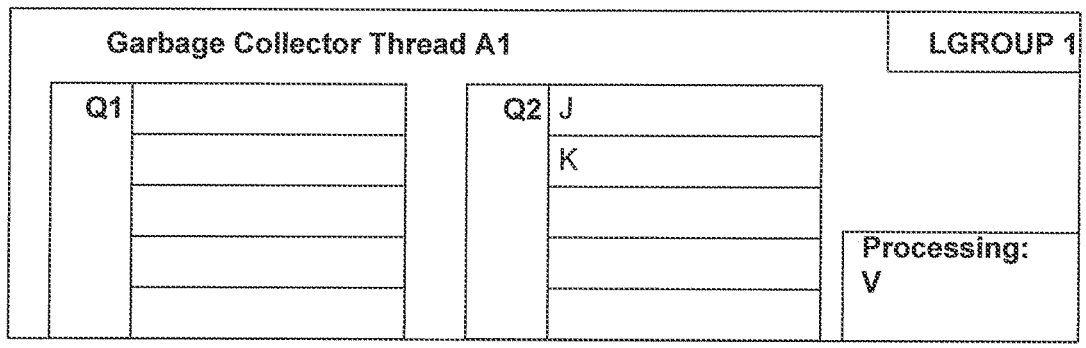
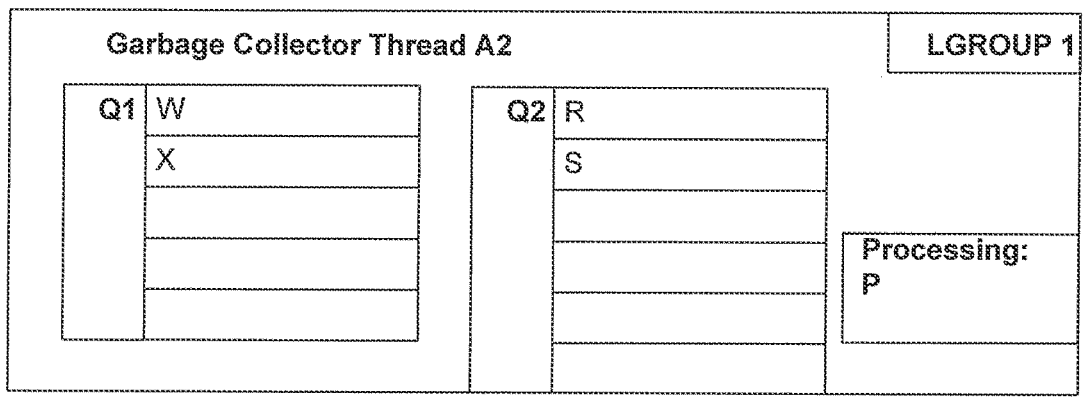
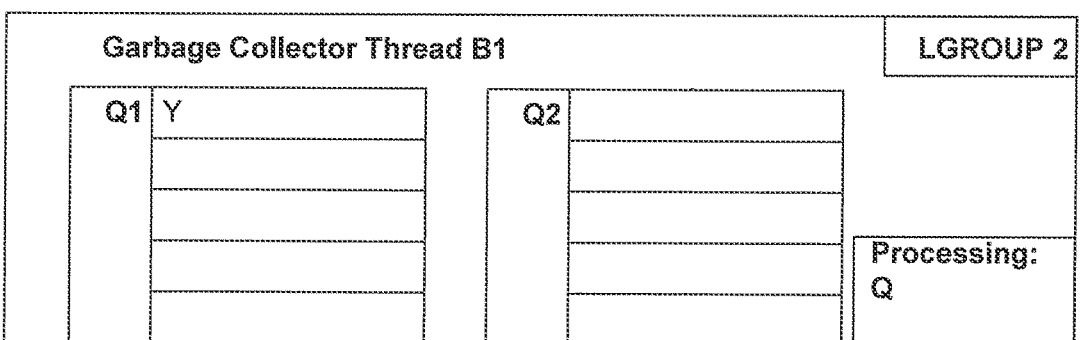
FIG. 6E(vii)

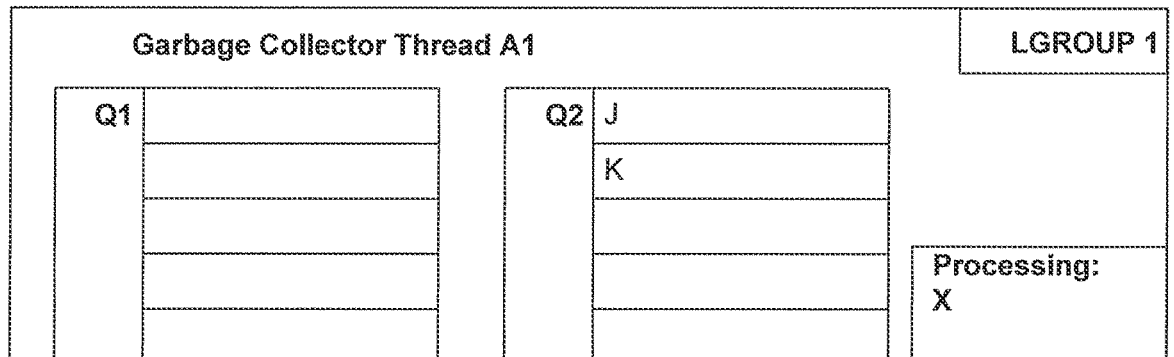
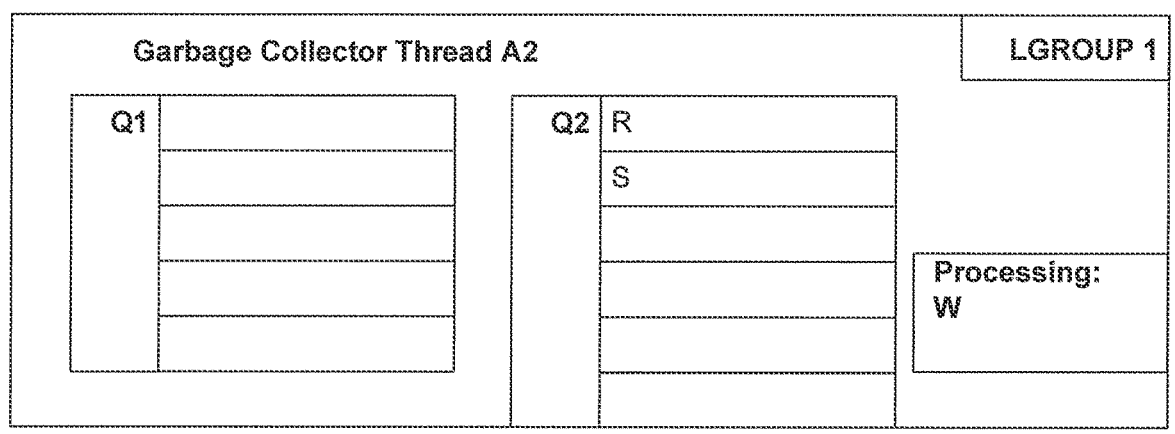
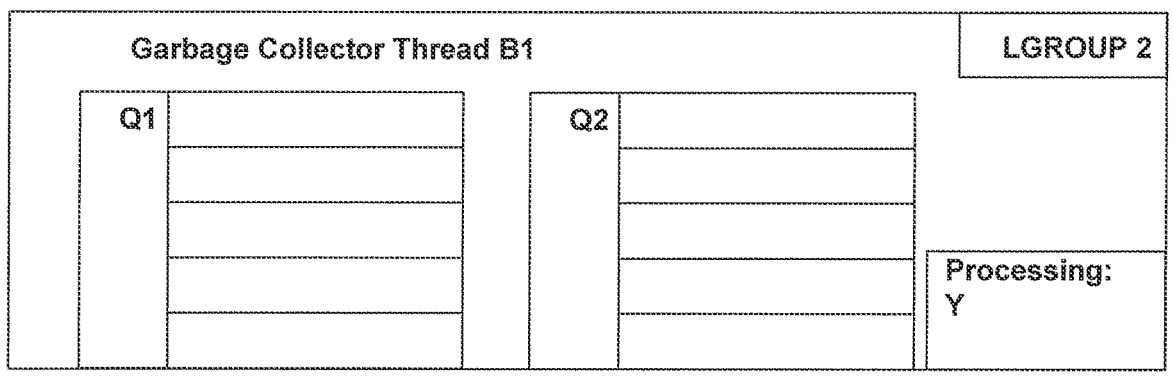
FIG. 6E(viii)

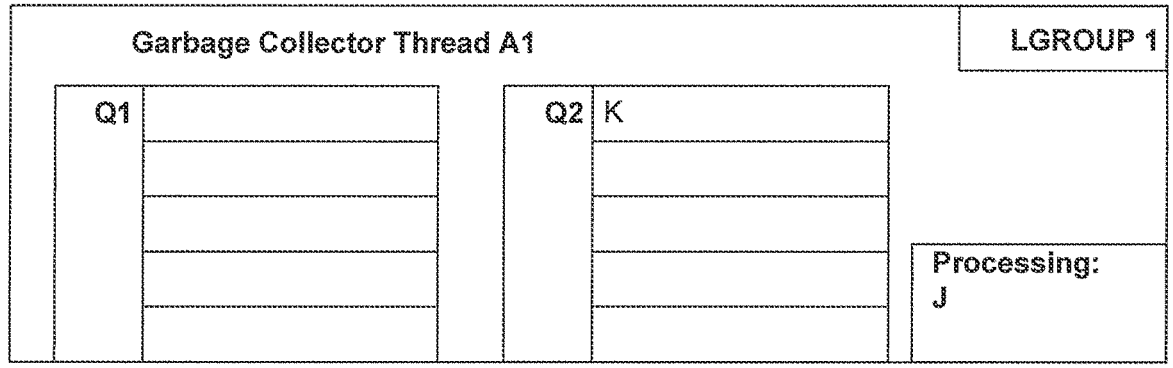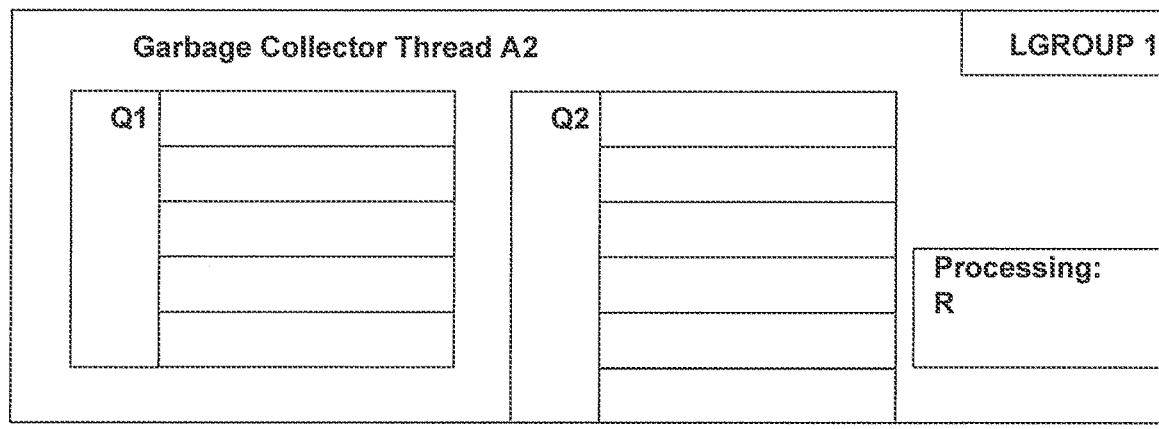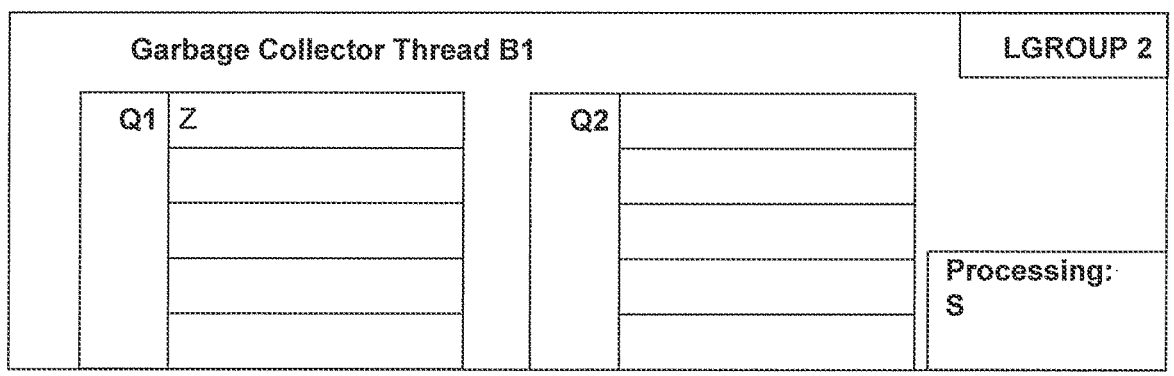
FIG. 6E(ix)

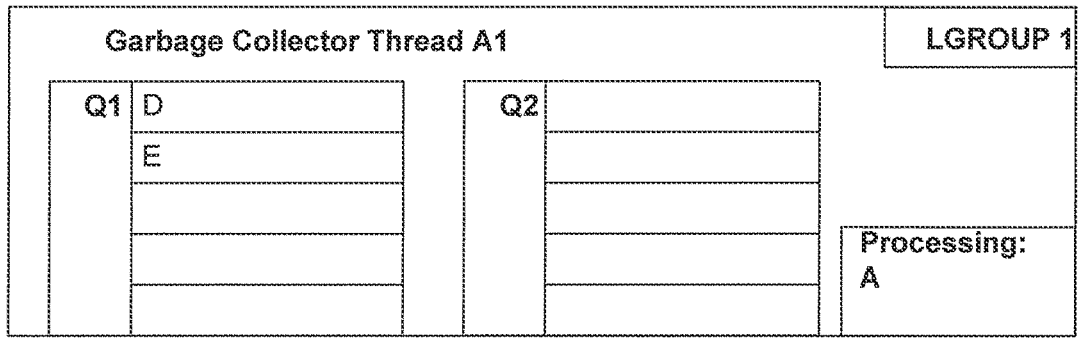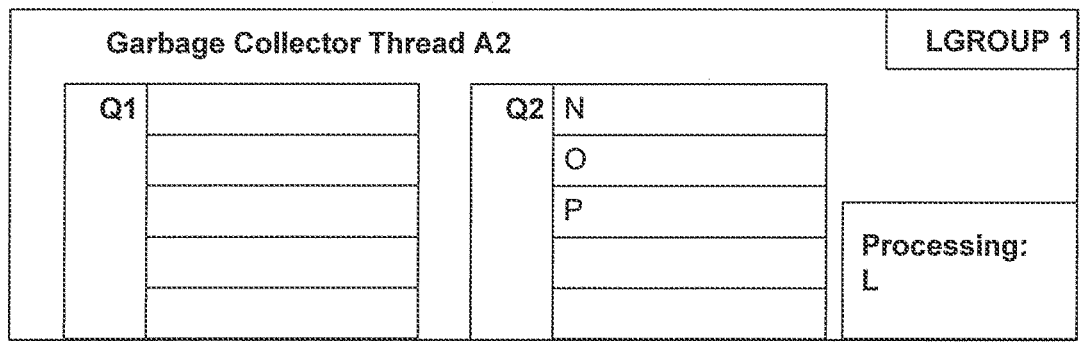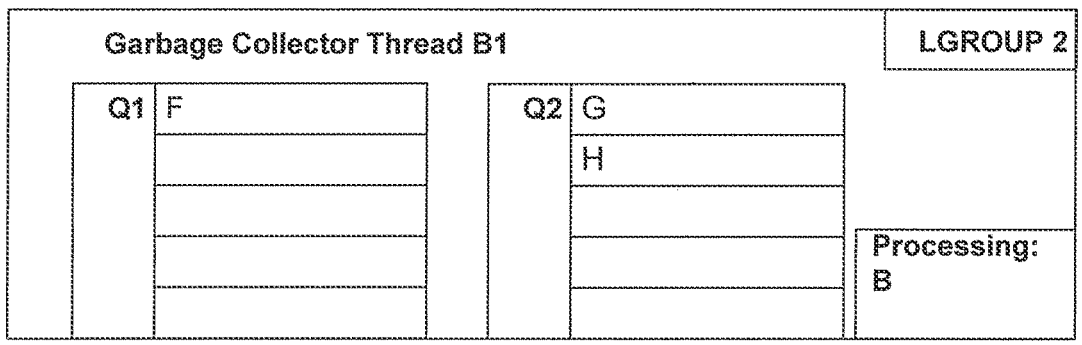
FIG. 6F(ii)

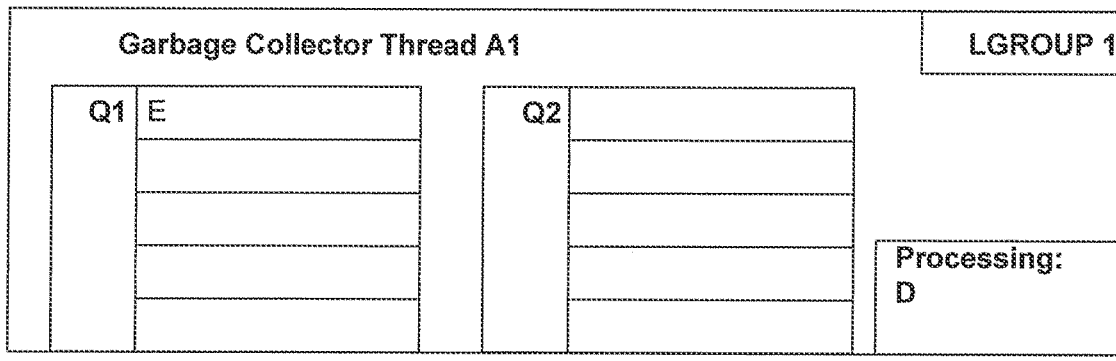
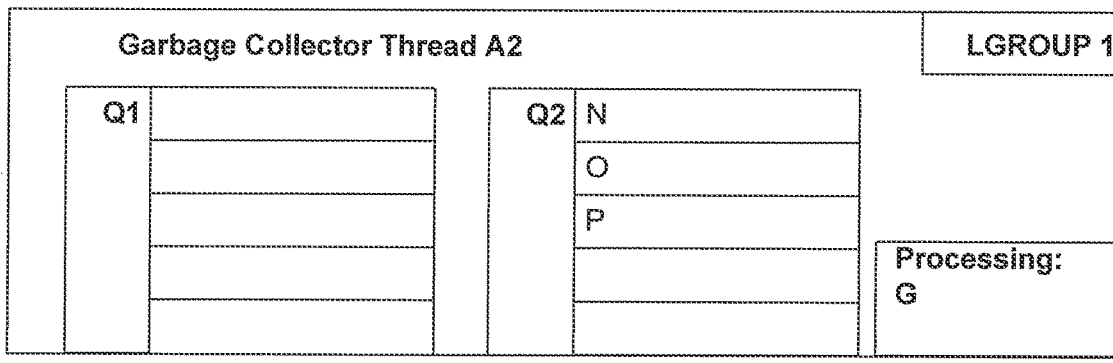
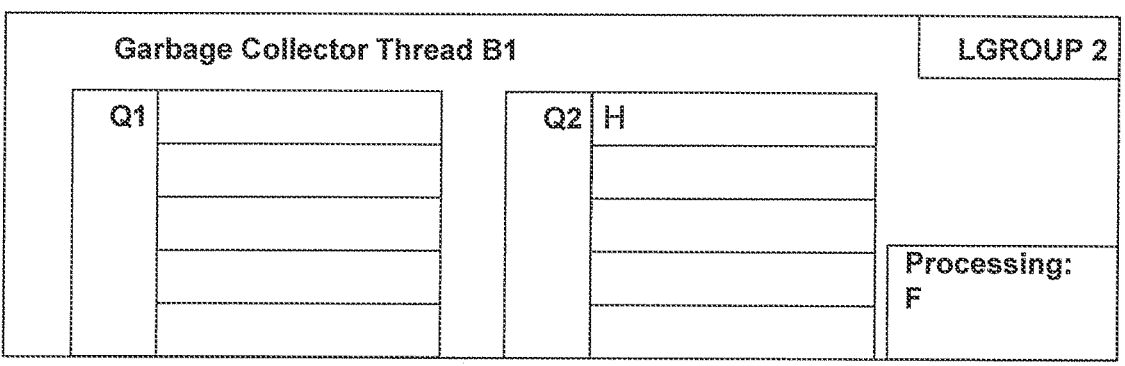
FIG. 6F(iii)

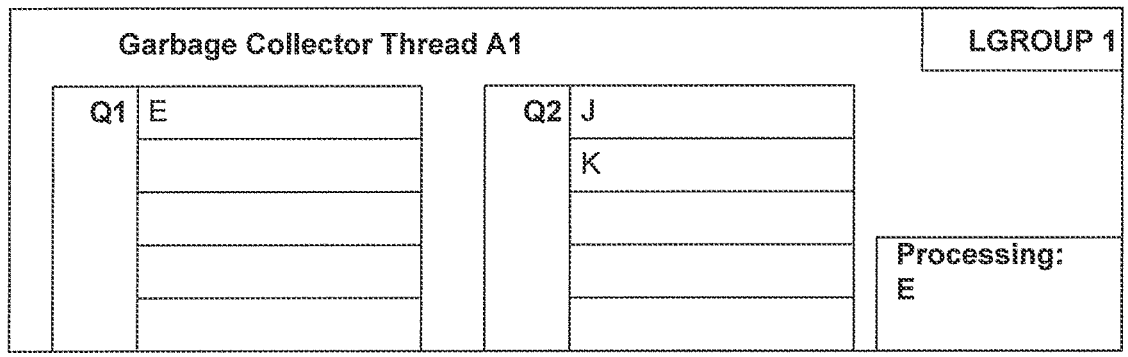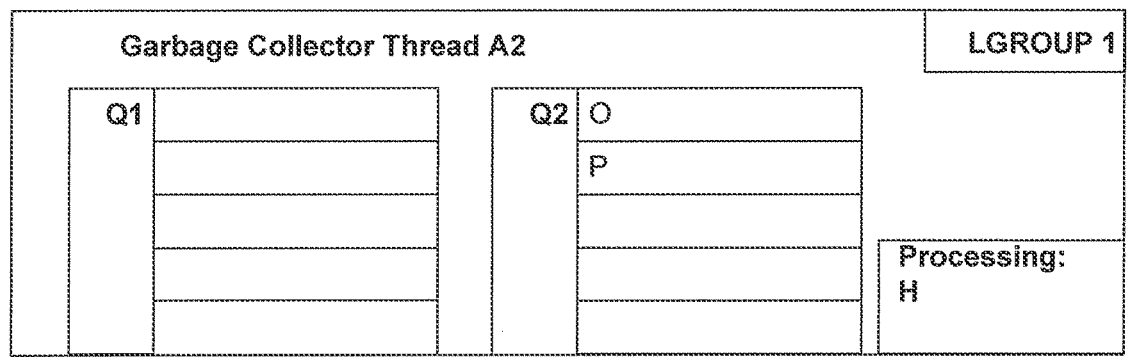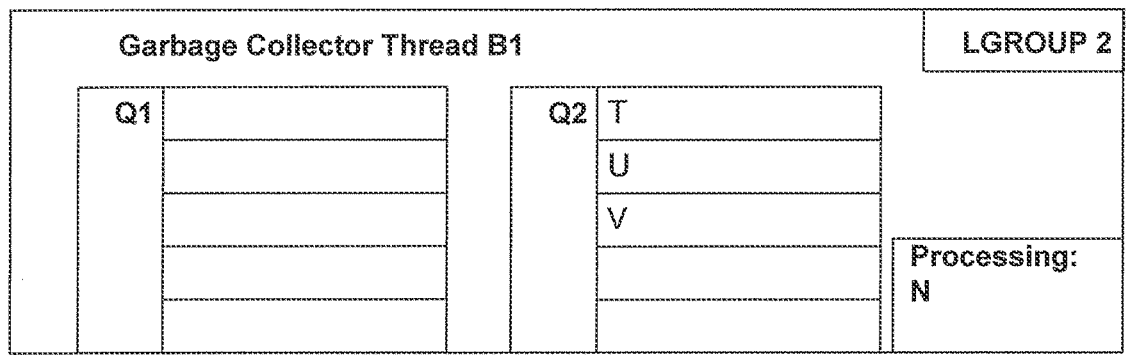
FIG. 6F(iv)

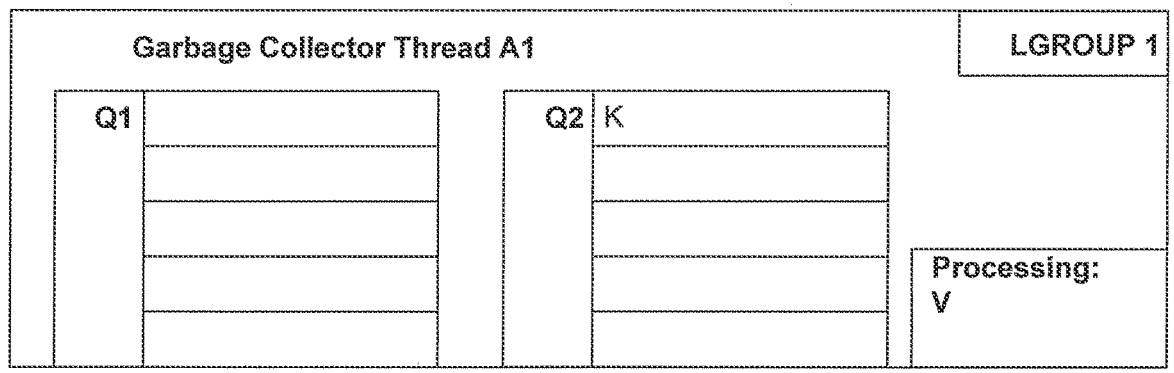
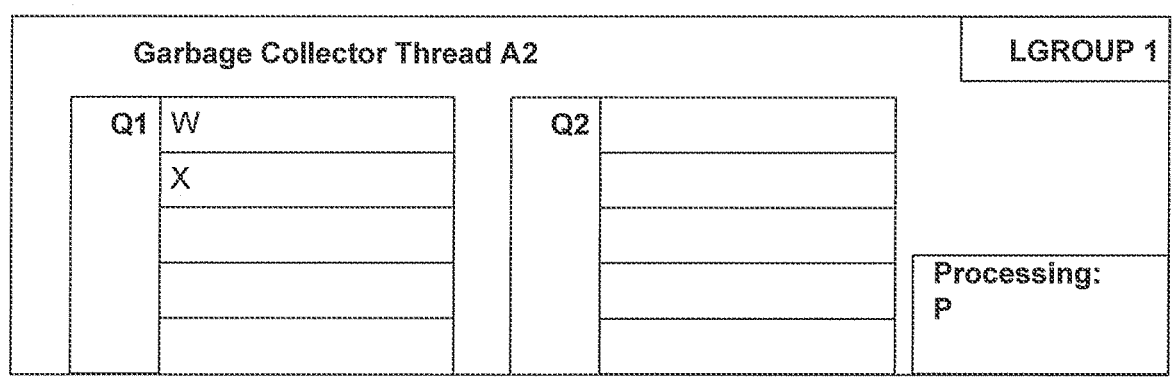
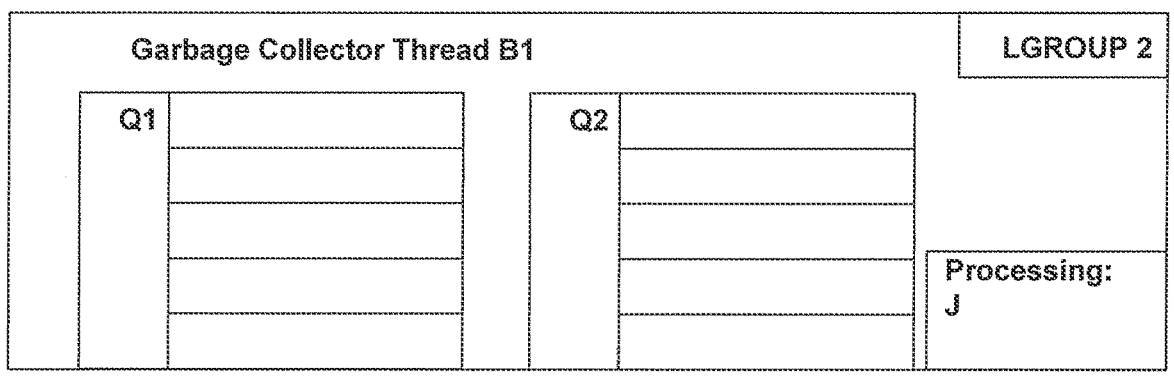
FIG. 6F(vi)

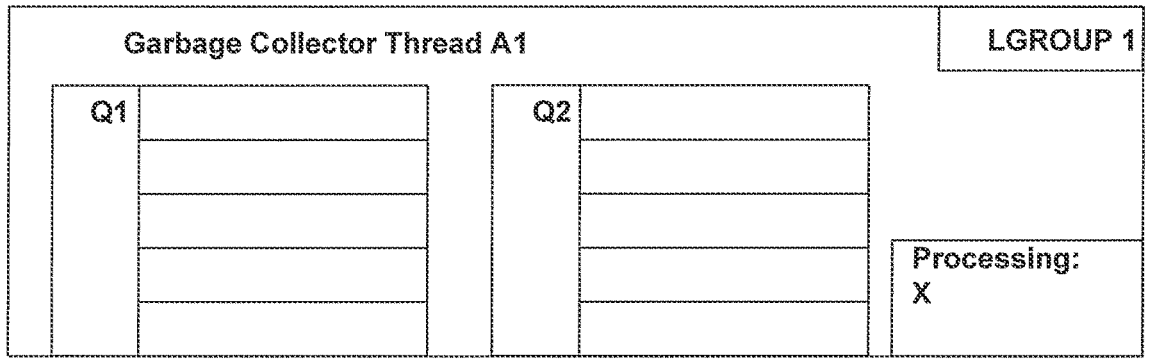
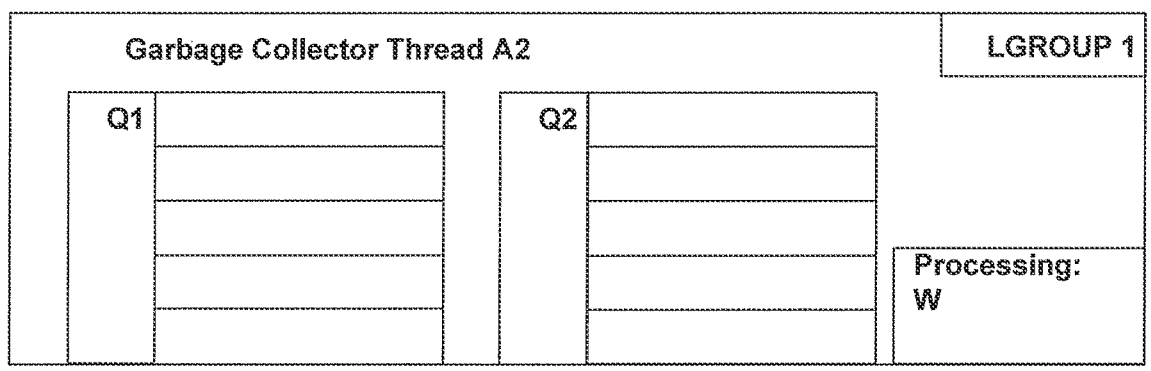
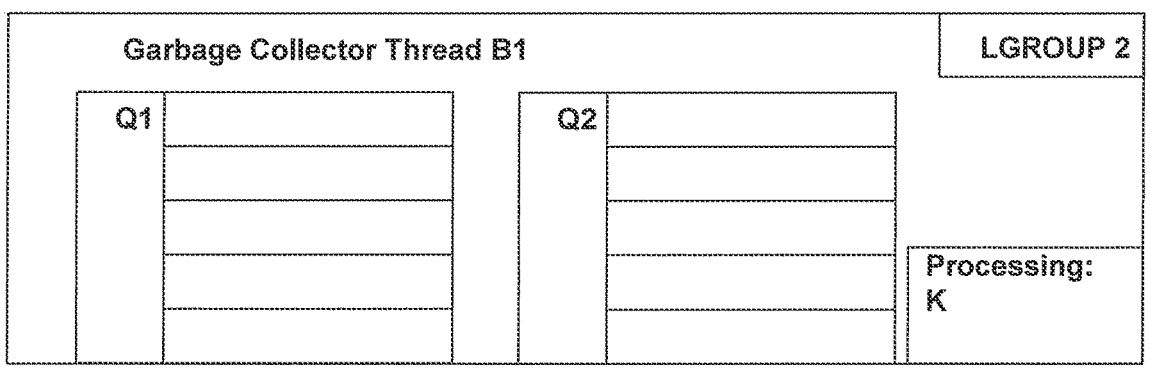
FIG. 6F(vii)

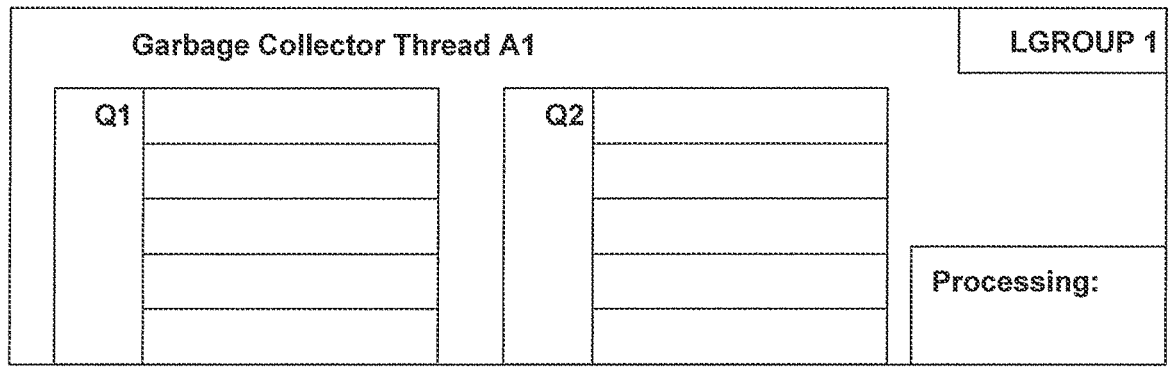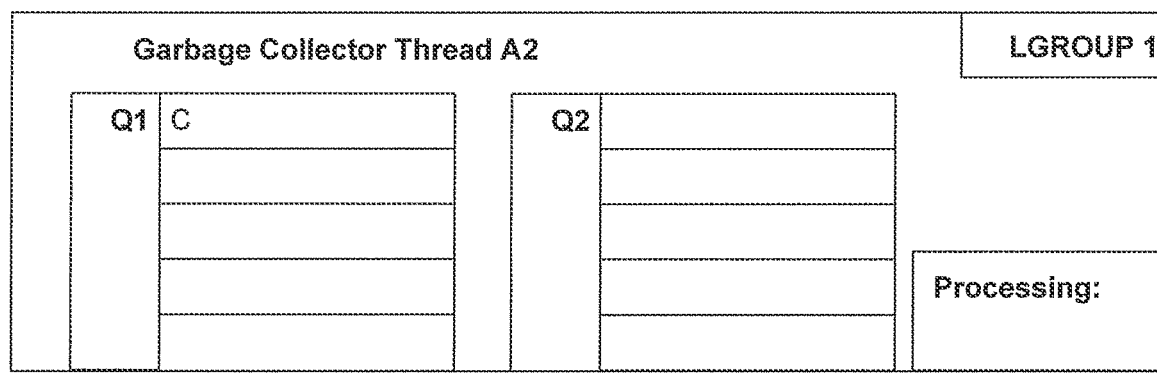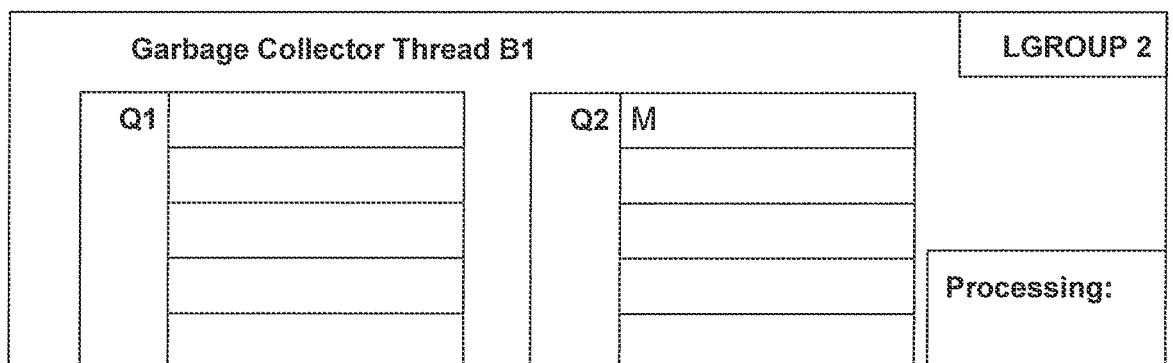
FIG. 6F(viii)

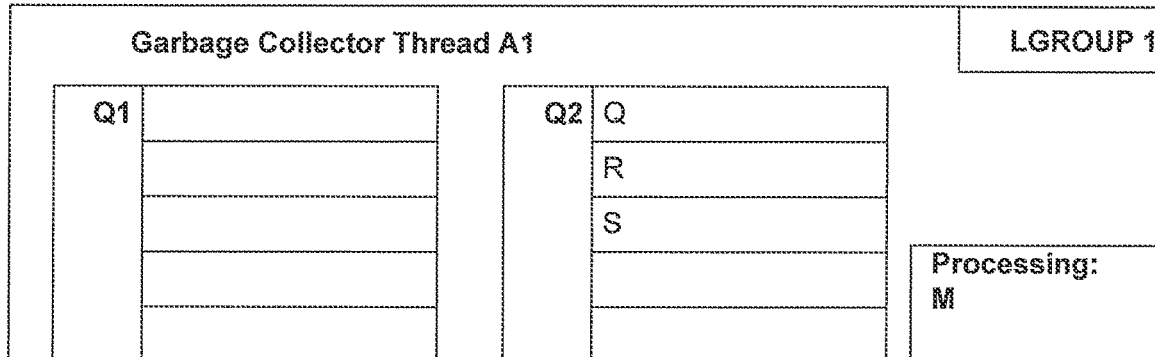
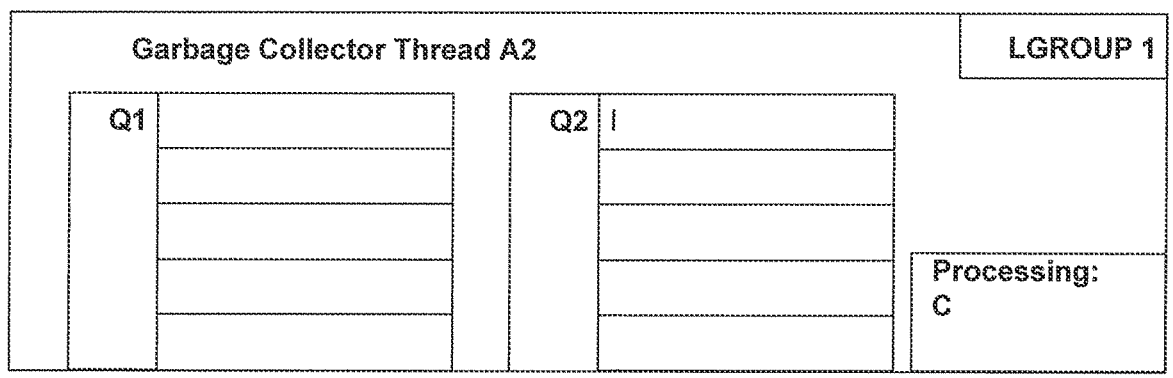
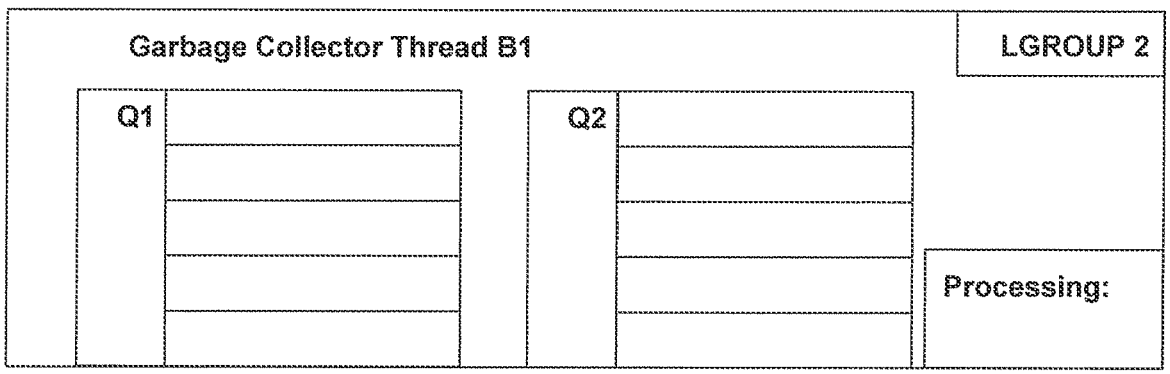
FIG. 6F(ix)

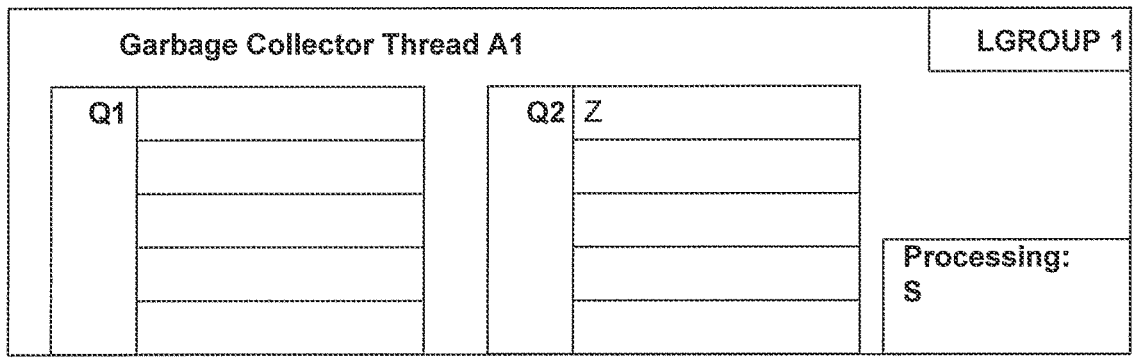
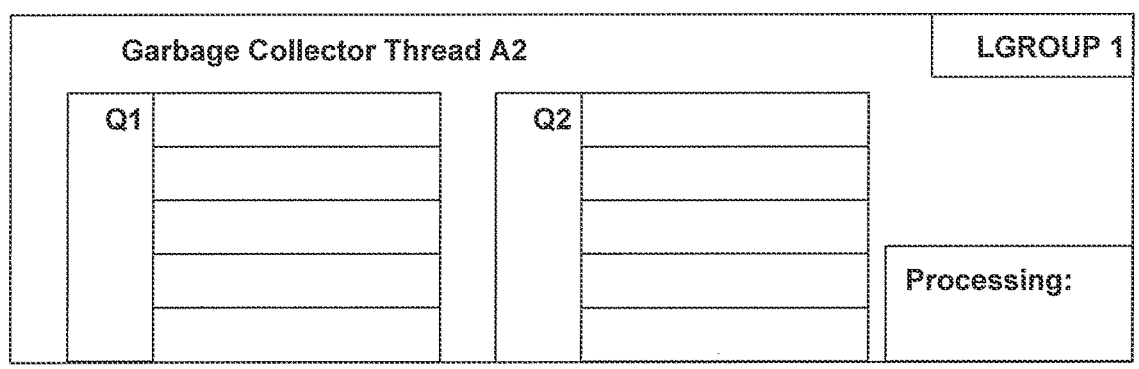
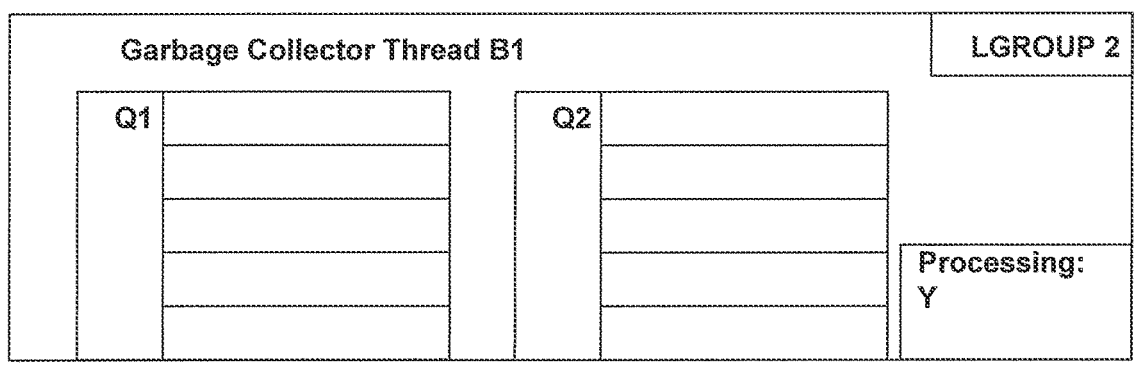
FIG. 6F(xi)

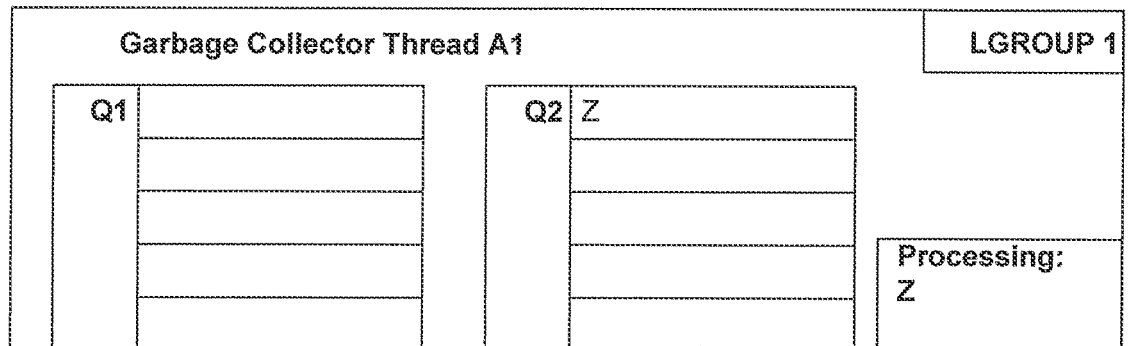
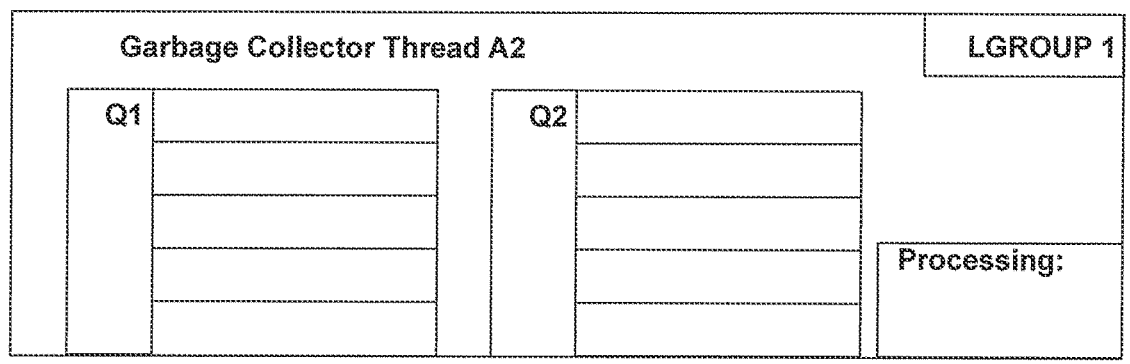
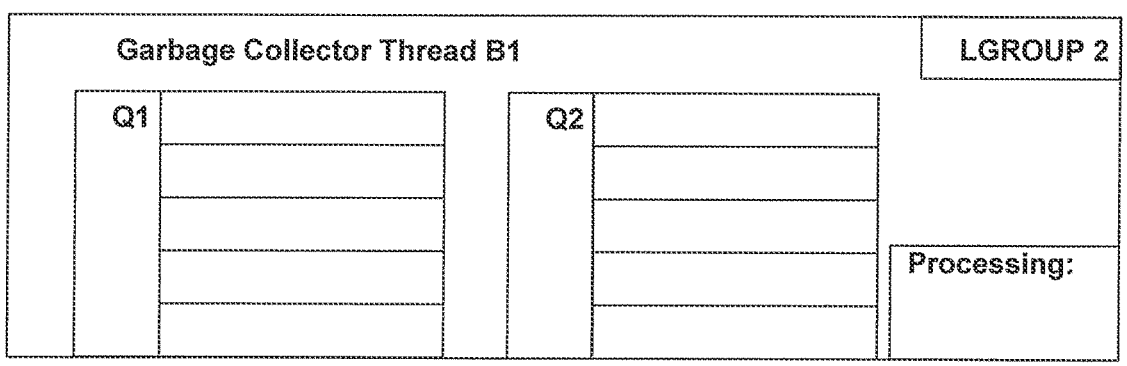
FIG. 6F(xii)

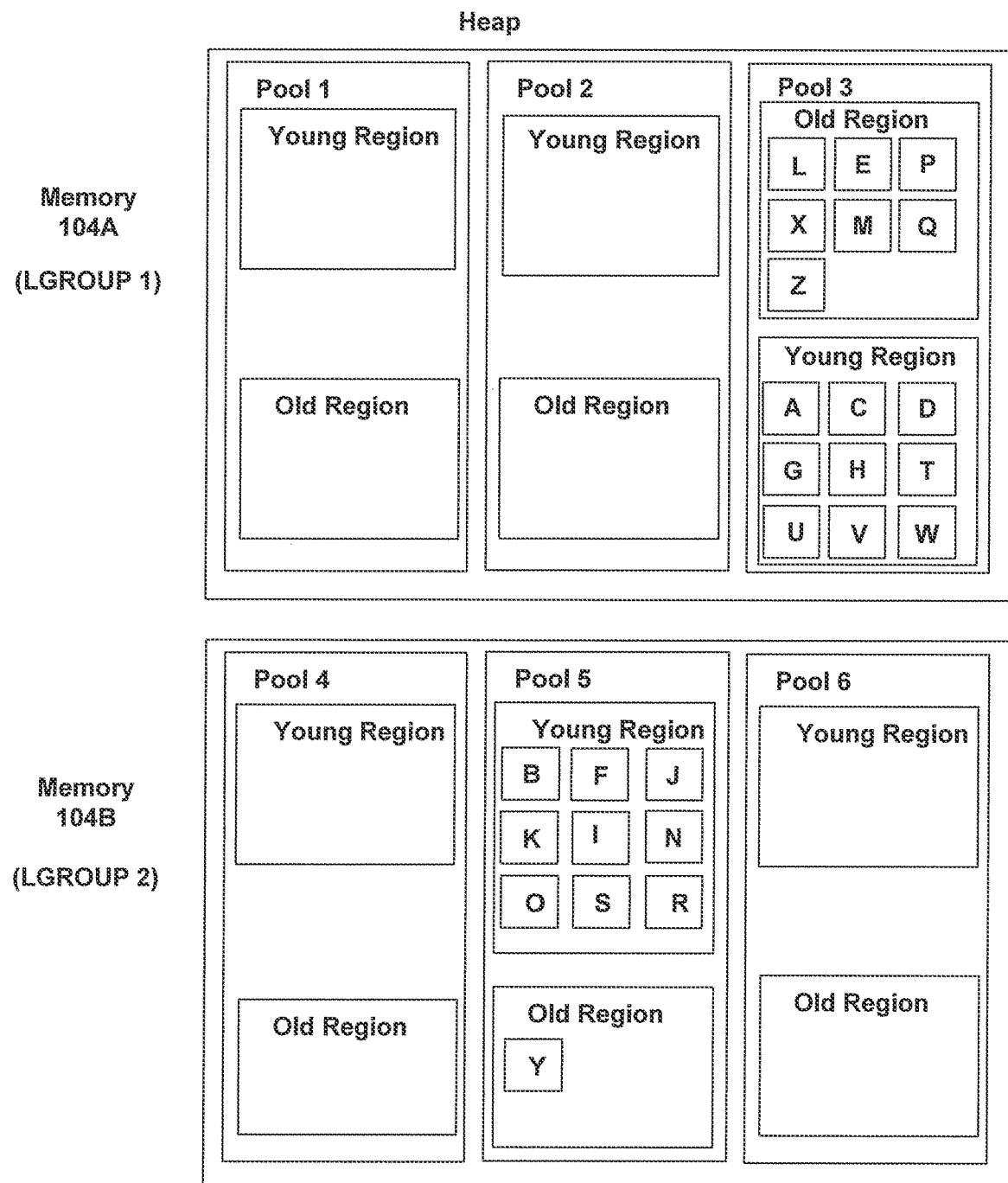
FIG. 6G(ii)

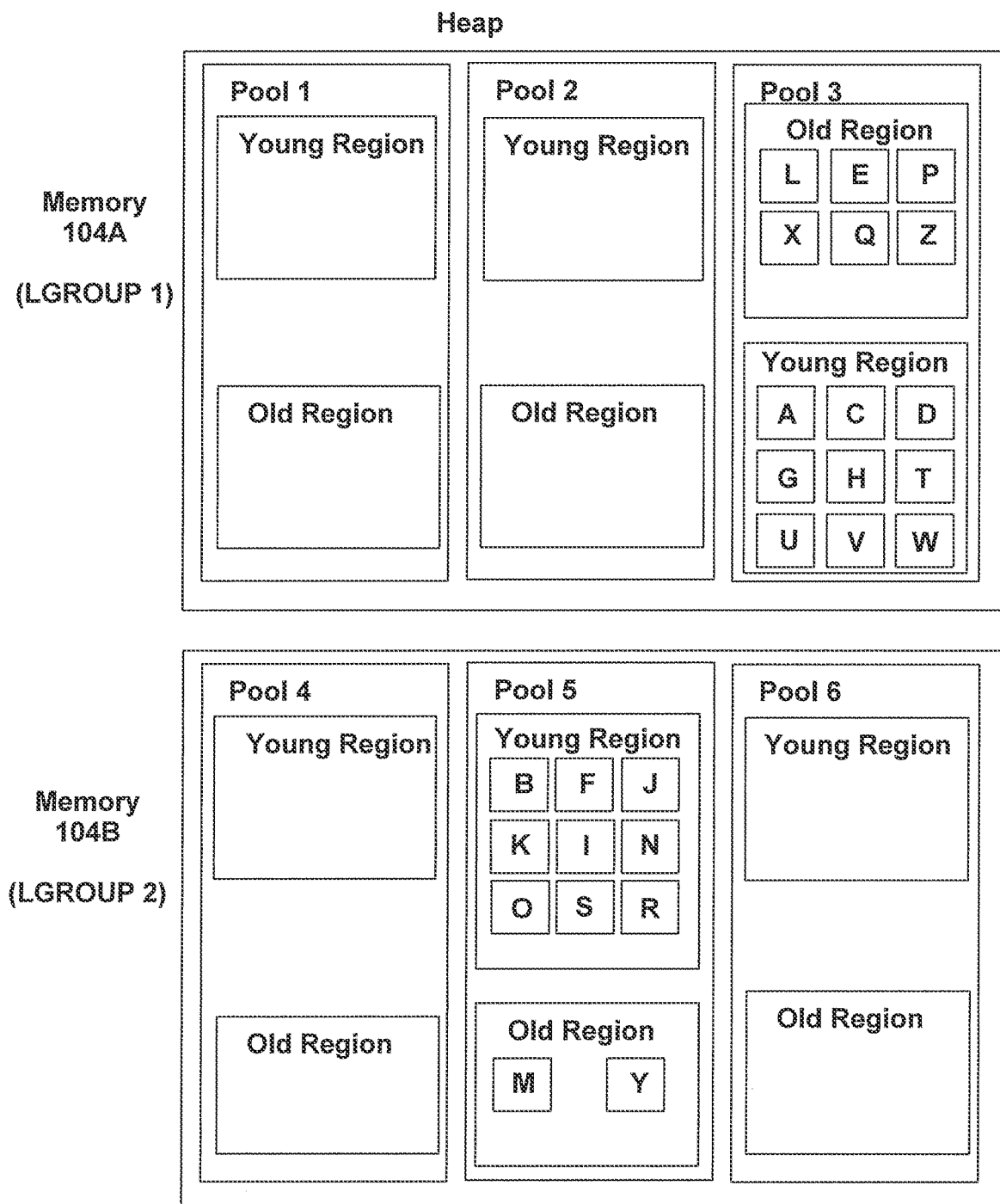
FIG. 6G(iii)

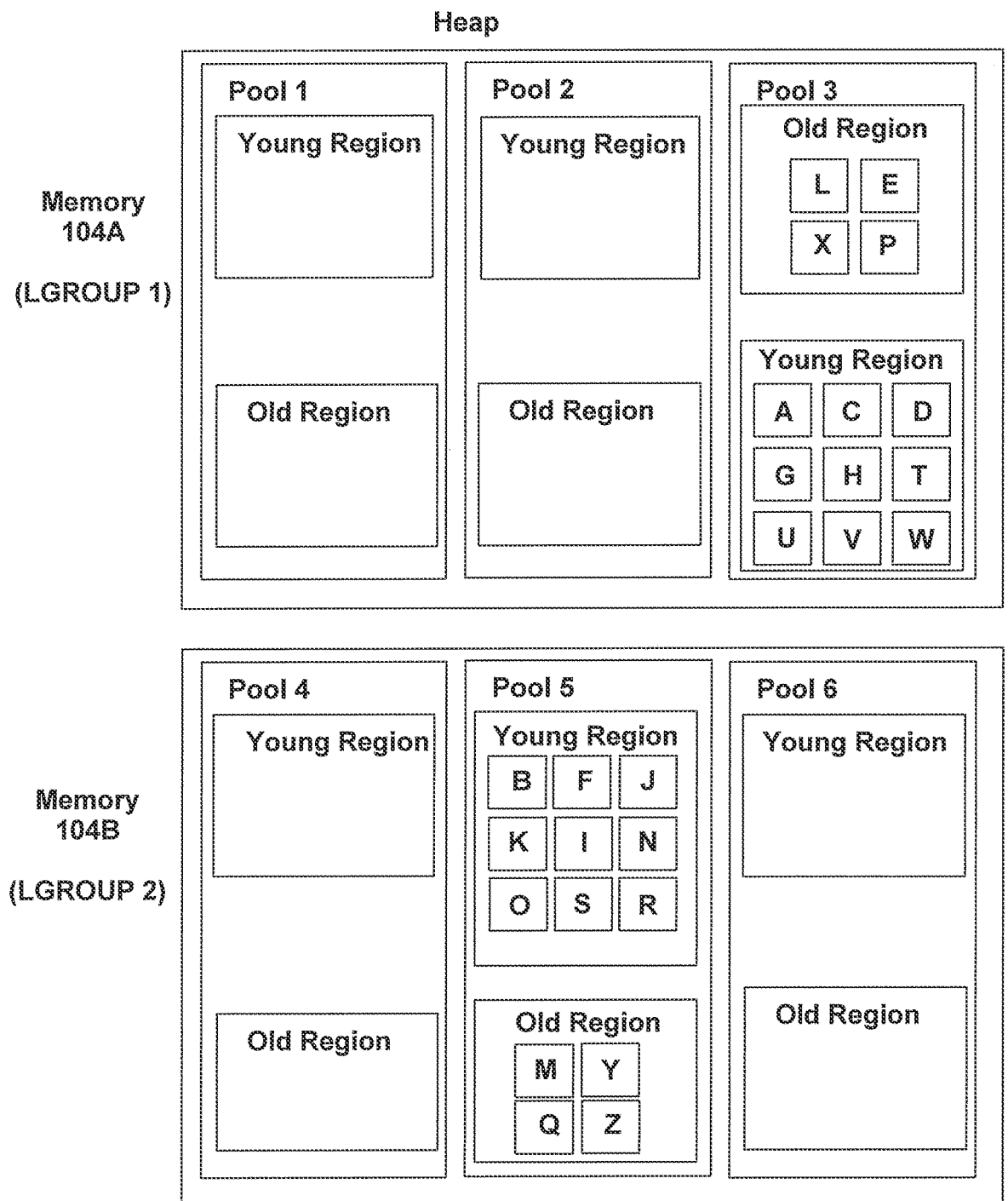
FIG. 6G(iv)

NUMA-AWARE GARBAGE COLLECTION

INCORPORATION BY REFERENCE; DISCLAIMER

The following application is hereby incorporated by reference: application Ser. No. 13/077,619 filed on Mar. 31, 2011. The Applicant hereby rescinds any disclaimer of claim scope in the parent application(s) or the prosecution history thereof and advises the USPTO that the claims in this application may be broader than any claim in the parent application(s).

FIELD OF THE INVENTION

This invention relates generally to memory management, and more specifically to non-uniform memory access (NUMA) aware garbage collection.

BACKGROUND

Memory is generally allocated for a program during execution from a pool of a memory area called a heap. Garbage collection is a form of memory management for programs. During execution, the garbage collector attempts to identify memory allocated to objects that are not in use by the program, so that they may be deallocated (also referred to as "reclaimed"). An object may be in use by the program, or reachable, if the object can be accessed (also referred to as "reached") by the program's current state. Since the precise allocation of space in the heap to objects is not known in advance, the memory allocated to objects cannot be accessed via the actual address of the memory. Rather, the memory may be accessed indirectly by the program utilizing references. An object is reachable if it is referenced by a local variable or parameter in a currently invoked function or a global variable, or is referenced by a reachable object. The garbage collector deallocates memory allocated to objects that are no longer reachable. It must not deallocate memory occupied by objects that are still reachable.

For non-uniform memory access (NUMA) computing devices, the cost of memory accesses by processing units (as well as hardware threads, cores, and so on) is not constant. Rather, in such computing devices, the cost of memory access depends on whether the memory is local or remote to a particular processing unit. In such computing devices, a first memory may be classified as local to a particular processing unit and a second classified as remote when the particular processing unit is able to access the first memory faster than the second memory.

An "lgroup" (locality group) is a group of processing units (and/or hardware threads, cores, and so on) and memory in a NUMA computing device for which all memory accesses are local. Memory access from a processing unit in one lgroup to memory of another lgroup would result in a remote, and hence slower, access. Lgroups may correspond to a single processing unit socket and the m mory attached to it, multiple processing units and memories attached to a single printed circuit board when the computing device includes multiple printed circuit boards each with one or more processing units and memories, multiple computing devices arranged in a cloud computing configuration, and so on.

Maximization of local memory accesses (i.e., keeping memory accesses within an lgroup as much as is possible) and minimizing remote memory accesses may improve overall system performance and efficiency. Typically, approaches to maximizing local memory accesses and minimizing remote memory accesses in NUMA computing devices deal with optimizing accesses by application threads. Overall system performance and efficiency may be improved by maximizing local memory accesses and minimizing remote memory accesses in NUMA computing devices for garbage collector threads.

SUMMARY

In some embodiments, a young object is accessed from a source region of a first pool by a garbage collector thread. The first pool is associated with a lgroup. A processing unit and a memory are in communication with and local to a processing unit being grouped in the lgroup. The first pool is deployed within heap space of the memory. Space is allocated for the young object in a survivor region associated with a second pool. The second pool is associated with the same lgroup. The young object is copied to the allocated space in the survivor region associated with the second pool.

In some embodiments, an object is accessed from a source region of a first pool by a garbage collector thread. The first pool is associated with a lgroup among. A processing unit and a memory in communication with and local to the processing unit being grouped in the lgroup. The first pool is deployed within heap space of the memory. The garbage collector thread is associated with a second pool associated with a different lgroup. Space is allocated for the object in an old region associated with the second pool. The object is copied to allocated space in the old region associated with the second pool.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood and its numerous features made apparent to those skilled in the art by referencing the accompanying drawings.

FIG. 6C is a block diagram illustrating an example lgroup table for the pools illustrated of FIG. 6B;

FIG. 6G(ii) is a block diagram illustrating the heap space shown in FIGS. 6G(i) after the processing shown in FIGS. 6F(i) through 6F(xii) where the processing is a first example of a region based copying garbage collection cycle;

FIG. 6G(iii) is a block diagram illustrating the heap space shown in FIG. 6G(i) after the processing shown in FIGS. 6F(i) through 6F(xii) where the processing is second example of a region based copying garbage collection cycle;

FIG. 6G(iv) is a block diagram illustrating a more balanced version of the heap space shown in FIG. 6G(iii);

DETAILED DESCRIPTION

The present disclosure describes systems and methods for non-uniform memory access aware garbage collector thread processing. In some implementations, a heap space is divided into pools and garbage collector threads include one or more separate queues for objects contained in pools of local and remote lgroups. In such implementations, the garbage collector threads maximize local memory accesses and minimize remote memory accesses by ordered processing of the separate queues. In various implementations, a heap space is divided into pools, which are further divided into regions. In such implementations, garbage collector threads maximize local memory accesses and minimize remote memory accesses by copying Young objects to pools of the same lgroup as the previous containing pool and Old objects to pools of the same lgroup as the respective garbage collector thread. In these ways, overall system performance and efficiency may be improved by maximizing local memory accesses and minimizing remote memory accesses for the garbage collector threads. In addition, copying Young objects to pools of the same lgroup as the previous containing pool causes these objects to be retained in the same lgroup as the allocating thread.

Figure 1:
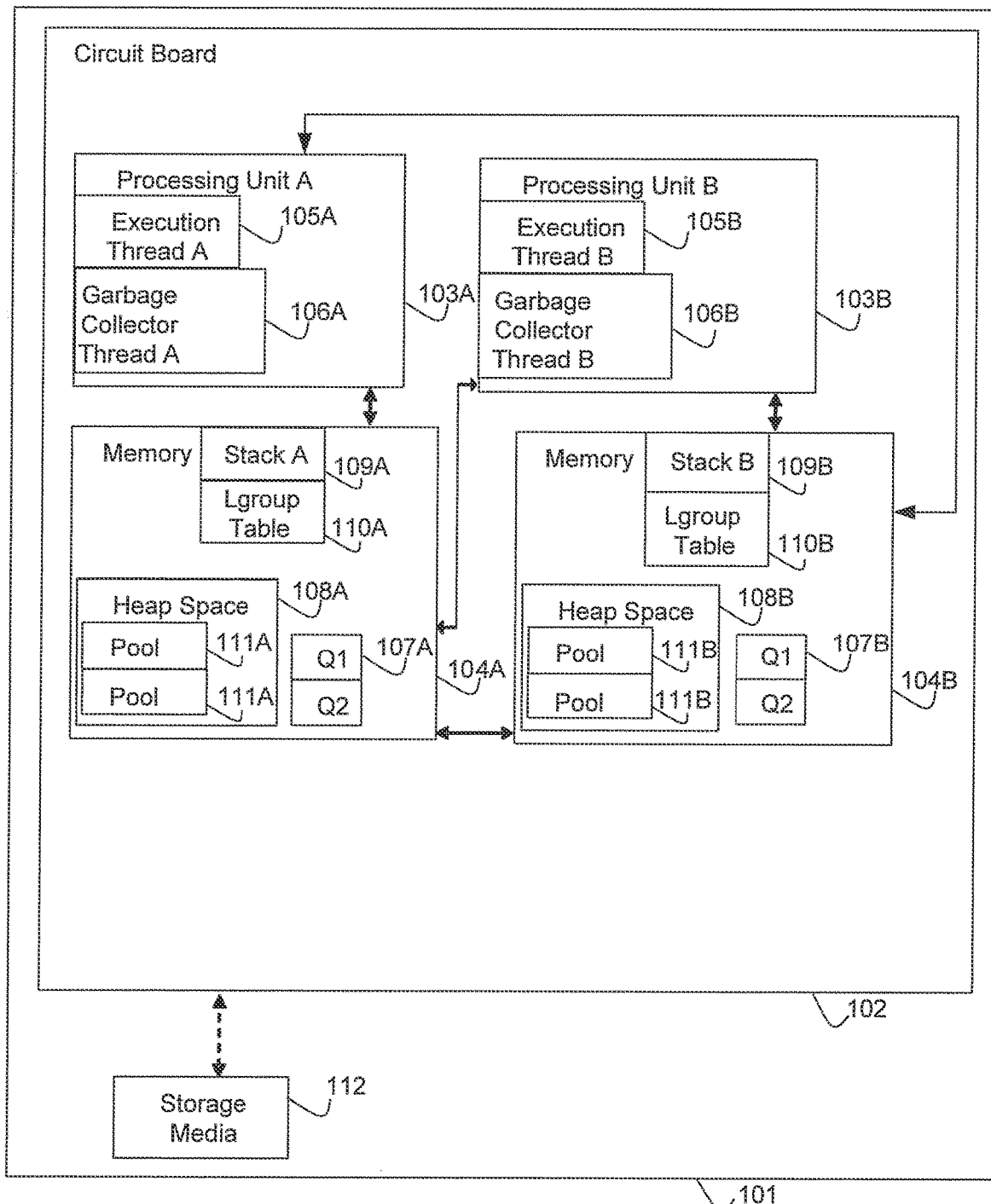
FIG. 1 is a block diagram illustrating a first example system for non-uniform memory access aware garbage collector thread processing, in accordance with an embodiment of the present disclosure.

FIG. 1 illustrates a first example of a system 100 for non-uniform memory access aware garbage collector thread processing, in accordance with an embodiment of the present disclosure. The system 100 has a computing device 101 which includes a circuit board 102. The circuit board 102 includes two processing units 103A and 103B which are coupled to two memories 104A and 104B.

The processing units 103A and 103B are both operable to access memories 104A and 104B. However, in this first example, the processing unit 103A is operable to access the memory 104A faster than the memory 104B and similarly the processing unit 103B is operable to access the memory 104B faster than the memory 104A. Thus, the memory 104A is defined as local to the processing unit 103A and remote to the processing unit 103B and the memory 104B is defined as local to the processing unit 103B and remote to the processing unit 103A. As such, the processing unit 103A and the memory 104A are grouped into a first lgroup and the processing unit 103B and the memory 104B are grouped into a second lgroup.

The processing units 103A and 103B are each configured to execute instructions implementing any number of execution threads 105A and 105B of possible programs as well as garbage collector threads 106A and 106B. Each garbage collector thread may be assigned to the same lgroup as the respective processing unit that executes the garbage collector thread. As illustrated, the memories 104A and 104B include a heap space 108A and 108B for the programs related to the execution threads 105A and 105B. The heap spaces 108A and 108B are divided into a number of pools 111A and 111B that are assigned to the same lgroup as the respective memory that contains the pool.

The processing units 103A and 103B may process instructions that operate to maximize accesses to memories in the same lgroup as the respective processing unit and minimize accesses to memories in other lgroups to reduce latency and improve overall system performance and efficiency. The garbage collector threads 106A and 106B are each associated with a number of queues 107A and 107B located in the memory 104A and 104B respectively. As illustrated, the garbage collector threads 106A and 106B are associated with a local queue Q1 for objects contained in pools assigned to the same lgroup as the respective garbage collector thread and a remote queue Q2 for objects contained in pools assigned to different lgroups than the respective garbage collector thread, although in various implementations the garbage collector threads 106A and 106B may include a remote queue Q2 for each lgroup other than the lgroup of the respective garbage collector thread. Each garbage collector thread may process the queues in an ordered sequence to maximize accesses to the garbage collector threads lgroup and minimize accesses to other lgroups. The processing of the queues may be part of one or more garbage collection cycles, one or more marking cycles, and so on.

When a garbage collector thread queues an object, the garbage collector thread may determine the lgroup of the pool that contains the object and add the object to the local queue Q1 if the lgroup of the pool is the same as the lgroup of the garbage collector thread or the remote queue Q2 if the lgroup of the pool is different than the lgroup of the garbage collector thread. The garbage collector thread may determine the lgroup of the pool that contains the object by constructing and referencing an lgroup table. The lgroup table may be a coarse granularity table that includes an lgroup entry for each of the pools. The garbage collector thread may reference the lgroup table by computing an index from the address of the object and mapping that index to the lgroup table.

For example, each pool may be 4000 kilobytes in size and the garbage collector thread may compute an index from the address of an object by dividing the address by 4000 and discarding the remainder. In this example, an index of 0 may be computed from either an object in the first pool in the heap space with an address of 2048 or an object in the first pool with an address of 2304. Similarly, an index of 2 may be computed from either an object in the third pool in the heap space with an address of 8192 or an object in the third pool in the heap space with an address of 8448. Although the present example presents a particular formula for generating indexes from the address of an object in a pool, it is understood that numerous formula involving numerous mathematical operations could be utilized to generate indexes from the addresses of objects such that the indexes are the same for objects in the same pool and different for objects in different pools.

Further, as illustrated, each memory 104A includes a Stack A 109A for the execution threads executing on the processing unit A 103A and the memory 104B includes a Stack B 109B for the execution threads executing on the processing unit B 103B. When queuing objects, each garbage collector thread may first scan root stacks of threads of processing units of the same lgroup as the garbage collector thread before scanning root stacks of execution threads executing on processing units assigned to lgroups different from the garbage collector thread. As execution threads in the same lgroup as the garbage collector thread may reference more objects contained in pools of the same lgroup as the garbage collector thread than objects contained in pools of different lgroups, the garbage collector threads may thus queue more objects contained in pools of the same lgroup as the garbage collector thread than objects contained in pools of other lgroups.

In some implementations, the garbage collector threads 106A and 106B may be threads of a regionalized copying garbage collector that divides the heap space into at least one or more Young regions and one or more Old regions. Each pool may contain one or more of the Young regions and/or one or more of the Old regions. When an object is allocated, the object may be termed "Young" and contained within a Young region. If the Young object has not been deallocated after a period of time, such as one or more garbage collection cycles, the object may be copied to an Old region, promoting the object to the status of an "Old object." In such implementations, in addition to ordered processing of the queues 106A and 106B, the garbage collector threads 106A and 106B may maximize local accesses and minimize remote accesses by copying Young objects and Old objects differently.

When copying a Young object, a garbage collector thread may determine the lgroup of the pool that contains the object and copy the object to a pool of the same lgroup. As most Young objects may be used primarily by the execution thread that created the objects, Young objects will thusly be kept local to the lgroup that may primarily utilize the objects. However, Old objects may not be primarily utilized by any particular execution thread and thus the garbage collector threads may spread Old objects among the lgroups by copying Old objects to pools of the same lgroup as the respective garbage collector thread. In order to implement such copying, garbage collector threads may include pointers to free space in one or more pools of each lgroup to indicate where the garbage collector thread will copy Young objects and a pointer to free space in one or more pools of the same lgroup as the respective garbage collector thread to indicate where the garbage collector thread will copy Old objects.

However, if one or more garbage collector threads of a particular lgroup copy more Old objects than garbage collector threads of other lgroups, the Old objects may not be spread across the various lgroups. As such, the garbage collector threads may monitor the copying of Old objects during one or more garbage collection cycles to determine that the Old objects are not evenly spread across lgroups. If the garbage collector threads determine that the Old objects are not evenly spread across lgroups, the garbage collector threads may copy Old objects to pools of various lgroups, such as in a round-robin fashion, rather than copying Old objects to pools of the same lgroup as the garbage collector thread.

While the system 100 has been described as including computing device 101, a circuit board 102, processing units 103A and 103B, and memories 104A and 104B, it will be understood that system 100 is illustrative and that one or more computing devices 101, which may be communicably coupled; dual core, multiple core, parallel processing, and other processing unit 103A and 103B configurations; and/or multiple memories 104A and 104B and types of memory 104A and 104B such as random access memory, read-only memory, flash memory, cache memory, on-chip memory, off-chip memory, and etc. may be utilized without departing from the scope of the present disclosure.

Figure 2:
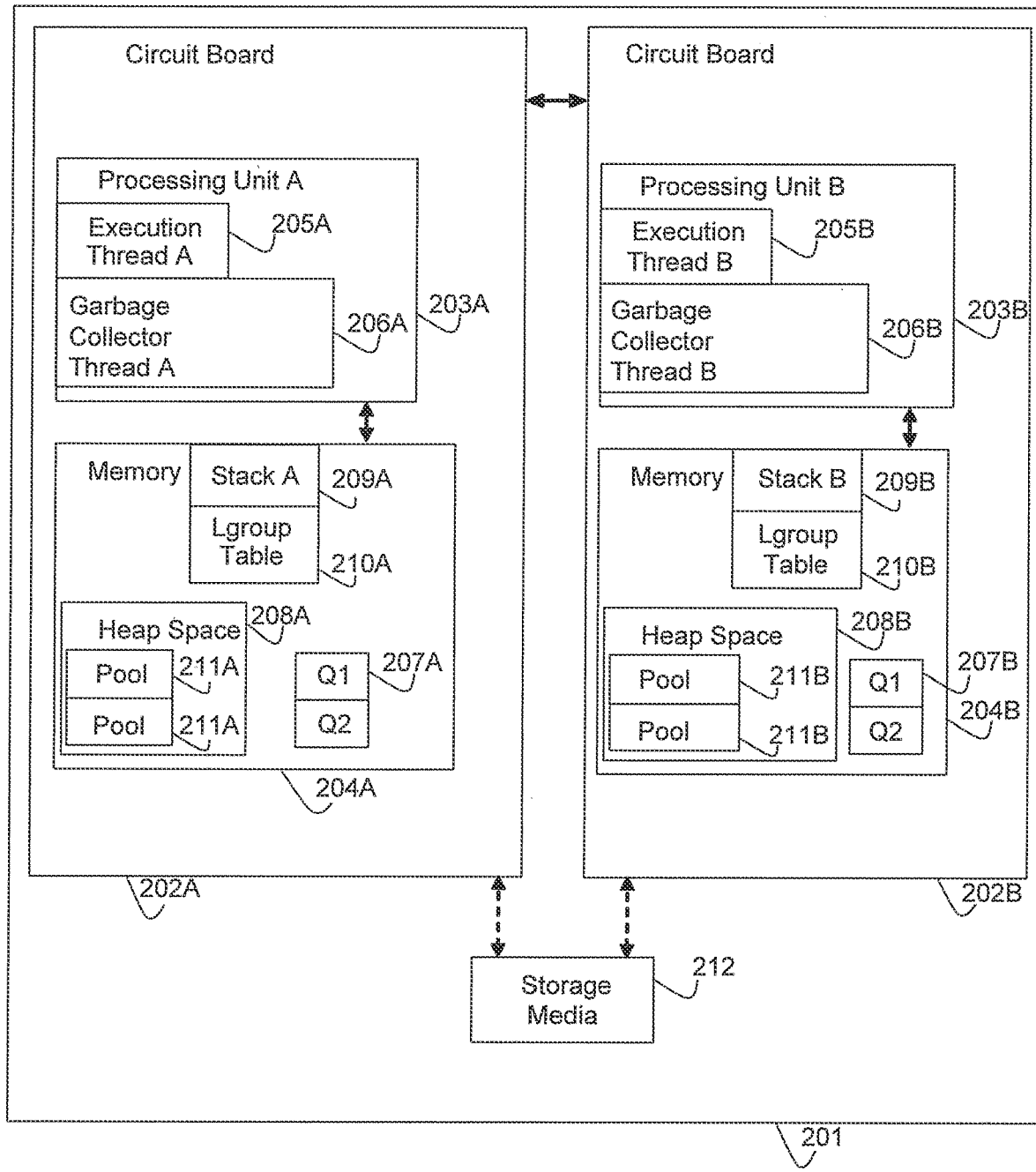
FIG. 2 is a block diagram illustrating a second example system for non-uniform memory access aware garbage collector thread processing, in accordance with an embodiment of the present disclosure.

By way of a first illustration, FIG. 2 is a second example of a system 200 for non-uniform memory access aware garbage collector thread processing. The system 200 has a computing device 201 which includes communicably coupled circuit boards 202A and 202B. The circuit board 202A includes a processing unit A 203A communicably coupled to a memory 204A and the circuit board 202B includes a processing unit B 203B communicably coupled to a memory 204B. The processing units 203A and 203B are both operable to access memories 204A and 204B. However, in this second example, the processing unit 203A is operable to access the memory 204A faster than the memory 204B and similarly the processing unit 203B is operable to access the memory 204B faster than the memory 204A. Thus, the memory 204A is defined as local to the processing unit 203A and remote to the processing unit 203B and the memory 204B is defined as local to the processing unit 203B and remote to the processing unit 203A. As such, the processing unit 203A and the memory 204A are grouped into a first lgroup and the processing unit 203B and the memory 204B are grouped into a second lgroup.

Figure 3:
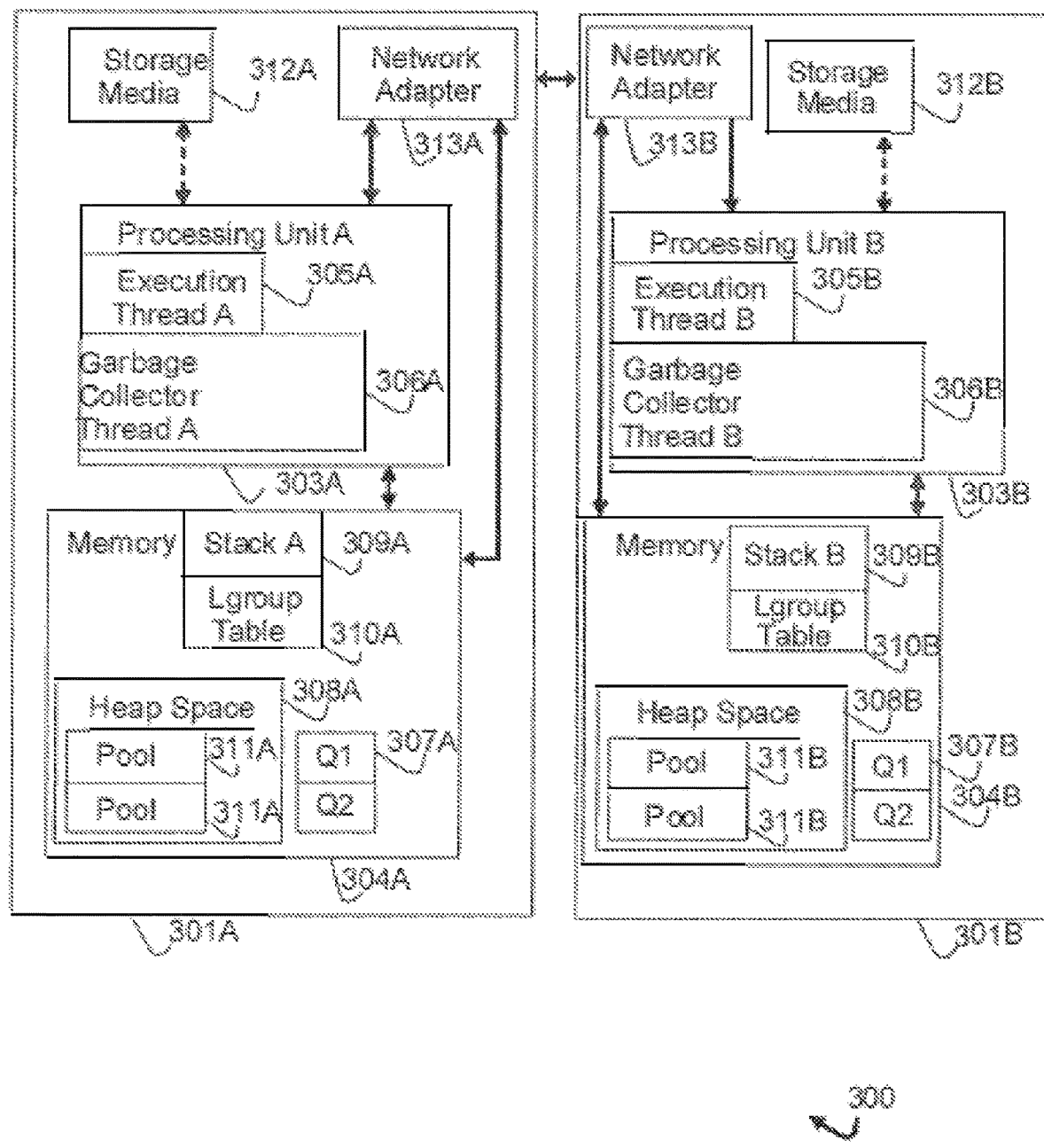
FIG. 3 is a block diagram illustrating a third example system for non-uniform memory access aware garbage collector thread processing, in accordance with an embodiment of the present disclosure.

By way of a second illustration, FIG. 3 is a third example of a system 300 for non-uniform memory access aware garbage collector thread processing. The system 300 includes a first computing device 301A communicably coupled through a network communication link to a second computing device 301B. The first computing device 301A includes a processing unit A 303A communicably coupled to a memory 304A and the second computing device 301B includes a processing unit B 303B communicably coupled to a memory 304B. The processing units 303A and 303B are both operable to access memories 304A and 304B. However, in this third example, the processing unit 303A is operable to access the memory 304A faster than the memory 304B and similarly the processing unit 303B is operable to access the memory 304B faster than the memory 304A. Thus, the memory 304A is defined as local to the processing unit 303A and remote to the processing unit 303B and the memory 304B is defined as local to the processing unit 303B and remote to the processing unit 303A. As such, the processing unit 303A and the memory 304A are grouped into a first lgroup and the processing unit 303B and the memory 304B are grouped into a second lgroup.

Referring again to FIG. 1, the computing device 101 may also include one or more tangible machine-readable storage media 112, communicably coupled to the processing units 103A and 103B and/or the memories 104A and 104B, which may include, but are not limited to, magnetic storage media such as a floppy diskette; optical storage media such as a CD-ROM; magneto-optical storage media; read only memory; random access memory; erasable programmable memory such as EPROM or EEPROM; flash memory; or other types of media suitable for storing electronic information. The computing device 101 may also include, not shown, one or more input and/or output devices such as displays, keyboards, mice, printers, scanners, and so forth; one or more buses such as universal serial bus, small computer system interface, and so forth; and/or one or more communication components such as modems, Ethernet adapters, wireless Ethernet adapters, and so forth. The instructions the processing units 103A and 103B execute to implement the execution threads 105A and 105B and the threads of a garbage collector 106A and 106B may be stored in the memories 104A and 104B and/or the storage media 112.

Figure 4A:
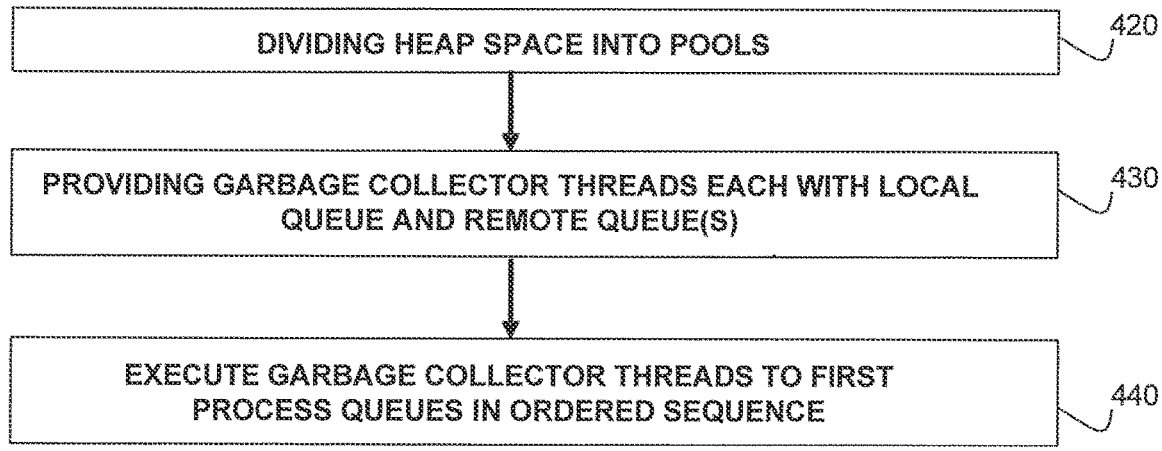
FIG. 4A is a method diagram illustrating a method for non-uniform memory access aware garbage collector thread processing, which may be performed by the systems of FIG. 1, 2, 3, and so on in accordance with an embodiment of the present disclosure.

FIG. 4A illustrates a method 400 for non-uniform memory access aware garbage collector thread processing, which may be performed by the system 100, in accordance with an embodiment of the present disclosure. Although method 400 will be described below as performed by the system 100, the method 400 may be performed by the system 200, the system 300, or other computer systems without departing from the scope of the present disclosure. The method 400 is a computer-implemented method, and as such is performed by a processing unit, such as the processing units 103A and 103B, executing one or more sets of instructions included in a computer program product stored in a machine-readable medium, such as the memories 104A and 104B.

An operating system of the computing device 101 assigns processing units and memories into lgroups based on access latency between each of the processing units and the memories. A processing unit may be assigned to the same lgroup as a memory if the access latency between that processing unit and that memory is less than between that processing unit and other memories.

In an operation 420, the computing device 101 divides a heap space into a number of pools that are each contained in one of the memories. The computing device 101 assigns each of the pools to the same lgroup as the memory that contains the respective pool. Each of the pools may be the same size, such as 1024 kilobytes.

In an operation 430, the computing device 101 provides a number of garbage collector threads executing on one or more processing units, each garbage collector thread including a number of queues. The computing device 101 assigns each garbage collector thread to the same lgroup as the processing unit that executes the respective garbage collector thread. The number of queues for each garbage collector thread includes at least a local queue for objects contained in pools of the same lgroup as the respective garbage collector thread and at least one remote queue for objects contained in pools of different lgroups from the respective garbage collector threads. In some implementations, the number of queues may include a separate remote queue for each lgroup other than the lgroup of the respective garbage collector thread.

In an operation 440, the computing device 101 executes the garbage collector threads to process the queues in an ordered sequence to maximize accesses to the respective garbage collector thread's lgroup and minimize accesses to other lgroups.

Figure 4B:
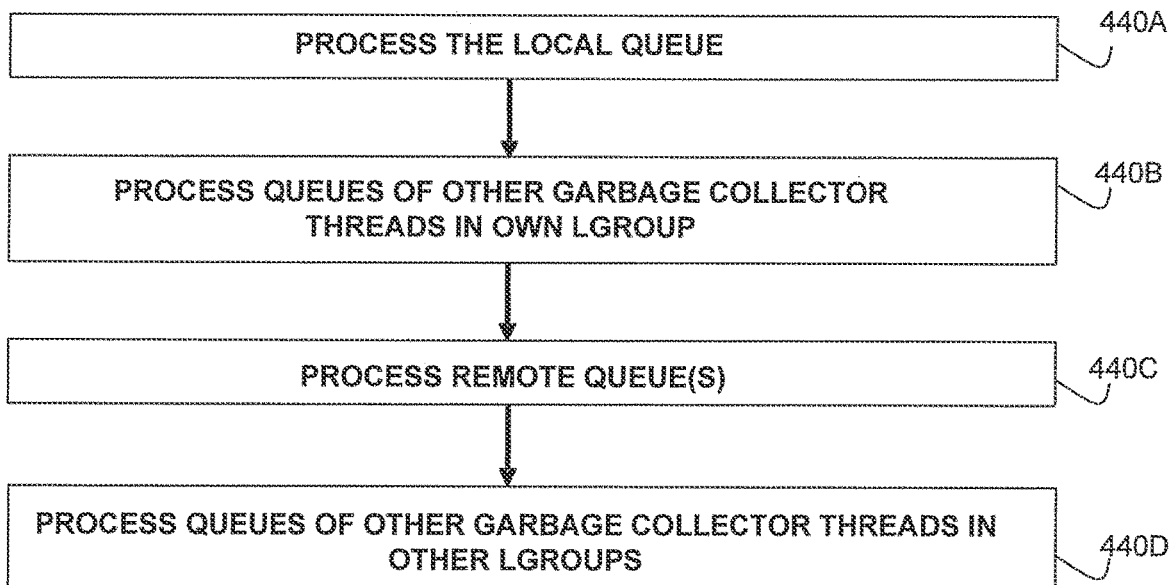
FIG. 4B is a method diagram illustrating sub-operations for the operation of the method of FIG. 4A of processing queues in the ordered sequence, in accordance with the present disclosure.

FIG. 4B illustrates sub-operations that may be involved in processing the queues in the ordered sequence. In a sub-operation 440A, a garbage collector thread may process the local queue. In a sub-operation 440B, the garbage collector thread may process the queues of other garbage collector threads that are for objects stored in pools of the same lgroup as the garbage collector thread. In a sub-operation 440C, the garbage collector thread may process the remote queue(s). In a sub-operation 440D, the garbage collector thread may process the queues of other garbage collector threads that are for objects stored in pools of lgroups different than the lgroup of the garbage collector thread. By processing the queues in this ordered sequence, each garbage collector thread is biased to process objects contained in pools of the same lgroup as the respective garbage collector thread as much as possible without being idle.

Figure 5A:
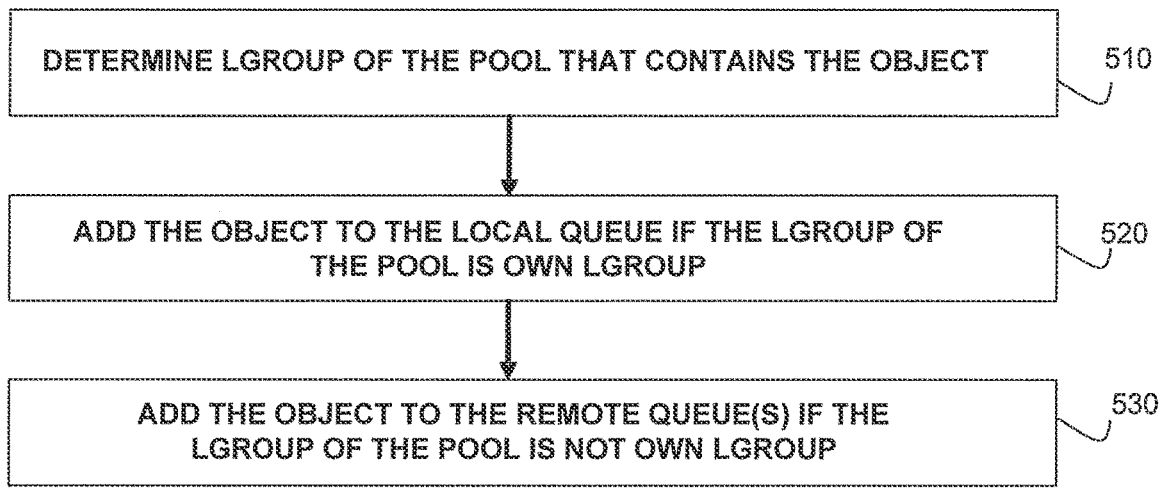
FIG. 5A is a method diagram illustrating a method for queuing objects for non-uniform memory access aware garbage collector thread processing, which may be performed by the systems of FIG. 1, 2, 3, and so on in accordance with the present disclosure.

FIG. 5A illustrates a method 500 for queuing objects for non-uniform memory access aware garbage collector thread processing, which may be performed by the system 100, in accordance with an embodiment of the present disclosure, Although method 500 will be described below as performed by the system 100, the method 500 may be performed by the system 200, the system 300, or other computer systems without departing from the scope of the present disclosure. The method 500 is a computer-implemented method, and as such is performed by a processing unit, such as the processing units 103A and 103B, executing one or more sets of instructions included in a computer program product stored in a machine-readable medium, such as the memories 104A and 104B.

In an operation 510, a garbage collector thread determines the lgroup of the pool that contains an object. In an operation 520, the garbage collector thread adds the object to the local queue if the lgroup of the pool is the same lgroup as that of the garbage collector thread. In an operation 530, the garbage collector thread adds the object to the remote queue(s) if the lgroup of the pool is different than the lgroup of the garbage collector thread.

Figure 5B:
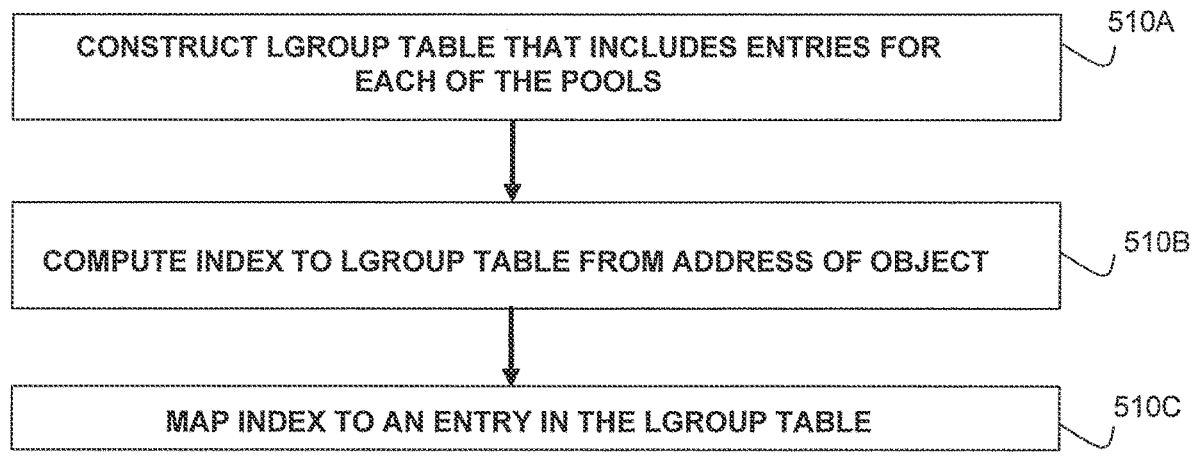
FIG. 5B is a method diagram illustrating sub-operations for the operation of the method of FIG. 5A of determining the lgroup of the pool that contains an object, in accordance with the present disclosure.

FIG. 5B illustrates sub-operations that may be involved in determining the lgroup of the pool that contains the object. In a sub-operation 510A, the computing device 101 constructs an lgroup table that includes entries specifying the lgroup of each of the pools. In a sub-operation 510B, the garbage collector thread computes an index to the lgroup table from the address of the object. In a sub-operation 510C, garbage collector thread maps the index to an entry in the lgroup table.

Figure 6A:
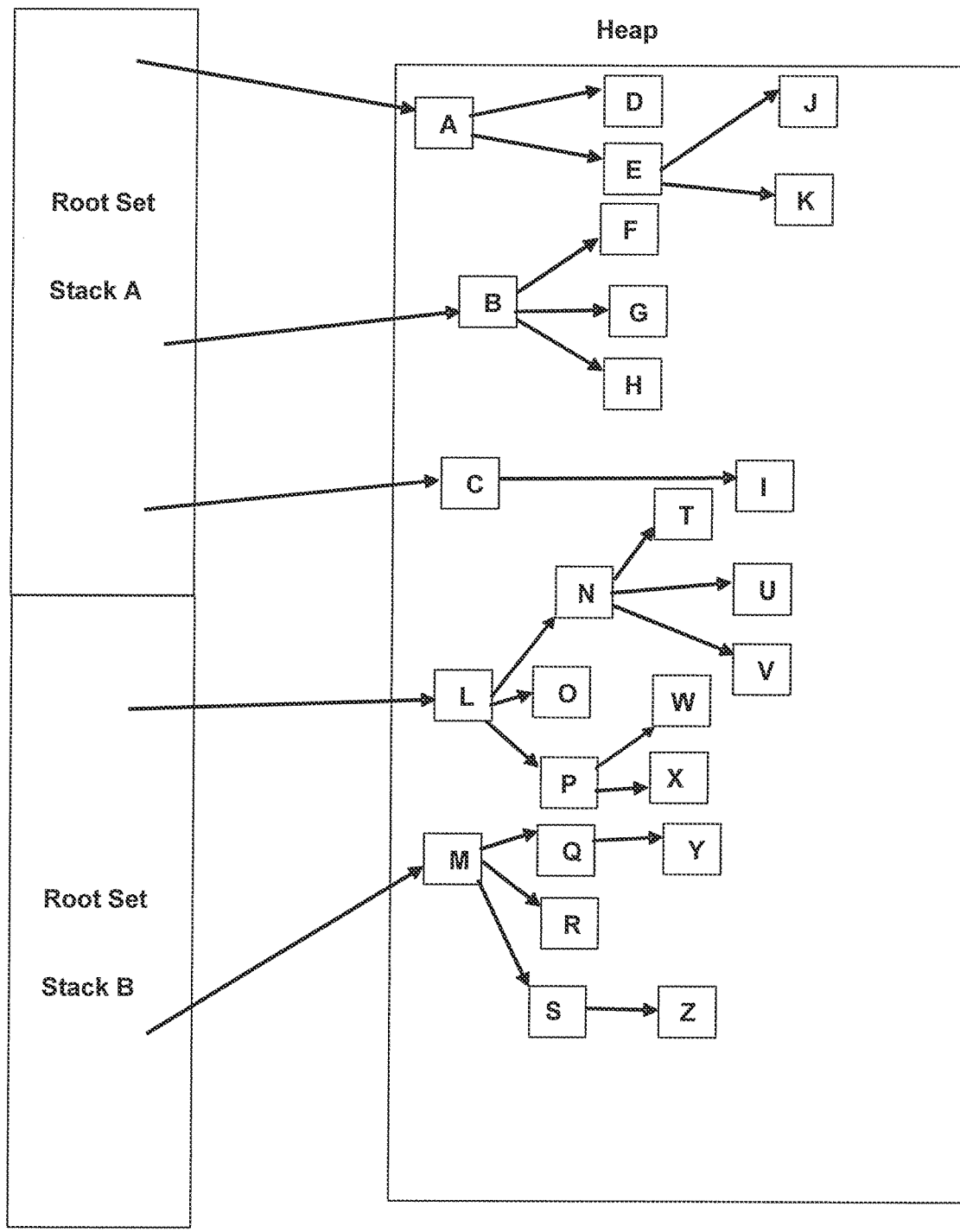
FIG. 6A is a block diagram illustrating a structure of references in a heap space in an example implementation of the system of FIG. 1.

FIG. 6A is a block diagram illustrating the structure of references in a heap space in an example implementation of the system 100. As illustrated, the heap space includes references from a root set of references in the Stack A 109A and references from a root set of references in the Stack B 109B. The root sets of references may include external references from anywhere in the respective call stack, local variables and parameters in functions currently being invoked, and any global variables. As illustrated, the heap includes memory that has been allocated to objects A through Z.

The root set of references in the Stack A 109A includes external references to objects A, B, and C. The root set of references in the Stack B 109B includes external references to objects L and M. Object A references objects D and E. Object E references objects J and K. Object B references objects F, G, and H. Object C references object I. Object L references objects N, O, and P. Object N references objects T, U, and V. Object P references objects W and X. Object M references objects Q, R, and S. Object Q references object Y. Object S references object Z. Thus, in this example, all objects A through Z are currently reachable and no objects are currently unreachable.

Figure 6B:
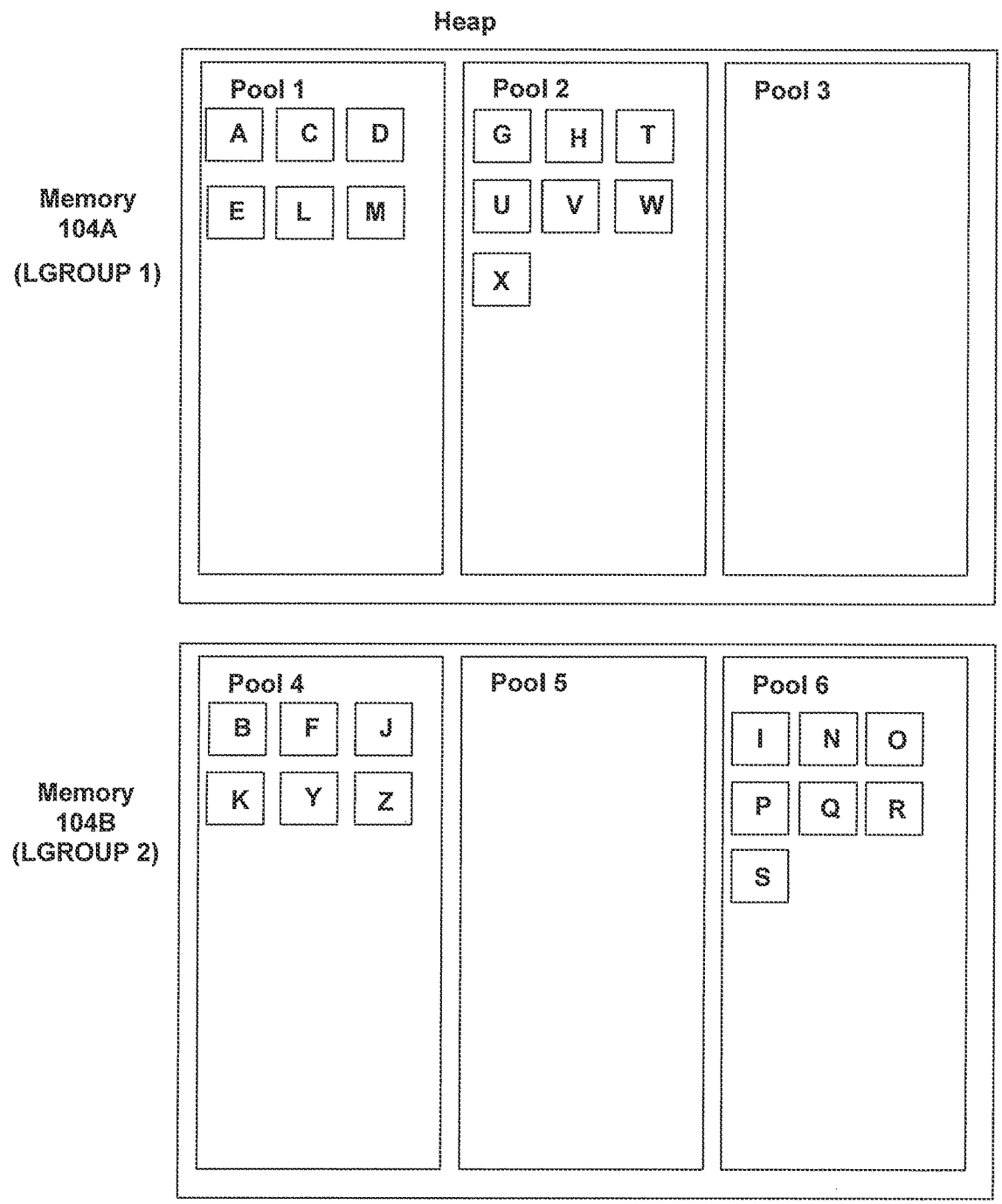
FIG. 6B is a block diagram illustrating the heap space of FIG. 6A divided into a number of pools.

FIG. 6B is a block diagram illustrating the heap space of FIG. 6A divided into a number of pools contained in the memories 104A and 104B. As illustrated, pools 1, 2, and 3 are contained in memory 104A. As memory 104A is assigned to lgroup 1 in this example, pools 1, 2, and 3 are also assigned to lgroup 1. Also as illustrated, pools 4, 5, and 6 are contained in memory 104B. As memory 104B is assigned to lgroup 2 in this example, pools 4, 5, and 6 are also assigned to lgroup 2. Objects A, C, D, E, L, and M are currently contained in pool 1. Objects G, H, T, U, V, W, and X are currently contained in pool 2. Objects B, F, J, K, Y, and Z are currently stored in pool 4. Objects I, N, O, P, Q, R, and S are currently stored in pool 6. No objects are currently stored in pools 3 and 5.

FIG. 6C is an example lgroup table for the pools illustrated in FIG. 6B. As illustrated, the lgroup table includes an entry for each of the pools 1 through 6 that specifies the lgroup of the respective pool. As further illustrated, the entry for each pool includes an index. An index computed from the address of any object contained in pool 1 may be 0. Similarly, an index computed from the address of any object contained in pool 2 may be 1, an index computed from the address of any object contained in pool 3 may be 2, and so on. Thus, the index computed from the address of an object in one of the pools may be mapped to the lgroup table to determine the lgroup of the pool that contains the object.

Figure 6D:
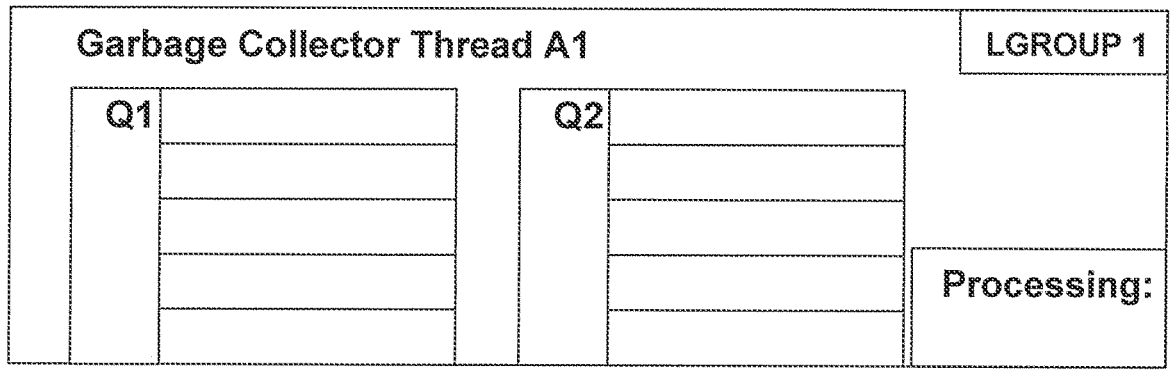
FIG. 6D is a block diagram illustrating garbage collector threads executing on the example implementation of the system of FIG. 1.
Figure 6D:
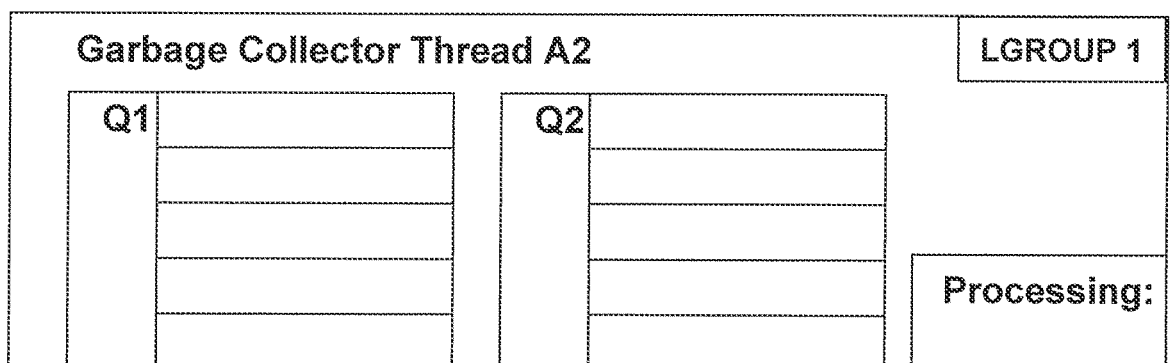
Figure 6D:
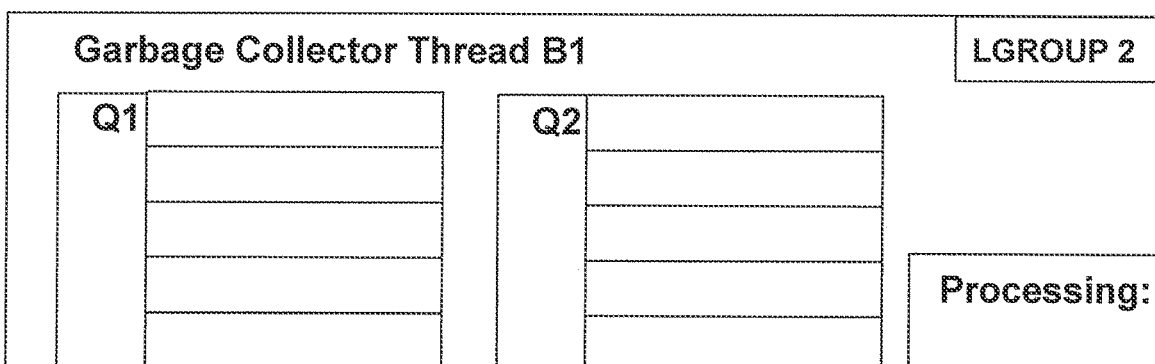

FIG. 6D is a block diagram illustrating three garbage collector threads A1, A2, and B1 executing on the example implementation of the system 100. As illustrated, garbage collector threads A1 and A2 have been assigned to lgroup 1 and garbage collector thread B1 has been assigned to lgroup 2. Also as illustrated, each garbage collector thread includes a local queue Q1 for objects contained in pools of the same lgroup as the respective garbage collector thread and a remote queue Q2 for objects contained in pools of lgroups different than the respective garbage collector thread.

Figure 6E:
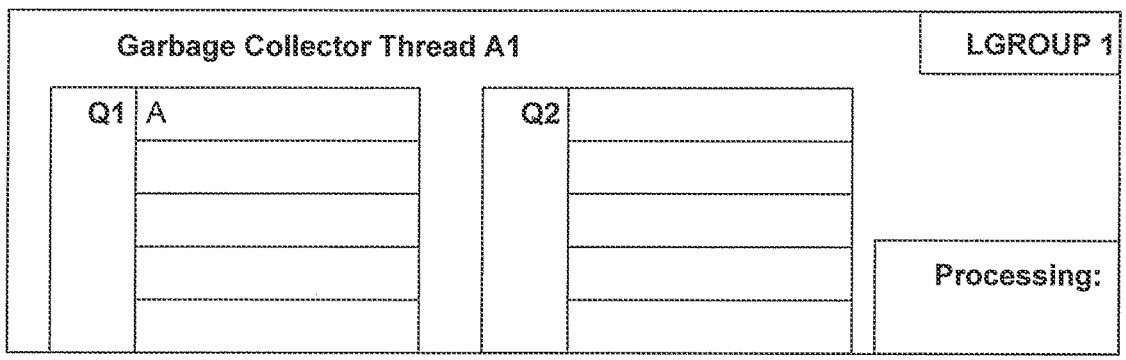
FIGS. 6E(i) through 6E(x) are block diagrams illustrating an example of the garbage collector threads of FIG. 6D queuing the objects of the heap space illustrated in FIGS. 6A and 6B according to a breadth-first algorithm and then processing the queues.
Figure 6E:
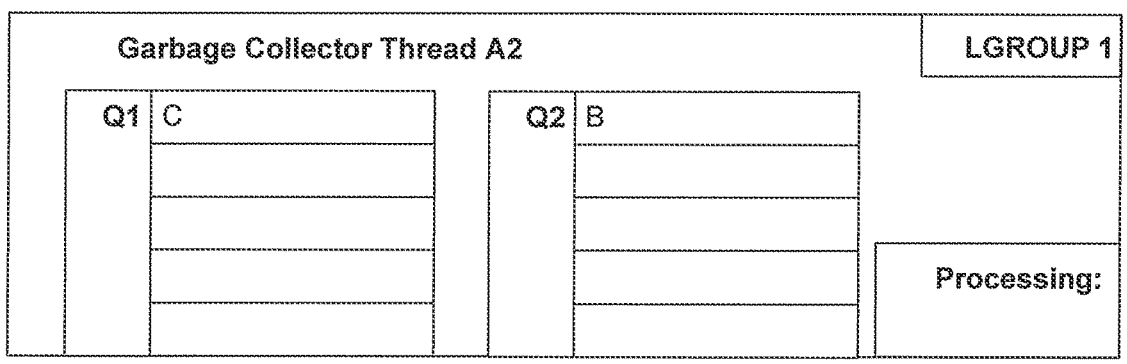
Figure 6E:
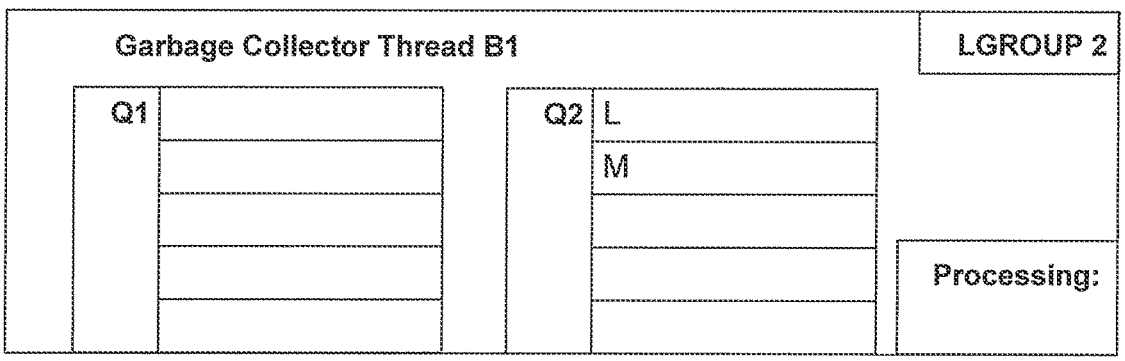
Figure 6E:
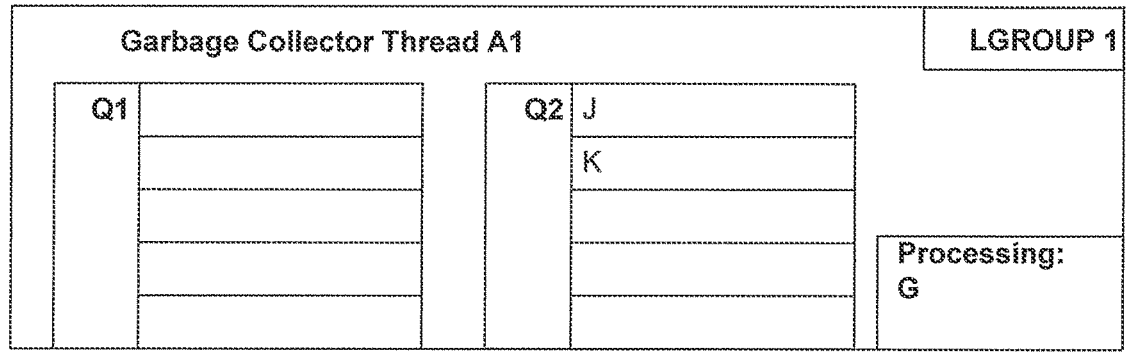
Figure 6E:
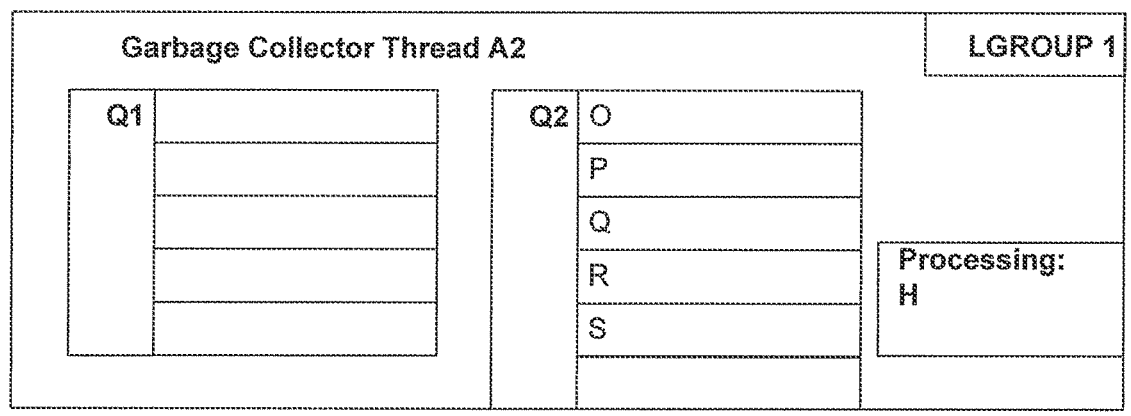
Figure 6E:
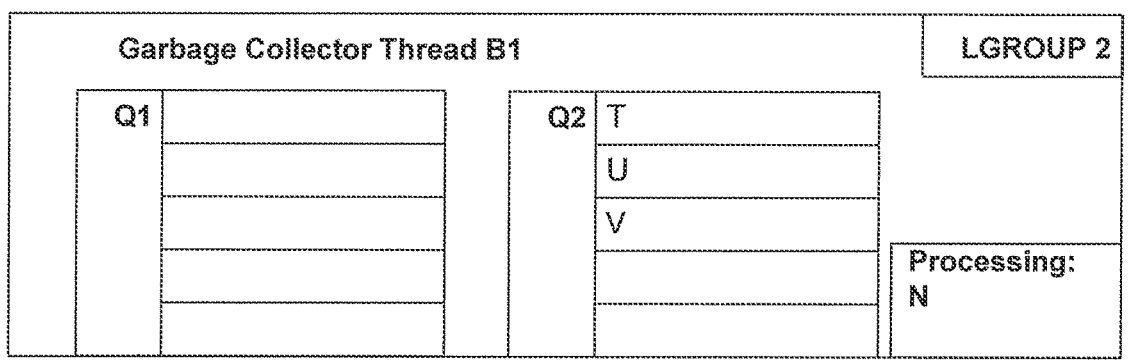
Figure 6E:
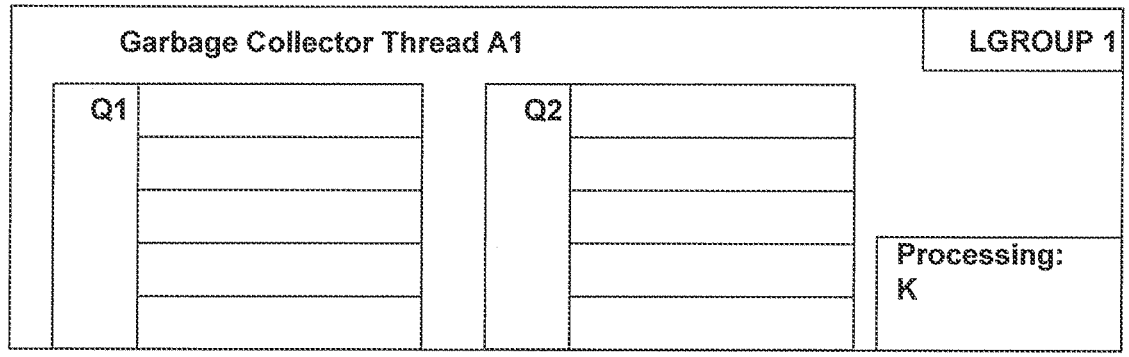
Figure 6E:
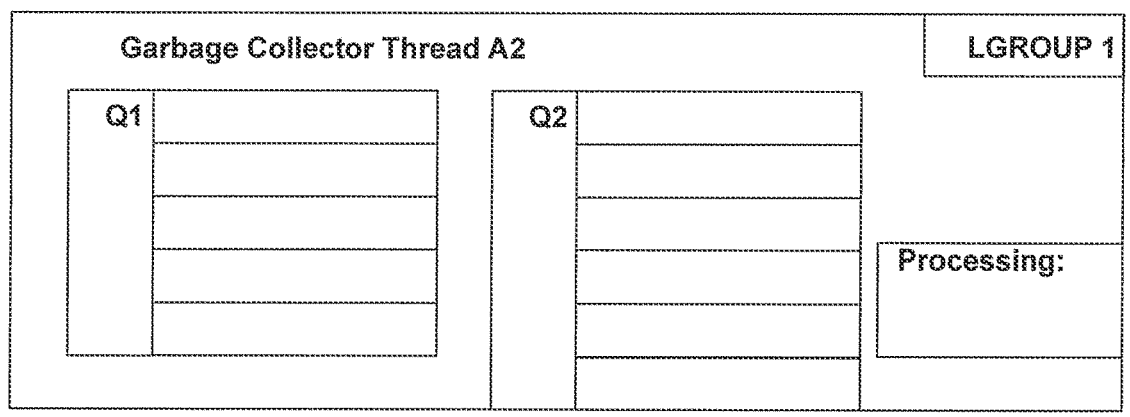
Figure 6E:
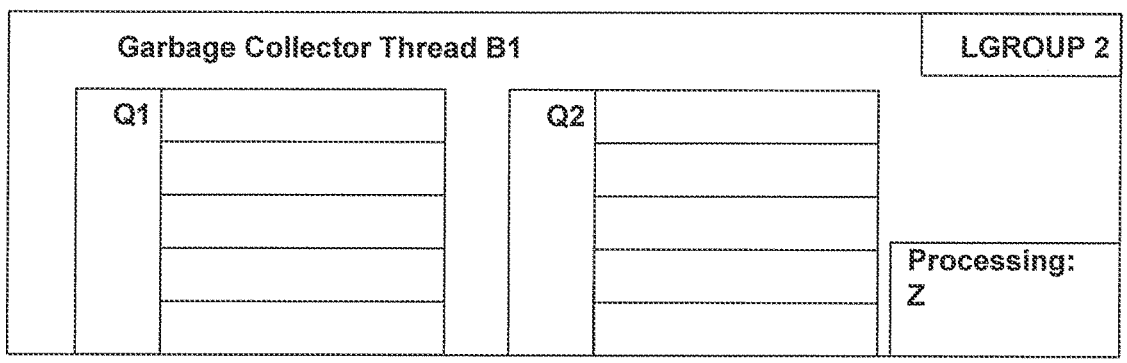

FIGS. 6E(i) through 6E(x) illustrate an example of the three garbage collector threads of FIG. 6D queuing the objects of the heap space illustrated in FIGS. 6A and 6B according to a breadth-first algorithm and then processing the queues. The queuing of the objects is performed according to a breadth-first algorithm as all references into the heap space from the root set of references are queued before processing the queues. In this example, garbage collector thread A1 is operable to begin scanning for references into the heap from the beginning of the root set of Stack A, garbage collector thread A2 is operable to begin scanning for references into the heap from the middle of the root set of Stack A, and garbage collector thread B1 is operable to begin scanning for references into the heap from the beginning of the root set of Stack B.

Thus, as illustrated in FIG. 6E(i), garbage collector thread A1 queues object A, garbage collector thread A2 queues objects B and C, and garbage collector thread B1 queues objects L and M. Garbage collector thread A1 queues object A in the local queue Q1 because object A is contained in pool 1, which is assigned to the same lgroup as garbage collector thread A1. Garbage collector thread A2 queues object B in the remote queue Q2 because object B is contained in pool 4, which is assigned to a different lgroup than the garbage collector thread A2. Garbage collector thread A2 queues object C in the local queue Q1 because object C is contained in pool 1, which is assigned to the same lgroup as garbage collector thread A2. Garbage collector thread B1 queues objects L and M in the remote queue Q2 because objects L and M are contained in pool 1, which is assigned to a different lgroup than the garbage collector thread B1.

After queuing all references into the heap space from the root set of references, the garbage collector threads A1, A2, and B1 perform the ordered processing of the queues. As garbage collector thread A1 includes object A in the local queue Q1, garbage collector thread A1 will first process object A. As garbage collector thread A2 includes object C in the local queue Q1, garbage collector thread A2 will first process object C. Garbage collector thread B1 does not include any objects in the local queue Q1 and will thus process object B from the remote queue Q2 of garbage collector A2 as that queue is for objects stored in pools assigned to the same group as garbage collector thread B1.

FIG. 6E(ii) illustrates garbage collector thread A1 processing object A, garbage collector thread A2 processing object C, and garbage collector thread B1 processing object B. In processing these objects, garbage collector thread A1 queues objects D and E which are referenced by object A, garbage collector thread A2 queues object I which is referenced by object C, and garbage collector thread B1 queues objects F, G, and H which are referenced by object B. As objects D and E are contained in a pool of the same lgroup as the garbage collector thread A1, garbage collector thread A1 queues objects D and E in the local queue Q1. As object I is contained in a pool of the an lgroup different than the garbage collector thread A2, garbage collector thread A2 queues object I in the remote queue Q2. As object F is contained in a pool of the same lgroup as garbage collector thread B1 and objects G and H are contained in pools of another lgroup, garbage collector thread B1 queues object F in the local queue Q1 and objects G and H in the remote queue Q2.

Next, garbage collector thread A1 selects object D from the local queue Q1 for processing and garbage collector thread B1 selects object F from the local queue Q2 for processing. Garbage collector thread A2 does not include any objects in the local queue Q1 and will thus process object L from the remote queue Q2 of garbage collector B1 as that queue is for objects stored in pools assigned to the same lgroup as garbage collector thread A2. FIG. 6E(iii) illustrates garbage collector thread A1 processing object D, garbage collector thread A2 processing object L, and garbage collector thread B1 processing object F. In processing object L, garbage collector thread A2 queues objects N, O, and P in the remote queue Q2 as these objects referenced by object L are contained in a pool of a different lgroup than garbage collector thread A2.

Garbage collector thread A1 then selects object E from the local queue Q1 for processing. Garbage collector thread A2 and garbage collector thread B1 do not include any objects in their local queues Q1 and thus garbage collector thread A2 will process object M from the remote queue Q2 of garbage collector thread B1 and garbage collector thread B1 will process object I from the remote queue Q2 of garbage collector thread A2. As shown in FIG. 6E(iv), in processing these objects garbage collector thread A1 queues objects J and K in the remote queue Q2 and garbage collector thread A2 queues objects Q, R, and S in the remote queue Q2.

Then, as none of the illustrated garbage collector thread include an object in their local queues Q1, garbage collector thread A1 selects object G from the remote queue Q2 of garbage collector thread B1, garbage collector thread A2 selects object H from the remote queue of garbage collector thread B1, and garbage collector thread B1 selects object N from the remote queue Q2 of garbage collector thread A2. FIG. 6E(v) illustrates that in processing object N, garbage collector thread B1 queues objects T, U, and V in the remote queue Q2.

Subsequently, as none of the illustrated garbage collector thread include an object in their local queues Q1, garbage collector thread A1 selects object T from the remote queue Q2 of garbage collector thread B1, garbage collector thread A2 selects object U from the remote queue of garbage collector thread B1, and garbage collector thread B1 selects object O from the remote queue Q2 of garbage collector thread A2. This is illustrated in FIG. 6E(vi).

Next, as garbage collector thread A1 does not include any objects in its local queue Q1, garbage collector thread A1 selects object V from the remote queue Q2 of garbage collector thread B1. As garbage collector thread A2 does not include any objects in its local queue Q1 and there are no objects in queues of other garbage collector threads that are of the same lgroup as garbage collector thread A2, garbage collector thread A2 selects object P from its own remote queue Q2 for processing. As garbage collector garbage collector thread B1 does not include any objects in its local queue Q1, garbage collector garbage collector thread B1 selects object Q from the remote queue Q2 of garbage collector thread A2. FIG. 6E(vii) illustrates that, in processing these objects, garbage collector thread A2 queues objects W and X in its local queue Q1 and garbage collector thread B1 queues object Y in its local queue Q1.

Following the processing of objects V, P, and Q, garbage collector thread A2 selects object W and garbage collector B1 selects object Y from their respective local queues Q1 for processing. As garbage collector thread A1 does not include any objects in its local queue Q1, garbage collector thread A1 selects object X from the local queue Q1 of garbage collector thread A2. This is illustrated in FIG. 6E(viii). Next, garbage collector thread A1 selects object J from its own remote queue Q2 as its own local queue Q1 is empty and there are no objects in queues of other garbage collector threads that are contained in pools of the same lgroup as garbage collector thread A1. Similarly, garbage collector thread A2 selects object R from its own remote queue Q2 as its own local queue Q1 is empty and there are no objects in queues of other garbage collector threads that are contained in pools of the same lgroup as garbage collector thread A2. As its own local queue Q1 is empty, garbage collector thread B1 selects object S from the remote queue Q2 of garbage collector thread A2. As illustrated in FIG. 6E(ix), in processing object S, garbage collector thread B1 queues object Z in its local queue Q1.

Finally, garbage collector thread A1 selects object K from its own remote queue Q2 as its own local queue Q1 is empty and there are no objects in queues of other garbage collector threads that are contained in pools of the same lgroup as garbage collector thread A1. Garbage collector thread B1 selects object Z from its local queue Q1. As no objects remain in any queues, garbage collector thread A2 is idle. This is illustrated in FIG. 6E(x). Thus, all objects have been processed.

Figure 6F:
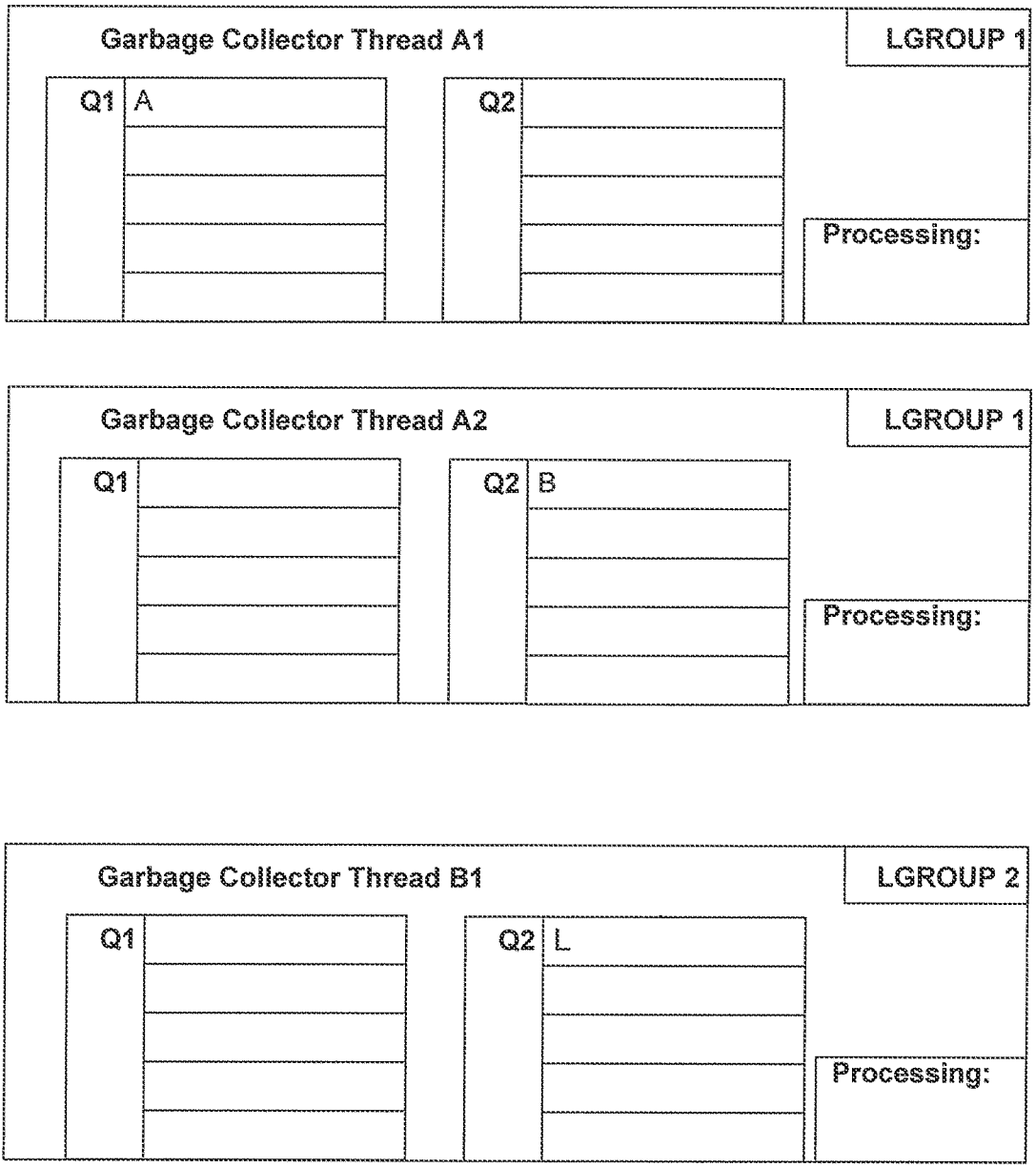
FIGS. 6F(i) through 6F(xii) are block diagrams illustrating an example of the garbage collector threads of FIG. 6D queuing the objects of the heap space illustrated in FIGS. 6A and 6B according to a depth-first algorithm and processing the queues according to the same ordering as FIGS. 6E(i) through 6E(x)
Figure 6F:
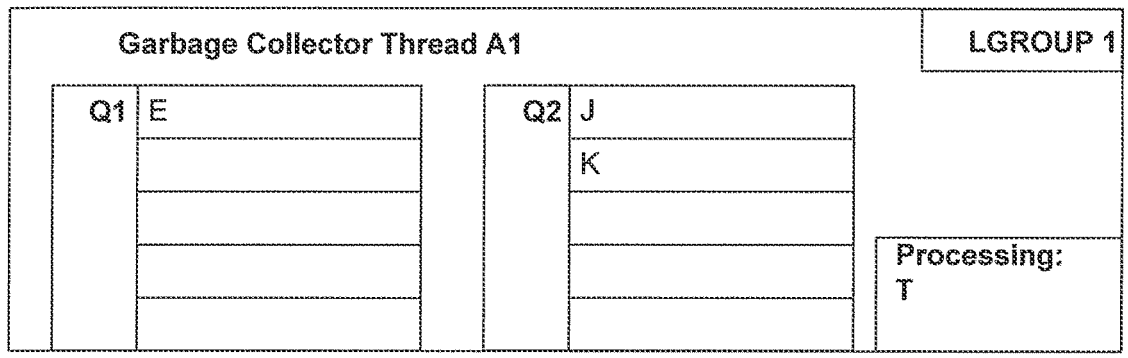
Figure 6F:
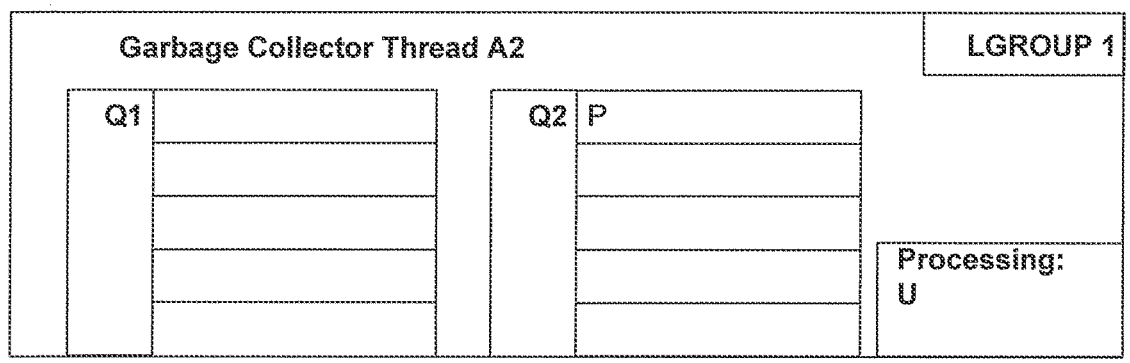
Figure 6F:
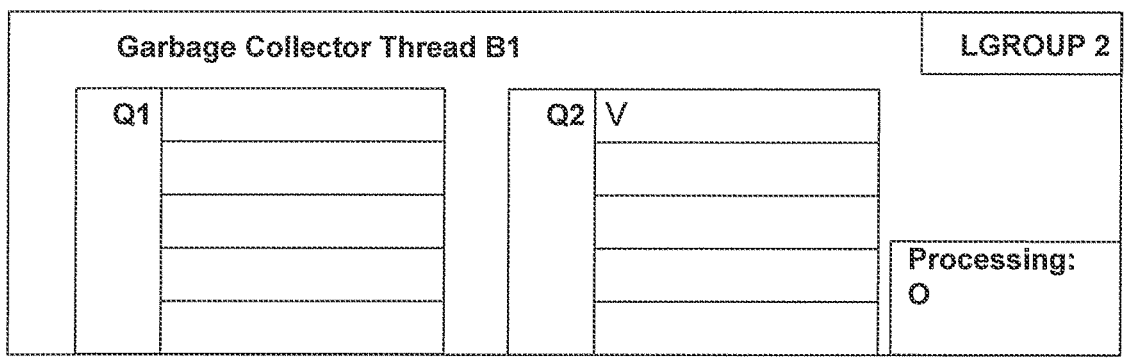
Figure 6F:
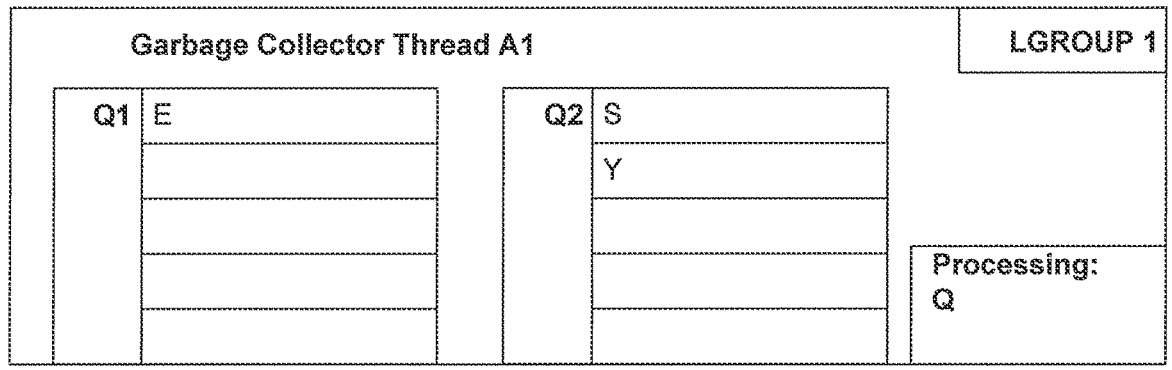
Figure 6F:
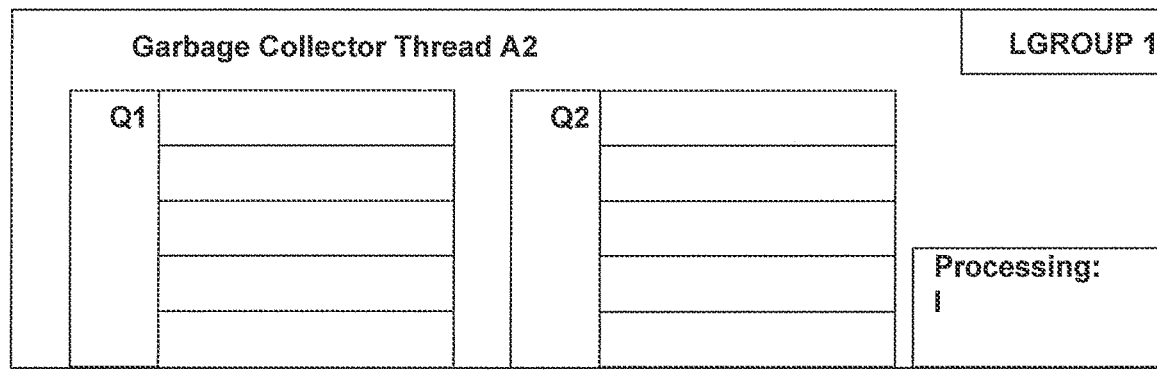
Figure 6F:
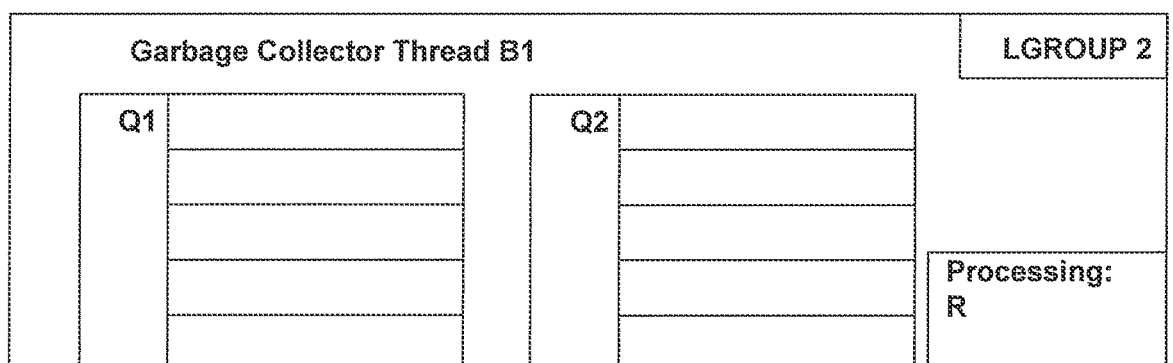

FIGS. 6F(i) through 6F(xii) illustrate an example of the three garbage collector threads of FIG. 6D queuing the objects of the heap space illustrated in FIGS. 6A and 6B according to a depth-first algorithm and processing the queues according to the same ordering as FIGS. 6E(i) through 6E(x). The queuing of the objects is performed according to a depth-first algorithm as each garbage collection thread queues a reference into the heap space from the root set of references and then processes the queues before queuing the next reference into the heap space from the root set of references.

It is understood that although FIGS. 6E(i) through 6E(x) illustrate queuing objects of the heap space illustrated in FIGS. 6A and 6D according to a breadth-first algorithm and FIGS. 6F(i) through 6F(xii) illustrate queuing objects of the heap space illustrated in FIGS. 6A and 6D according to a depth-first algorithm, other queuing algorithms are possible without departing from the scope of the present disclosure. For example, in a hybrid approach that combines breadth-first and depth first, a certain number of references into the heap from the root set may be queued, such as 10. The queues may then be processed before queuing additional references into the heap from the root set.

Figure 6G:
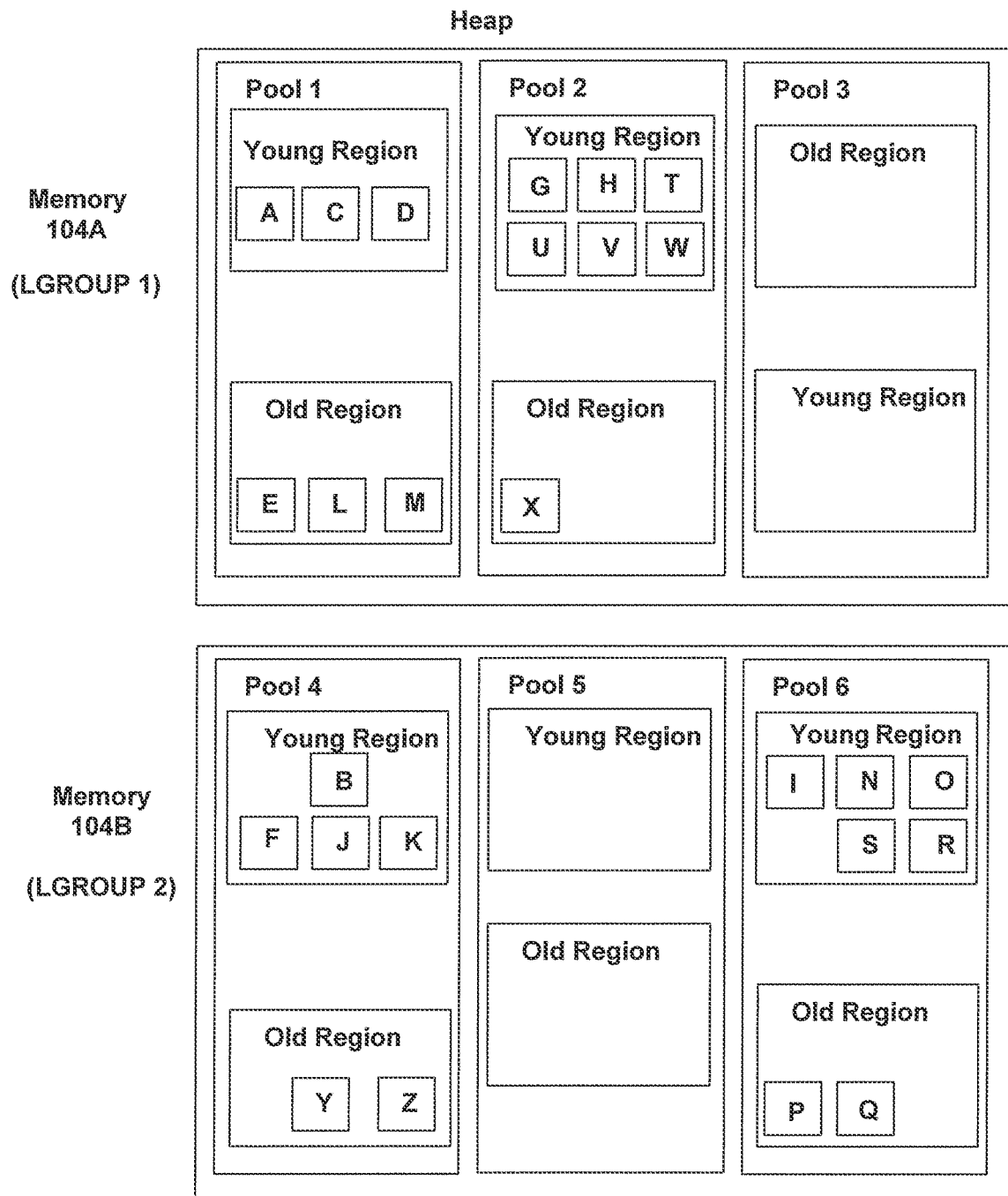
FIG. 6G(i) is a block diagram illustrating the heap space shown in FIG. 6B with the pools divided into Young regions and Old regions.

The processing of objects of the heap space illustrated in FIGS. 6F(i) through 6F(xii) may be performed as part of a garbage collection cycle of a region-based copying garbage collector. FIG. 6G(i) illustrates an example of the heap space shown in FIG. 6B with the pools divided into Young regions and Old regions. While FIG. 6G(i) shows each pool with a single Young region and a single Old region, a pool can contain multiple Young regions and/or multiple Old regions. A pool need not have both types of regions or the same number of regions. In addition, the pools of a heap space need not have the number and/or types of regions. For example, one pool could have one or multiple Young regions, another pool could have one or multiple Old regions, and yet another pool could have one or multiple of both Young and Old regions.

Objects shown as contained in a Young region are defined as Young objects and objects shown as contained in Old regions are defined as Old objects. In this example, through the processing of objects of the heap space illustrated in FIGS. 6F(i) through 6F(xii) copies objects from regions in pools 1, 2, 4, and 6 to regions in pools 3 and 5 before reclaiming the regions in pools 1, 2, 4, and 6.

FIG. 6G(ii) shows the heap space of FIG. 6G(i) after the processing illustrated in FIGS. 6F(i) through 6F(xii) where all Young objects are copied to Young regions in pools of the same lgroup as the pool that previously contained the Young object and all Old objects are copied to pools of the same lgroup as the garbage collector thread that processes the object. However, this results in far more Old objects being contained in pools in lgroup 1 than are contained in pools in lgroup 2.

FIG. 6G(iii) shows the heap space of FIG. 6G(i) after the processing illustrated in FIGS. 6F(i) through 6F(xii). All Young objects have been copied to Young regions in pools of the same lgroup as the pool that previously contained the Young object and Old objects have been copied to pools of the same lgroup as the garbage collector thread that processes the object. When monitoring of copying determines that the Old objects are not being evenly spread across lgroups, Old objects may be copied to pools of lgroups in a round robin fashion to balance the objects. FIG. 6G(iv) shows a more balanced version of FIG. 6G(iii) where some of the objects contained in the Old region of pool 3 have been moved to the Old region of pool 5.

Figure 7:
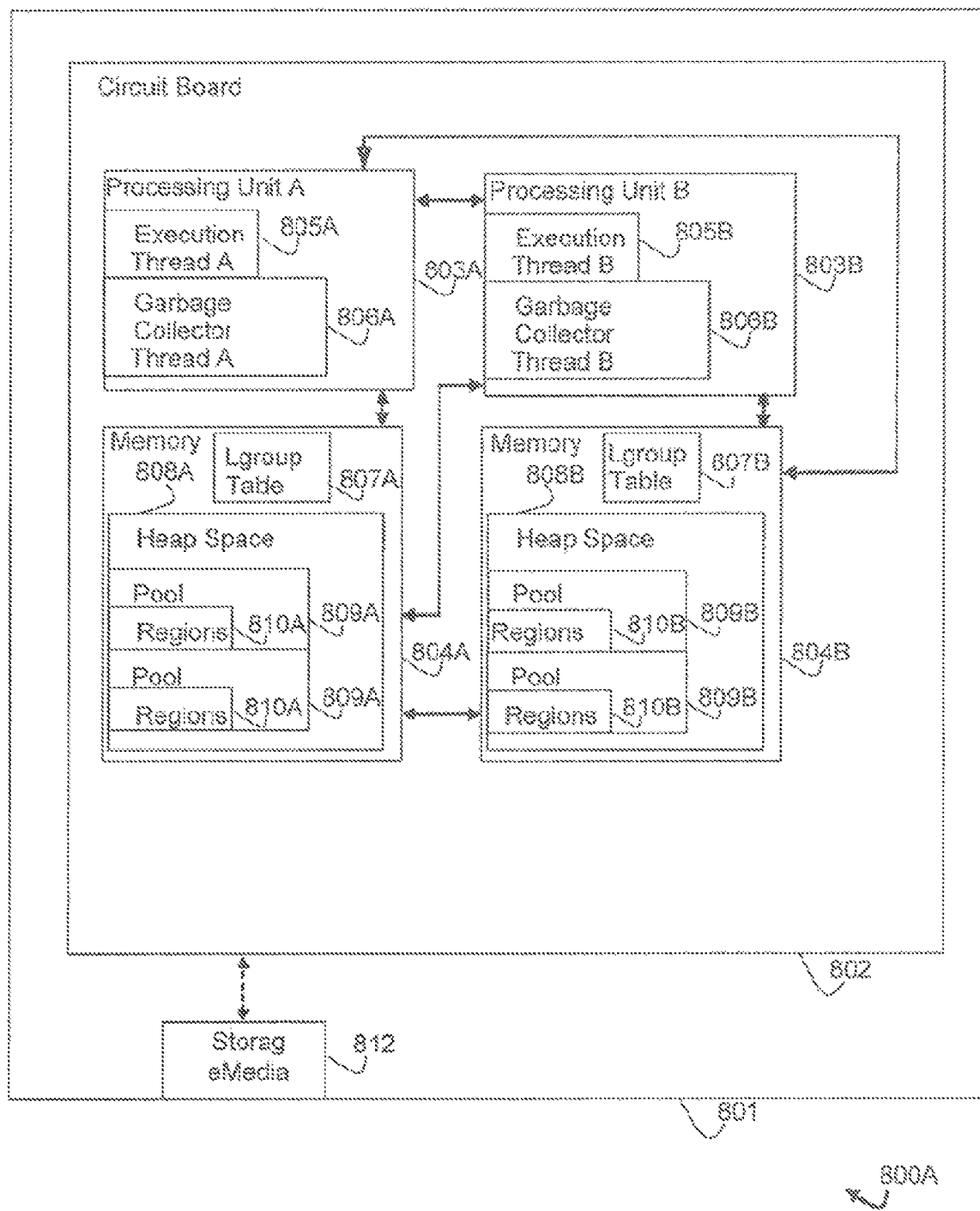
FIG. 7 is a block diagram illustrating a fourth example system for non-uniform memory access aware garbage collector thread processing, in accordance with an embodiment of the present disclosure.

FIG. 7 illustrates a fourth example of a system 800 for non-uniform memory access aware garbage collector thread processing, in accordance with an embodiment of the present disclosure. The system 800 has a computing device 801 which includes a circuit board 802. The circuit board 802 includes two processing units 803A and 803B which are coupled to two memories 804A and 804B.

The processing units 803A and 803B are both operable to access memories 804A and 804B. However, in this fourth example, the processing unit 803A is operable to access the memory 804A faster than the memory 804B and similarly the processing unit 803B is operable to access the memory 804B faster than the memory 804A. Thus, the memory 804A is defined as local to the processing unit 803A and remote to the processing unit 803B and the memory 804B is defined as local to the processing unit 803B and remote to the processing unit 803A. As such, the processing unit 803A and the memory 804A are grouped into a first lgroup and the processing unit 803B and the memory 804B are grouped into a second lgroup.

The processing units 803A and 803B are each configured to execute instructions implementing any number of execution threads 805A and 805B of possible programs. As illustrated, the memories 804A and 804B include a heap space 808A and 808B for the programs related to the execution threads 805A and 805B. The heap space 808A and 808B is divided into a number of pools 809A and 809B that are assigned to the same lgroup as the respective memory that contains the pool. The processing units 803A and 803B are also each configured to execute instructions implementing any number of garbage collector threads 806A and 806B of a regional copying garbage collector that divides the pools 809A and 809B of the heap space 808A and 808B into a number of regions 810A and 810B. The regions 810A and 810B include at least one or more Young regions and one or more Old regions. Each garbage collector thread may be assigned to the same lgroup as the respective processing unit that executes the garbage collector thread.

The processing units 803A and 803B operate to maximize accesses to memories in the same lgroup as the respective processing unit and minimize accesses to memories in other lgroups to reduce latency and improve overall system performance and efficiency. When an object is allocated, the object may be termed "Young" and contained within a Young region. If the Young object has not been deallocated after a period of time, such as one or more garbage collection cycles, the object may be copied to an Old region, promoting the object to the status of an "Old object."

The garbage collector threads 806A and 806B may maximize local accesses and minimize remote access by copying Young objects and Old objects differently. When copying a Young object, a garbage collector thread may determine the lgroup of the pool that contains the object and copy the object to a pool of the same lgroup. As most Young objects may be used primarily by the execution thread that created the objects, Young objects will thusly be kept local to the lgroup that may primarily utilize the objects. However, Old objects may not be primarily utilized by any particular execution thread and thus the garbage collector threads may spread Old objects among the lgroups by copying Old objects to pools of the same lgroup as the respective garbage collector thread. In order to implement such copying, garbage collector threads may include pointers to free space in one or more pools of each lgroup to indicate where the garbage collector thread will copy Young objects and a pointer to free space in one or more pools of the same lgroup as the respective garbage collector thread to indicate where the garbage collector thread will copy Old objects.

However, if one or more garbage collector threads of a particular lgroup copy more Old objects than garbage collector threads of other lgroups, the Old objects may not be spread across the various lgroups. As such, the garbage collector threads may monitor the copying of Old objects during one or more garbage collection cycles to determine that the Old objects are not evenly spread across lgroups. If the garbage collector threads determine that the Old objects are not evenly spread across lgroups, the garbage collector threads may copy Old objects to pools of various lgroups, such as in a round-robin fashion, rather than copying Old objects to pools of the same lgroup as the garbage collector thread.

Figure 8:
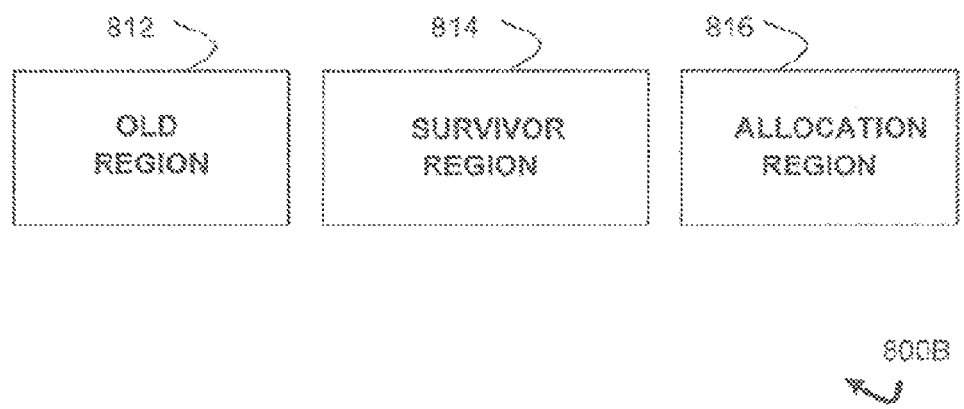
FIG. 8 is a block diagram illustrating the regions of FIG. 7, in accordance with an embodiment of the present disclosure.

FIG. 8 is a block diagram illustrating various regions that may be used with FIG. 7. In general, new objects are allocated in the young region and, when they survive for a certain period of time, are promoted or moved as long-lived objects to an old region 812. A pool may include a young region, the old region 812, or both the young region and the old region 812. The young region of a pool is either an allocation region 816 or a survivor region 814. The allocation region 816 is used by execution threads 805A, 805B to reserve memory for most newly created objects. The survivor region 814 is used by garbage collector threads 806A, 806B as storage in which the garbage collector threads 806A, 806B save the live but short-lived objects. Typically, objects that survive their first garbage collection are moved from the allocation region 816 to the survivor region 814.

Figure 9A:
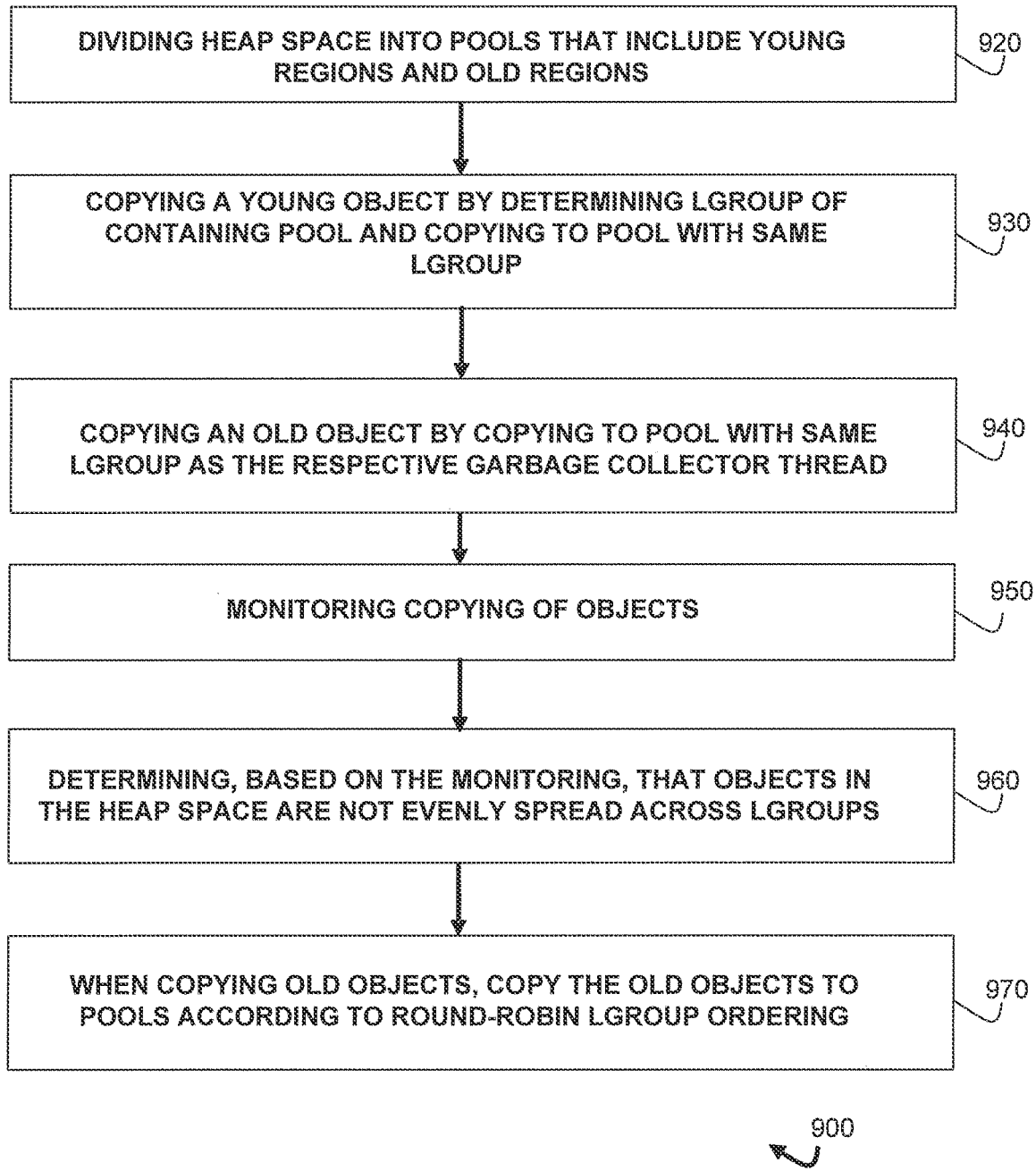
FIG. 9A is a method diagram illustrating a method for non-uniform memory access aware garbage collector thread processing, which may be performed by the system of FIG. 8, in accordance with an embodiment of the present disclosure.

FIG. 9A illustrates a method 900 for non-uniform memory access aware garbage collector thread processing, which may be performed by the system 800, in accordance with an embodiment of the present disclosure. The method 900 is a computer-implemented method, and as such is performed by a processing unit, such as the processing units 803A and 803B, executing one or more sets of instructions included in a computer program product stored in a machine-readable medium, such as the memories 804A and 804B.

The computing device 801 assigns processing units (803A, 803B) and memories (804A, 804B) into lgroups based on access latency between each of the processing units 803A, 803B and the memories 804A, 804B. A processing unit may be assigned to the same lgroup as a memory if the access latency between that processing unit and that memory is less than between that processing unit and other memories.

In an operation 920, the computing device 801 divides a heap space (808A, 808B) into a number of pools (809A, 809B) that are each contained in one of the memories 804A, 804B and divides the number of pools 809A, 809B into at least a number of Young Regions and Old Regions. The computing device 801 assigns each of the pools 809A, 809B to the same lgroup as the memory 804A, 804B that contains the respective pool. Each of the pools 809A, 809B may be the same size, such as 256 kilobytes.

In an operation 930, the computing device 801 utilizes a garbage collector thread (806A or 806B) to copy a Young object as part of one or more garbage collections. As part of copying the Young object, the garbage collector thread determines the lgroup of the pool that previously contained the Young object and copies the Young object to a pool of the same lgroup. In an operation 940, the computing device 801 utilizes a garbage collector thread to copy an Old object as part of the garbage collection. As part of copying the Old object, the garbage collector thread copies the Old object to a pool of the same lgroup as the garbage collector thread.

The method 900 may also include operations 950 through 970. In an operation 950, the computing device 801 utilizes the garbage collector thread to monitor the copying of objects during the garbage collection. The garbage collector thread may monitor the copying of Old objects and/or Young objects. In an operation 960, the garbage collector thread determines, based on the monitoring, that objects in the heap space are not evenly spread across lgroups. This determination may be based on Old objects and/or Young objects. In an operation 970, when the garbage collector thread copies Old objects, the garbage collector thread copies old objects to pools of the various lgroups in a round-robin fashion.

The copying of objects described in the above operations 930, 940 may move the objects between regions. The operation 930 may copy a Young object from the allocation region 816 to the survivor region 814. The operation 940 may copy a Young object from the survivor region 814 to the Old region, thereby re-designating the Young object as an Old object. Certain lgroup affinities, or association of objects with regions of certain lgroups, may be maintained during the operations 930, 940.

Figure 9B:
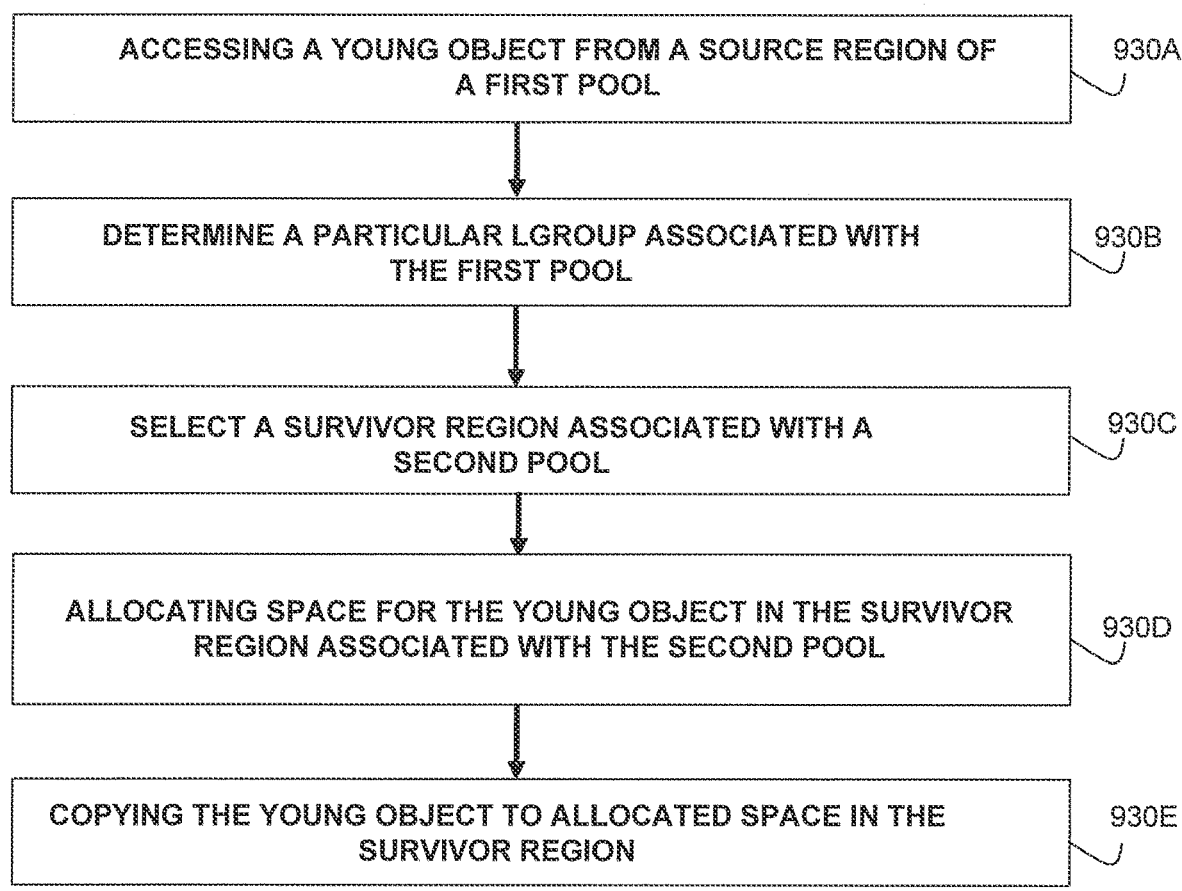
FIG. 9B is a method diagram illustrating sub-operations for the method of FIG. 9A of copying a Young object by determining an lgroup of a containing pool and copying to a pool with same lgroup, in accordance with the present disclosure.

FIG. 9B illustrates sub-operations that may be involved in copying a Young object to a pool with the same lgroup by determining the lgroup of the object's containing pool. In a sub-operation 930A, the garbage collector thread accesses a Young object from a source region of a first pool. The source region may be an allocation region or a source survivor region. The Young object may be accessed as part of a first garbage collection process or during a subsequent garbage collection process. The first pool may be associated with a particular lgroup among a number of lgroups. The particular lgroup includes a particular processing unit and a particular memory in communication with and local to the particular processing unit.

In a sub-operation 930B, the garbage collector thread determines the particular lgroup associated with the first pool. In a sub-operation 930C, the garbage collector thread may select the survivor region 814 associated with the second pool based on a determination that the particular lgroup is associated with the first pool. In a sub-operation 930D, the garbage collector thread allocates space for the Young object in the survivor region 814 associated with a second pool associated with the same particular lgroup. The allocation of space may then be based on selection of the survivor region 814. In a sub-operation 930E, the garbage collector thread copies the Young object to allocated space in the survivor region 814 associated with the second pool. The Young object may thus be copied from the allocation region or the source survivor region to the survivor region 814. The Young object may be copied multiple times using the foregoing sub-operations while staying within survivor regions of the same lgroup.

Figure 9C:
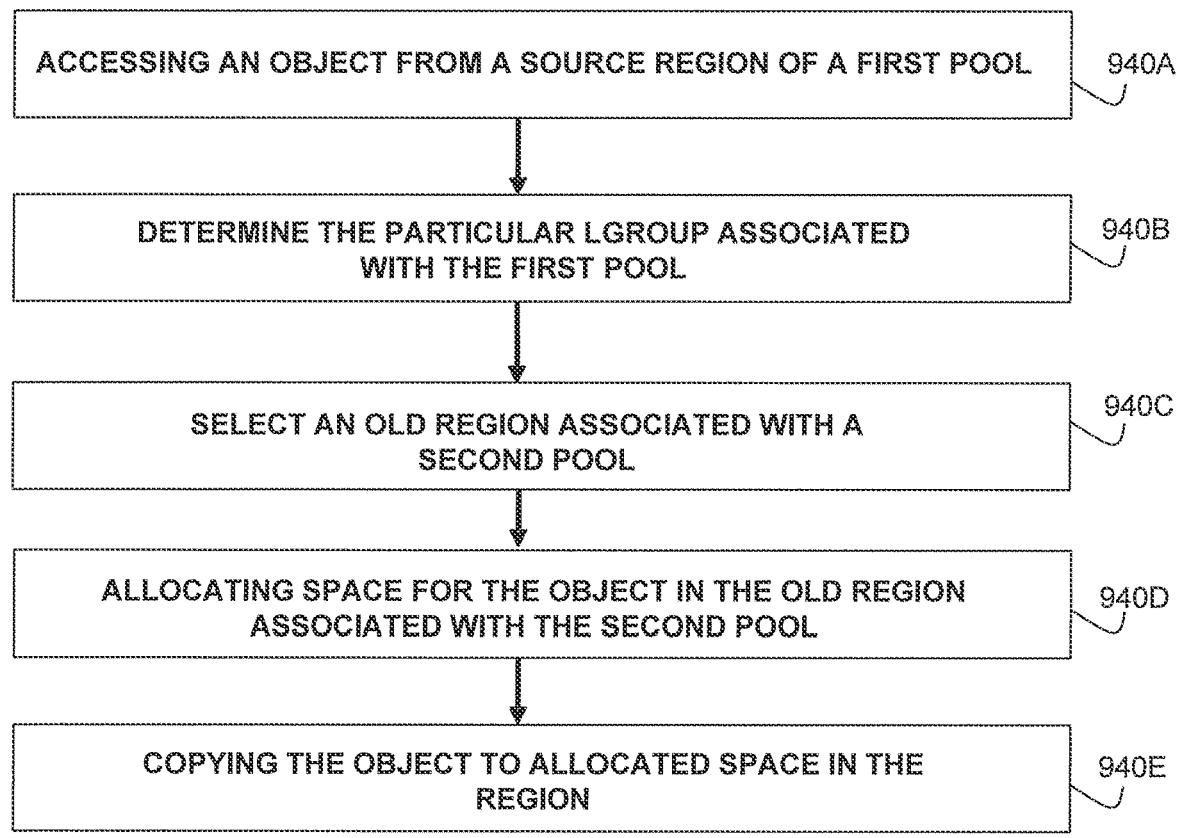
FIG. 9C is a method diagram illustrating sub-operations of the method of FIG. 9A of copying an Old object by copying to a pool with the same lgroup as the respective garbage collector thread, in accordance with the present disclosure.

FIG. 9C illustrates sub-operations that may be involved in copying an Old object to pool with the same lgroup as the respective garbage collector thread. In a sub-operation 940A, the garbage collector thread accesses an object from a source region of a first pool. The first pool may be associated with a particular lgroup among a number of lgroups. The source region may be an allocation region, a source survivor region, or a source old region. The garbage collection thread may be associated with a second pool associated with a different lgroup than the particular lgroup.

In some embodiments, the accessed object is primarily being manipulated by the execution thread that created the object. In other embodiments, the object is being manipulated by a different execution thread than the execution thread created the object.

In general, objects are accessed from the pool with which the garbage collector thread is associated. However, if a determination is made that there are no further objects to access in the associated pool, the Young object may then be accessed from the source region of a different pool. For example, a Young object may be accessed from an allocation region of a pool associated with a first lgroup by a garbage collection thread executing on a different processing unit and associated with a second, different lgroup.

In a sub-operation 940B, the garbage collector thread determines that the particular lgroup is associated with the first pool. In a sub-operation 940C, the garbage collector thread selects the Old region associated with the second pool based on a determination that the particular lgroup is associated with the first pool. In a sub-operation 940D, the garbage collector thread allocates space for the object in an Old region associated with the second pool. The allocation of space may be based on selection of the Old region. In a sub-operation 940E, the garbage collector thread copies the object to allocated space in the Old region associated with the second pool. The object may thus be copied from the allocation region, the source survivor region, or the source Old region to the Old region associated with the second pool.

In some embodiments, the operations performed in the FIGS. 9B and 9C may maximize the efficiency of the execution threads 805A, 805B. By more evenly distributing objects among processing units 803A, 803B hot spots or areas of concentrated processing on the processing unit 803A, 803B that would otherwise interfere with execution efficiency may be avoided.

Figure 10A:
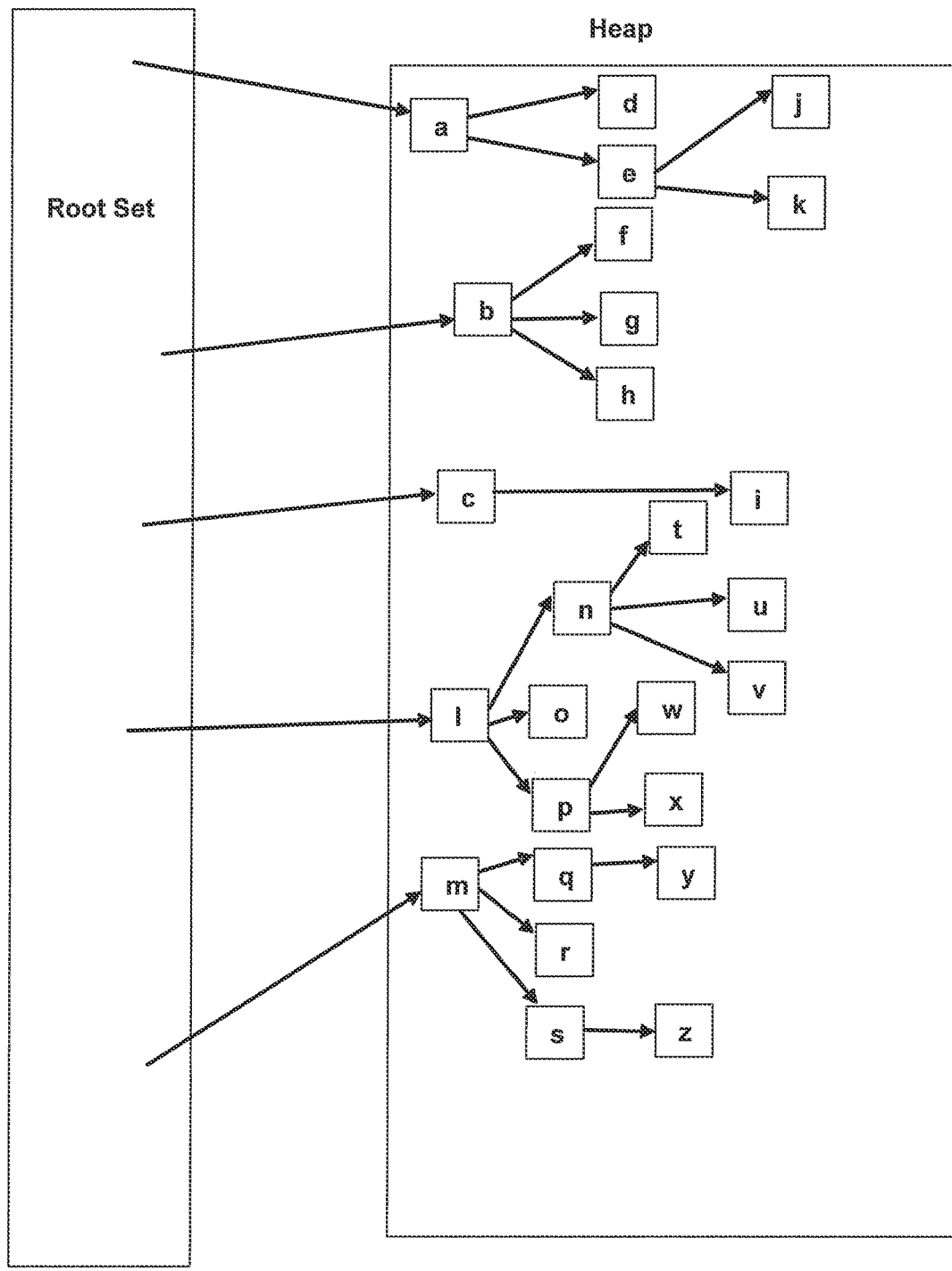
FIG. 10A is a block diagram illustrating a structure of references in a heap space in an example implementation of the system of FIG. 8.

FIG. 10A is a block diagram illustrating the structure of references in a heap space in an example implementation of the system 800. As illustrated, the heap space includes references from a root set of references. The root sets of references may include external references from anywhere in the call stack, local variables and parameters in functions currently being invoked, and any global variables. As illustrated, the heap includes memory that has been allocated to objects a through z. The root set of references includes external references to objects a, b, c, l, and m. Object a references objects d and e. Object e references objects j and k. Object b references objects f, g, and h. Object c references object i. Object l references objects n, o, and p. Object n references objects t, u, and v. Object p references objects w and x. Object m references objects q, r, and s. Object q references object y. Object s references object z. Thus, in this example, all objects a through z are currently reachable and no objects are currently unreachable.

Figure 10B:
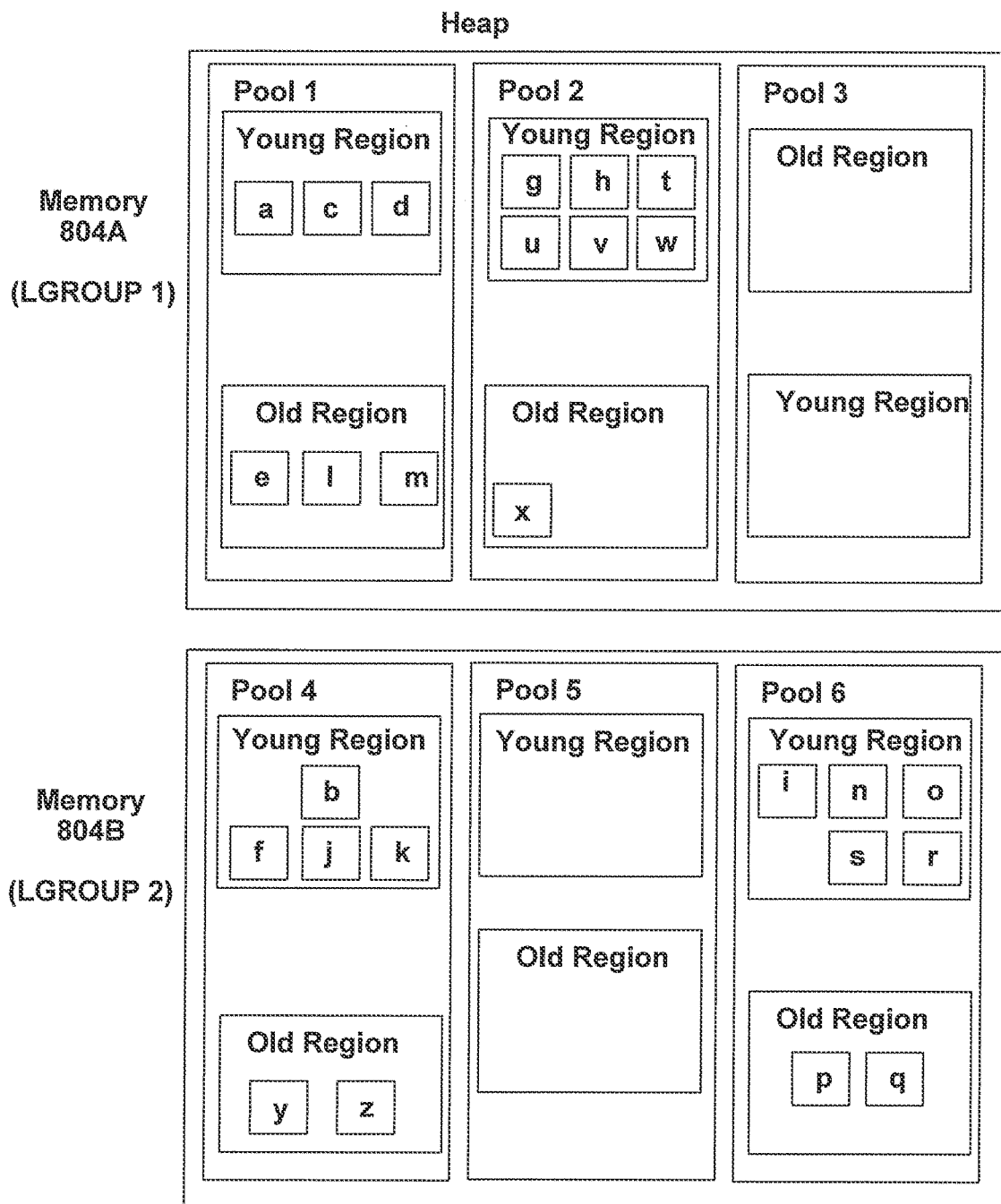
FIG. 10B is a block diagram illustrating the heap space of FIG. 10A divided into a number of pools with the pools divided into Young regions and Old regions.

FIG. 10B is a block diagram illustrating the heap space of FIG. 10A divided into a number of pools 809A and 809B contained in the memories 804A and 804B with the pools divided into Young regions and Old regions. Objects shown as contained in a Young region are defined as Young objects and objects shown as contained in Old regions are defined as Old objects. As illustrated, pools 1, 2, and 3 are contained in memory 804A. As memory 804A is assigned to lgroup 1 in this example, pools 1, 2, and 3 are also assigned to lgroup 1. Also as illustrated, pools 4, 5, and 6 are contained in memory 804B. As memory 804B is assigned to lgroup 2 in this example, pools 4, 5, and 6 are also assigned to lgroup 2.

Young objects a, c, and d are currently contained in a Young region in pool 1. Old objects e, l, and m are currently contained in an Old region in pool 1. Young objects g, h, t, u, v, and w are currently contained in a Young region in pool 2. Old object x is currently contained in an Old region in pool 2. Young objects b, f, j, and k are currently contained in a Young region in pool 4. Old objects y and z are currently contained in an Old region in pool 4. Young objects l, n, o, s, and r are currently contained in a Young region in pool 6. Old objects p and q are currently contained in an Old region in pool 6. No objects are currently stored in pools 3 and 5.

Figure 10C:
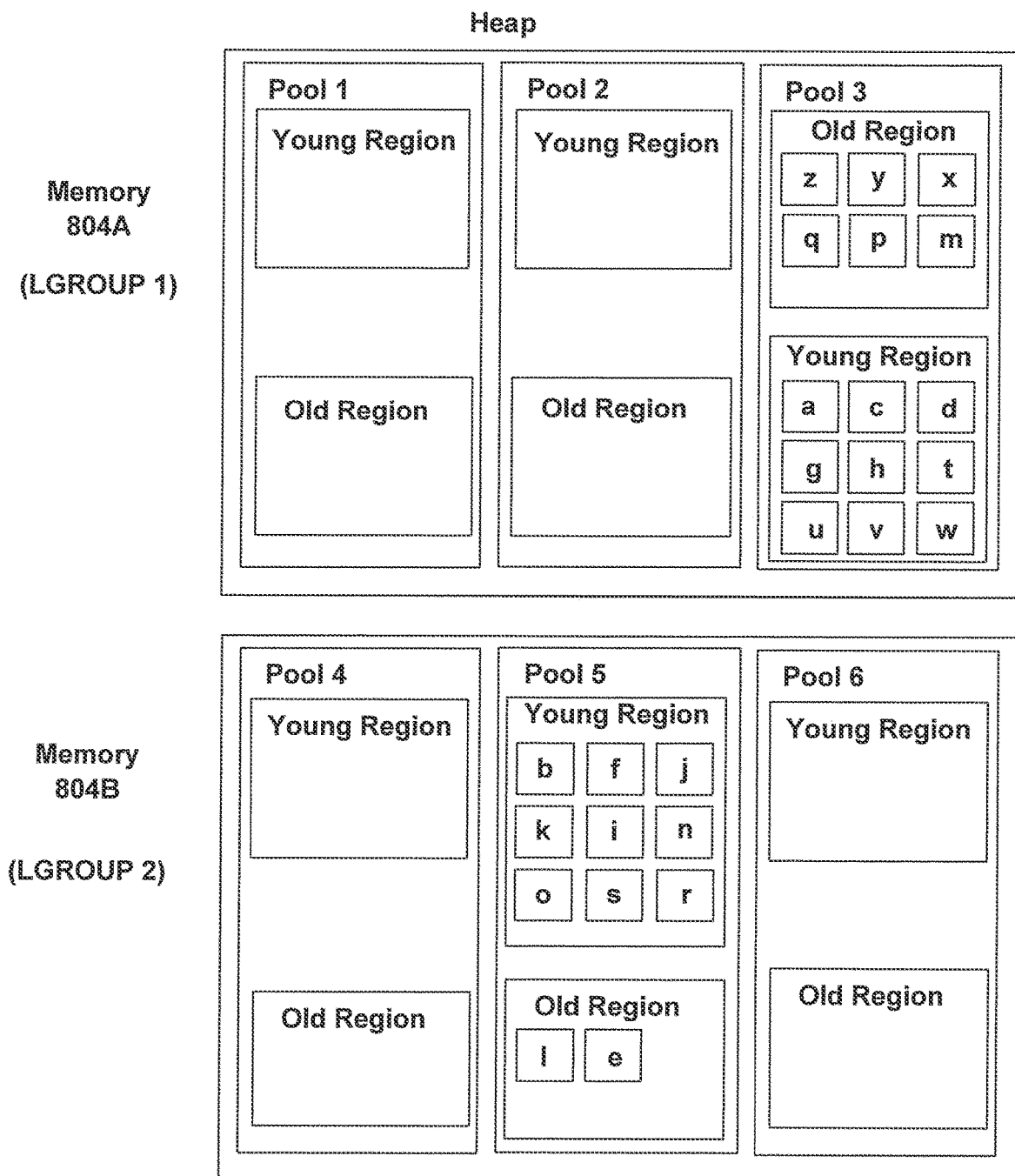
FIG. 10C is a block diagram illustrating the heap space shown in FIG. 10B after a first example of one or more region based copying garbage collection cycles.

FIG. 10C is a block diagram illustrating the heap space of FIG. 10B after one or more garbage collection cycles that results in copying of objects from regions in pools 1, 2, 4, and 6 to regions in pools 3 and 5 in accordance with operations 910 through 940. As shown, all Young objects were copied to Young regions in pools of the same lgroup as the pool that previously contained the Young object. As further shown, Old objects z, y, x, q, p, and m were copied by one or more garbage collector threads of lgroup 1 and Old objects l and e were copied by one or more garbage collector threads of lgroup 2. Thus, Old objects z, y, x, q, p, and m were copied to an Old region in pool 3 and Old objects l and e were copied to an Old region in pool 5. However, this results in far more Old objects being contained in pools in lgroup 1 than are contained in pools in lgroup 2.

Figure 10D:
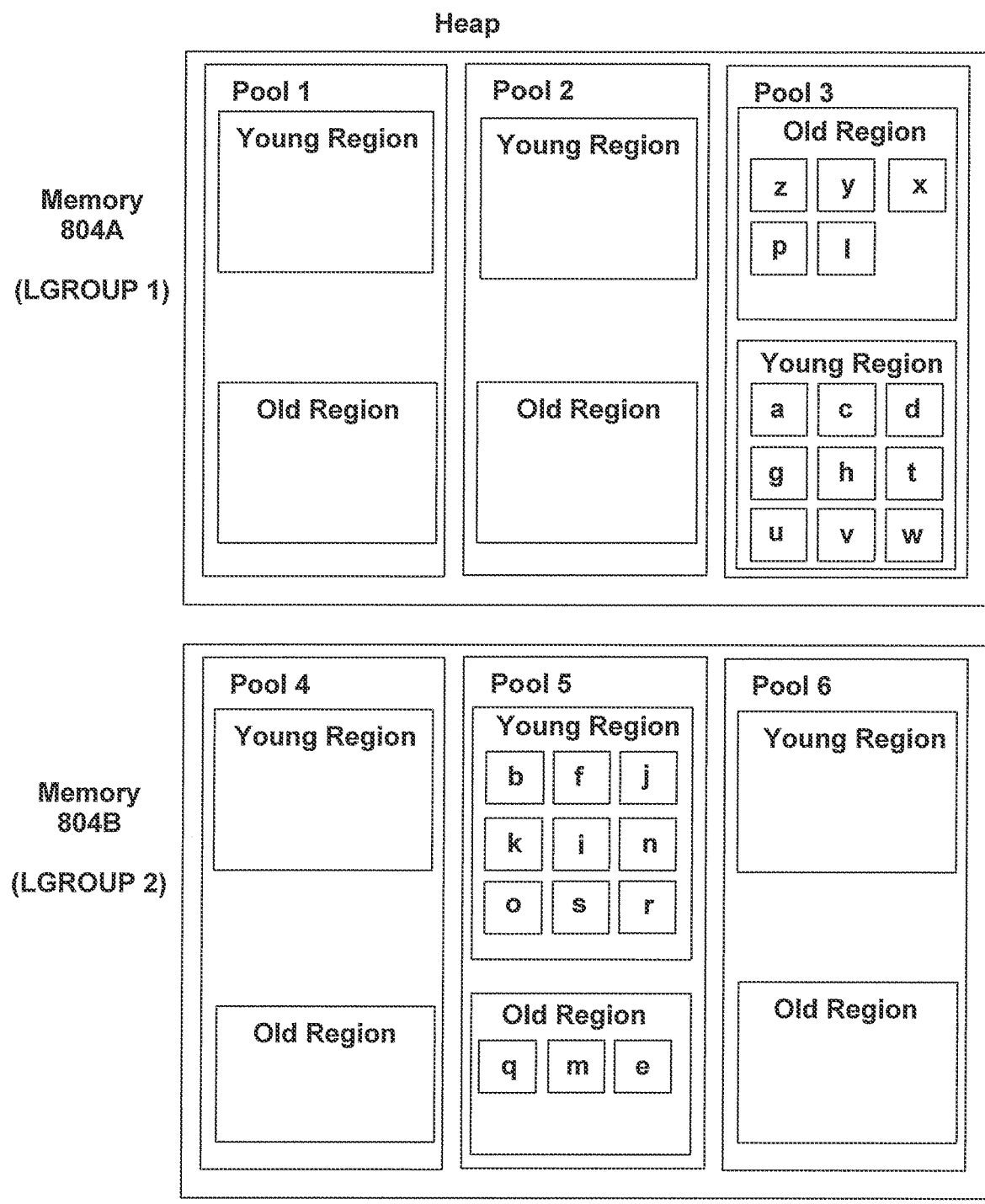
FIG. 10D is a block diagram illustrating the heap space shown in FIG. 10B after a second example of one or more region based copying garbage collection cycles.

FIG. 10D is a block diagram illustrating the heap space of FIG. 10B after one or more garbage collection cycles that results in copying of objects from regions in pools 1, 2, 4, and 6 to regions in pools 3 and 5 in accordance with operations 910 through 970. As shown, all Young objects are copied to Young regions in pools of the same lgroup as the pool that previously contained the Young object. Also as shown, Old objects were copied to pools of the same lgroup as the garbage collector thread that processed the object until monitoring of copying determined that the Old objects are not being evenly spread across lgroups. Then, Old objects were copied to pools of lgroups in a round robin fashion. Thus, the Old objects contained in pools more evenly spread across lgroup 1 and lgroup 2.

When objects are allocated or moved to various regions, there is the potential for multiple threads to seek to manipulate the same region or object space at the same time and thus cause a programming error. One option to avoid a programming error is to lock the entire region while one thread is accessing the region thereby preventing other threads from manipulating the same space. However, this option may cause a delay as certain threads wait for others threads to finish before starting their operations. Another option that avoids frequent use of locks and the aforementioned programming error includes splitting each region into local allocation buffers that are individually associated with threads. Since these portions of the regions are only manipulated by their respective threads, locks are not needed when multiple threads access the same region at the same time.

Figure 11A:
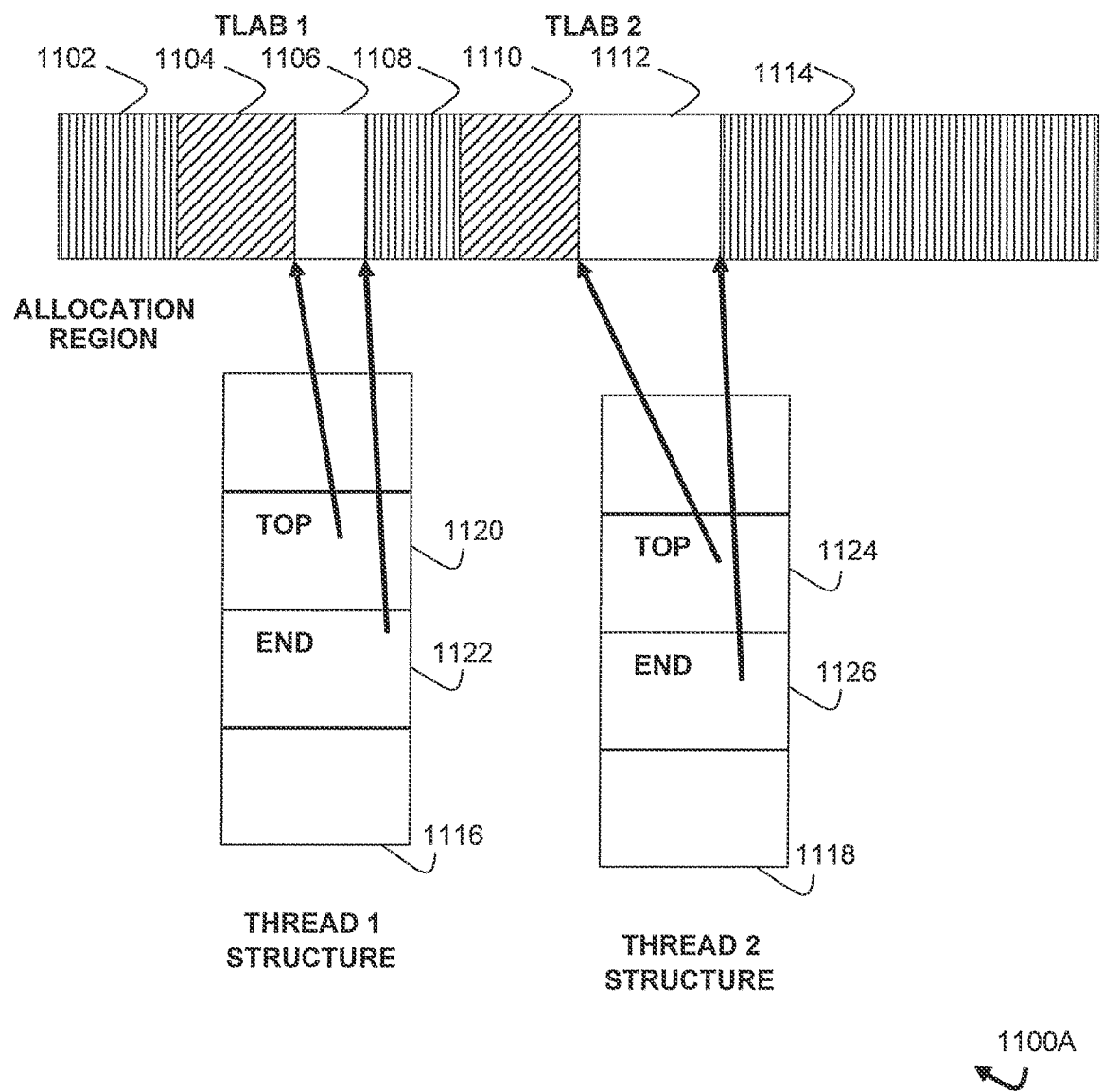
FIG. 11A is a block diagram illustrating thread structures in communication with an allocation region in an example implementation of the system of FIG. 8.

FIG. 11A is a block diagram illustrating thread structures in communication with the allocation region 816 in an example implementation of the system 800. As illustrated, the allocation region 816 includes allocation sub-regions 1102-1114. An unallocated sub-region 1102 not associated with a thread local allocation buffer (TLAB) is shown. In general, a TLAB is a portion of a region that is used for allocation by a single thread. The use of a TLAB enables the thread to perform faster object allocation than by use of an atomic operation on a top pointer that is shared across multiple threads. A TLAB 1 includes an allocated sub-region 1104 and an unallocated sub-region 1106. An unallocated sub-region 1108 not associated with a TLAB is further shown, followed by an allocated sub-region 1110 and an unallocated sub-region 1112 of TLAB 2. A further unallocated sub-region 1114 is shown. Unallocated sub-regions of the allocation region 816 may be used to space out allocated sub-regions (e.g., to avoid hotspots) or to be available for further TLABs.

Two thread structures 1116, 1118 are shown to have pointers into the allocation region 816. A thread structure 1 includes a top pointer 1120 to the end of the allocated sub-region 1104 of TLAB 1 and an end pointer 1122 to the end of the unallocated sub-region 1106 of TLAB 1. A thread structure 2 includes a top pointer 1124 to the end of the allocated sub-region 1110 of TLAB 2 and an end pointer 1126 to the end of the unallocated sub-region 1112 of TLAB 2.

Figure 11B:
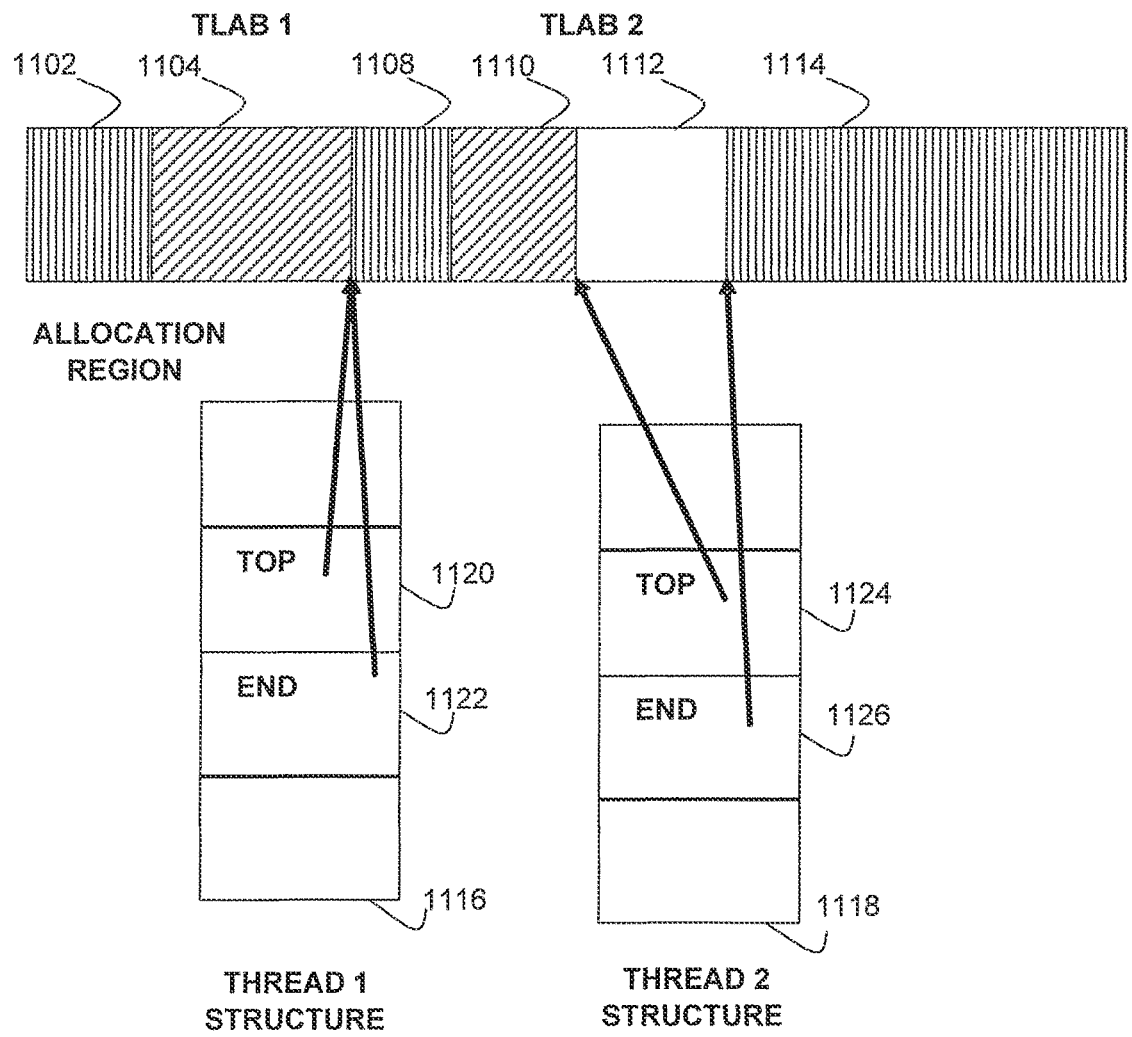
FIG. 11B is a block diagram illustrating the thread structures and the allocation region of FIG. 11A where a portion of a thread local allocation buffer has been allocated.

FIG. 11B is a block diagram illustrating the thread structures and the allocation region 816 of FIG. 11A where a portion of a TLAB has been allocated. As illustrated, the unallocated sub-region 1106 of FIG. 11A has been allocated without the use of an allocation lock. As such, allocated sub-region 1104 has grown to include the unallocated sub-region 1106 of FIG. 11A. The top pointer 1120 has been incremented and thus is shown to now point to the end of the allocated region 1104. Thus, the top pointer 1120 and the end pointer 1122 are now pointing to the same position. TLAB 1 is now full and as such, no further objects can presently be created in TLAB 1.

In general, the allocation lock is used to prevent multiple threads from trying to access or otherwise manipulate the same space in the allocation region at the same time. Since each TLAB is exclusively associated with a particular thread, there is no need for an allocation lock when writing to the TLAB. The allocation lock may be used, however, when creating a new TLAB and associating the unallocated space of the TLAB with a particular thread.

Figure 11C:
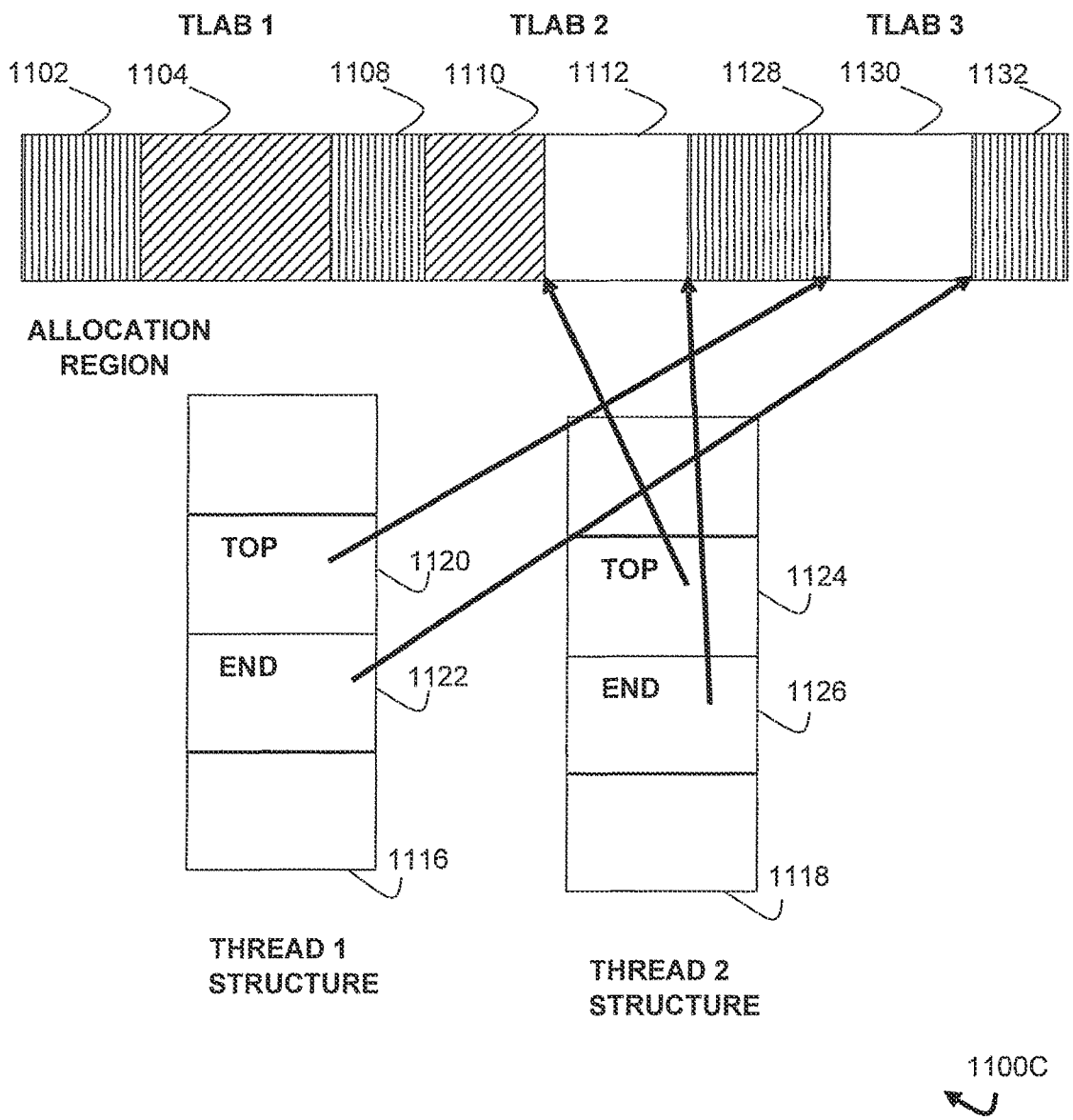
FIG. 11C is a block diagram illustrating the thread structures and the allocation region of FIG. 11B where a new thread local allocation buffer is created.

FIG. 11C is a block diagram illustrating the thread structures and the allocation region 816 of FIG. 11A where a new TLAB is created. As illustrated, the un-allocated sub-region 1114 is divided into unallocated sub-regions 1128, 1130, and 1132. The new unallocated sub-region 1130 becomes TLAB 3 and is associated with thread structure 1. The top pointer 1120 points to the beginning of the unallocated sub-region 1130 and the end pointer 1122 points to the end of the unallocated sub-region 1130. As such, additional objects can be created by the thread associated with thread structure 1 in the unallocated sub-region 1130 without the need for an allocation lock.

Figure 11D:
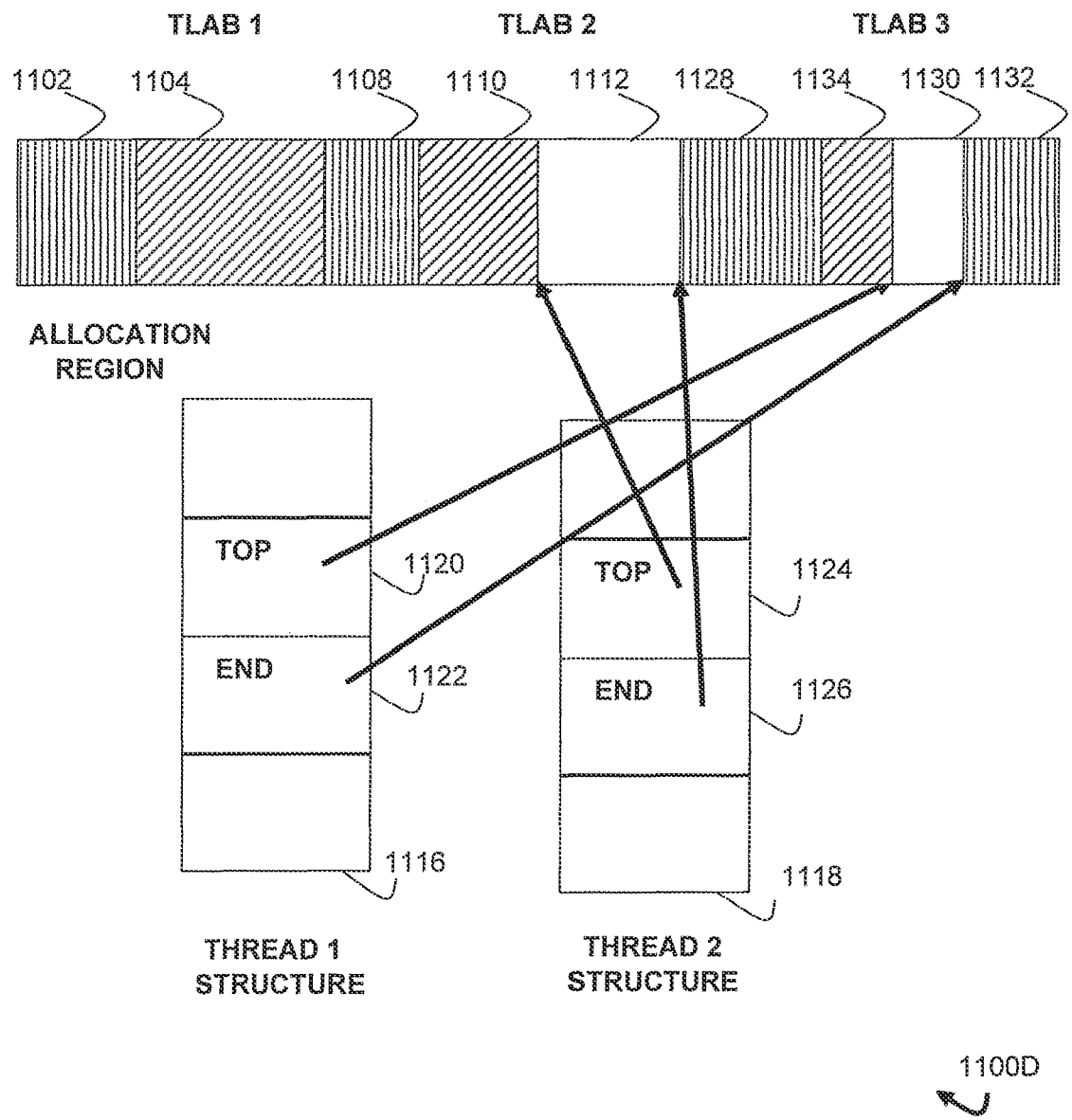
FIG. 11D is a block diagram illustrating the thread structures and the allocation region of FIG. 11C where a portion of the new thread local allocation buffer is allocated.

FIG. 11D is a block diagram illustrating the thread structures and the allocation region of FIG. 11A where a portion of the new TLAB is allocated. As illustrated, an allocated sub-region 1134 is allocated from a portion of the unallocated sub-region 1130 of the TLAB 3. The top pointer 1120 is incremented so that the pointer points at the beginning of the unallocated sub-region 1132.

As described above, the TLABs may be used to limit the number of allocation locks used when creating new objects in the allocation region. The threads are able to access portions of the allocation region through the thread structure and pointer system to identify a space in the allocation region for the new objects. Thus, synchronization with multiple threads through extensive use of locks may be avoided.

Similarly, promotion local allocation buffers (PLABs) may be used for objects that are copied in the Survivor region and the Old region. Each thread may have a PLAB in the Survivor region and the Old region where objects may be copied. For example, during the operations 930, 940, objects may be copied into PLABs associated with a garbage collector thread. By use of PLABs, the number of times a lock is used during object copying may also be limited.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A non-transitory machine-readable medium comprising instructions, which when executed by one or more processors, cause the one or more processors to perform the following operations:
   identifying, by a first garbage collector thread a first object to be copied from a first memory region associated with a first locality group (lgroup) among a plurality of lgroups, to a second memory region associated with a second lgroup, among the plurality of lgroups, the first garbage collector thread associated with the second memory region;
   wherein the first garbage collector thread identifies the first object by a first object identifier in a first remote queue of the first garbage collector thread,
   wherein the first garbage collector thread includes a first local queue storing identifying information of objects stored in the second memory region and the first remote queue storing identifying information of objects stored in the first memory region;
   identifying, by the first garbage collector thread, a second object to be copied from the second memory region,
   wherein the first garbage collector thread identifies the second object by a second object identifier in a second remote queue of a second garbage collector thread, the second garbage collector thread associated with the first memory region,
   responsive to determining: (a) the first object is to be copied from the first memory region, and (b) the second object is to be copied from the second memory region:

prioritizing, by the first garbage collector thread, a first operation for copying the second object from the second memory region above a second operation for copying the first object from the first memory region.

2. The medium of claim 1, wherein the first garbage collector thread includes a first local queue storing location information for objects to be copied from the second memory region;
wherein the operations further comprise:
identifying, by the first garbage collector thread, a third object to be copied from the second memory region;
wherein the first garbage collector thread identifies the third object by a third object identifier in the first local queue of the first garbage collector thread,
responsive to identifying the third object based on the third object identifier in the first local queue: prioritizing, by the first garbage collector thread, a third operation for copying the third object above the first operation for copying the second object.

3. The medium of claim 1, wherein the first garbage collector thread includes a first local queue storing identifying information for objects to be copied from the second memory region;
wherein the operations further comprise:
applying, by the first garbage collector thread, a set of rules to prioritize copying operations of objects by the first garbage collector, the set of rules comprising:
(1) assigning a highest priority level to copying objects associated with third object identifiers stored in the first local queue;
(2) assigning a second-highest level priority to copying objects associated with second object identifiers stored in the second remote queue, based on the objects being located in the second memory region;
(3) assigning a third-highest level priority to copying objects associated with first object identifiers stored in the first remote queue, based on the objects being located in the first memory region; and
(4) assigning a lowest priority to copying objects associated with fourth object identifiers stored in the second remote queue, based on the objects being located in the first memory region.

4. The medium of claim 1, wherein the operations further comprise:
identifying, by the first garbage collector thread a third object to be copied from a third memory region associated with a third locality group (lgroup) among a plurality of lgroups, the third memory region associated with a third garbage collector thread;
wherein the first garbage collector thread identifies the third object by a third object identifier in a third remote queue, the third remote queue associated with the first garbage collector thread,
responsive to determining: (a) the third object is to be copied from the third memory region, and (b) the second object is to be copied from the second memory region:
prioritizing, by the first garbage collector thread, the first operation for copying the second object above a third operation for copying the third object from the third memory region.

5. The medium of claim 4, wherein the operations further comprise:
obtaining, by the first garbage collector from a call stack, a fourth object identifier of a fourth object;
responsive to determining the fourth object is to be copied from the third memory region, storing the fourth object identifier in the third remote queue;
obtaining, by the first garbage collector from the call stack, a fifth object identifier of a fifth object;
responsive to determining the fifth object is to be copied from the first memory region, storing the fifth object identifier in the first remote queue.

6. A method, comprising:
identifying, by a first garbage collector thread a first object to be copied from a first memory region associated with a first locality group (lgroup) among a plurality of lgroups, to a second memory region associated with a second lgroup, among the plurality of lgroups, the first garbage collector thread associated with the second memory region;
wherein the first garbage collector thread identifies the first object by a first object identifier in a first remote queue of the first garbage collector thread,
wherein the first garbage collector thread includes a first local queue storing identifying information of objects stored in the second memory region and the first remote queue storing identifying information of objects stored in the first memory region;
identifying, by the first garbage collector thread, a second object to be copied from the second memory region,
wherein the first garbage collector thread identifies the second object by a second object identifier in a second remote queue of a second garbage collector thread, the second garbage collector thread associated with the first memory region,
responsive to determining: (a) the first object is to be copied from the first memory region, and (b) the second object is to be copied from the second memory region:
prioritizing, by the first garbage collector thread, a first operation for copying the second object from the second memory region above a second operation for copying the first object from the first memory region.

7. The method of claim 6, wherein the first garbage collector thread includes a first local queue storing identifying information for objects to be copied from the second memory region;
wherein the operations further comprise:
identifying, by the first garbage collector thread, a third object to be copied from the second memory region;
wherein the first garbage collector thread identifies the third object by a third object identifier in the first local queue of the first garbage collector thread,
responsive to identifying the third object based on the third object identifier in the first local queue: prioritizing, by the first garbage collector thread, a third operation for copying the third object above the first operation for copying the second object.

8. The method of claim 6, wherein the first garbage collector thread includes a first local queue storing location information for objects to be copied from the second memory region;
wherein the method further comprises:
applying, by the first garbage collector thread, a set of rules to prioritize copying operations of objects by the first garbage collector, the set of rules comprising:
(1) assigning a highest priority level to copying objects associated with third object identifiers stored in the first local queue;
(2) assigning a second-highest level priority to copying objects associated with second object identifiers stored in the second remote queue, based on the objects being located in the second memory region;

(3) assigning a third-highest level priority to copying objects associated with first object identifiers stored in the first remote queue, based on the objects being located in the first memory region; and (4) assigning a lowest priority to copying objects associated with fourth object identifiers stored in the second remote queue, based on the objects being located in the first memory region.

9. The method of claim 6, further comprising:

identifying, by the first garbage collector thread a third object to be copied from a third memory region associated with a third locality group (lgroup) among a plurality of lgroups, the third memory region associated with a third garbage collector thread;

wherein the first garbage collector thread identifies the third object by a third object identifier in a third remote queue, the third remote queue associated with the first garbage collector thread, responsive to determining: (a) the third object is to be copied from the third memory region, and (b) the second object is to be copied from the second memory region:

prioritizing, by the first garbage collector thread, the first operation for copying the second object above a third operation for copying the third object from the third memory region.

10. The method of claim 9, further comprising:

obtaining, by the first garbage collector from a call stack, a fourth object identifier of a fourth object;

responsive to determining the fourth object is to be copied from the third memory region, storing the fourth object identifier in the third remote queue;

obtaining, by the first garbage collector from the call stack, a fifth object identifier of a fifth object;

responsive to determining the fifth object is to be copied from the first memory region, storing the fifth object identifier in the first remote queue.

11. A system, comprising:

one or more processors; and memory storing instructions that, when executed by the one or more processors, cause the system to perform:

identifying, by a first garbage collector thread a first object to be copied from a first memory region associated with a first locality group (lgroup) among a plurality of lgroups, to a second memory region associated with a second lgroup, among the plurality of lgroups, the first garbage collector thread associated with the second memory region;

wherein the first garbage collector thread identifies the first object by a first object identifier in a first remote queue of the first garbage collector thread, wherein the first garbage collector thread includes a first local queue storing identifying information of objects stored in the second memory region and the first remote queue storing identifying information of objects stored in the first memory region;

identifying, by the first garbage collector thread, a second object to be copied from the second memory region, wherein the first garbage collector thread identifies the second object by a second object identifier in a second remote queue of a second garbage collector thread, the second garbage collector thread associated with the first memory region, responsive to determining: (a) the first object is to be copied from the first memory region, and (b) the second object is to be copied from the second memory region:

prioritizing, by the first garbage collector thread, a first operation for copying the second object from the second memory region above a second operation for copying the first object from the first memory region.

12. The system of claim 11, wherein the first garbage collector thread includes a first local queue storing identifying information for objects to be copied from the second memory region;

wherein the operations further comprise:

identifying, by the first garbage collector thread, a third object to be copied from the second memory region;

wherein the first garbage collector thread identifies the third object by a third object identifier in the first local queue of the first garbage collector thread, responsive to identifying the third object based on the third object identifier in the first local queue: prioritizing, by the first garbage collector thread, a third operation for copying the third object above the first operation for copying the second object.

13. The system of claim 11, wherein the first garbage collector thread includes a first local queue storing location information for objects to be copied from the second memory region;

wherein the instructions further cause the system to perform:

applying, by the first garbage collector thread, a set of rules to prioritize copying operations of objects by the first garbage collector, the set of rules comprising:

(1) assigning a highest priority level to copying objects associated with third object identifiers stored in the first local queue;

(2) assigning a second-highest level priority to copying objects associated with second object identifiers stored in the second remote queue, based on the objects being located in the second memory region;

(3) assigning a third-highest level priority to copying objects associated with first object identifiers stored in the first remote queue, based on the objects being located in the first memory region; and (4) assigning a lowest priority to copying objects associated with fourth object identifiers stored in the second remote queue, based on the objects being located in the first memory region.

14. The system of claim 11, wherein the instructions further cause the system to perform:

identifying, by the first garbage collector thread a third object to be copied from a third memory region associated with a third locality group (lgroup) among a plurality of lgroups, the third memory region associated with a third garbage collector thread;

wherein the first garbage collector thread identifies the third object by a third object identifier in a third remote queue, the third remote queue associated with the first garbage collector thread, responsive to determining: (a) the third object is to be copied from the third memory region, and (b) the second object is to be copied from the second memory region:

prioritizing, by the first garbage collector thread, the first operation for copying the second object above a third operation for copying the third object from the third memory region.

15. The system of claim 14, wherein the instructions further cause the system to perform:

obtaining, by the first garbage collector from a call stack, a fourth object identifier of a fourth object;

responsive to determining the fourth object is to be copied from the third memory region, storing the fourth object identifier in the third remote queue;

obtaining, by the first garbage collector from the call stack, a fifth object identifier of a fifth object;

responsive to determining the fifth object is to be copied from the first memory region, storing the fifth object identifier in the first remote queue.

* * * * *

UNITED STATES PATENT AND TRADEMARK OFFICE
CERTIFICATE OF CORRECTION

| | | |
|---|---|---|
| PATENT NO. | : 11,775,429 B2 | Page 1 of 1 |
| APPLICATION NO. | : 17/375159 | |
| DATED | : October 3, 2023 | |
| INVENTOR(S) | : Printezis et al. | |

It is certified that error appears in the above-identified patent and that said Letters Patent is hereby corrected as shown below:

In the Drawings

On sheet 36 of 48, in FIG. 7, under Reference Numeral 812, Lines 1-2, delete "StorageMedia" and insert -- Storage Media --, therefor.

In the Specification

In Column 1, Line 57, delete "m mory" and insert -- memory --, therefor.

In Column 2, Line 61, delete "FIG." and insert -- FIGS. --, therefor.

In Column 3, Line 4, delete "FIG." and insert -- FIGS. --, therefor.

In Column 7, Line 3, delete "1038," and insert -- 103B, --, therefor.

In Column 9, Line 10, delete "disclosure," and insert -- disclosure. --, therefor.

In Column 11, Line 5, delete "group" and insert -- lgroup --, therefor.

In Column 11, Line 18, delete "the an" and insert -- the --, therefor.

In Column 19, Line 17, delete "un-allocated" and insert -- unallocated --, therefor.

Signed and Sealed this
Second Day of July, 2024

Katherine Kelly Vidal
*Director of the United States Patent and Trademark Office*